United States Patent
Sundell et al.

(10) Patent No.: US 12,445,578 B1
(45) Date of Patent: Oct. 14, 2025

(54) INTERACTIVE DISPLAY FOR SECURITY MONITORING SYSTEM

(71) Applicant: SimpliSafe, Inc., Boston, MA (US)

(72) Inventors: Daniel Reid Sundell, Medford, MA (US); Jordan Theodore Thayer, Hopkinton, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 19/096,920

(22) Filed: Apr. 1, 2025

Related U.S. Application Data

(60) Provisional application No. 63/573,154, filed on Apr. 2, 2024.

(51) Int. Cl.
| | | |
|---|---|---|
| *G06F 3/04842* | (2022.01) | |
| *G06F 3/04817* | (2022.01) | |
| *G06V 20/40* | (2022.01) | |
| *G06V 20/52* | (2022.01) | |
| *H04N 7/18* | (2006.01) | |

(52) U.S. Cl.
CPC ......... H04N 7/183 (2013.01); G06F 3/04817 (2013.01); G06F 3/04842 (2013.01); G06V 20/44 (2022.01); G06V 20/52 (2022.01)

(58) Field of Classification Search
None
See application file for complete search history.

(56) References Cited

U.S. PATENT DOCUMENTS

| | | | |
|---|---|---|---|
| 8,707,201 B1 * | 4/2014 | Aradhye | G06F 16/24578 715/204 |
| 11,908,196 B1 | 2/2024 | Sundell et al. | |
| 12,136,294 B1 | 11/2024 | Thayer et al. | |
| 2007/0206100 A1 * | 9/2007 | Hikita | H04N 23/62 345/161 |
| 2013/0322748 A1 * | 12/2013 | Im | G11B 27/105 382/165 |
| 2017/0098126 A1 * | 4/2017 | Laska | G11B 27/028 |
| 2017/0359507 A1 * | 12/2017 | Lee | H04N 23/63 |
| 2018/0122223 A1 * | 5/2018 | Simon | G08B 13/19682 |
| 2018/0184049 A1 * | 6/2018 | Moss | G06F 3/0486 |
| 2025/0078644 A1 * | 3/2025 | Holla | G08B 25/00 |
| 2025/0095371 A1 | 3/2025 | Thayer et al. | |

FOREIGN PATENT DOCUMENTS

| | | |
|---|---|---|
| KR | 1020120105205 A | 9/2012 |
| KR | 1020130077379 A | 7/2013 |
| KR | 101953177 B1 | 5/2019 |

OTHER PUBLICATIONS

International Search Report and Written Opinion mailed Jul. 18, 2025, for International Patent Application No. PCT/US2025/022448.

* cited by examiner

*Primary Examiner* — Tuan S Nguyen
(74) *Attorney, Agent, or Firm* — Pierce Atwood LLP

(57) ABSTRACT

In some embodiments, a method may involve causing a computing device to display on a screen first video received from a camera at a monitored location, and causing the computing device to display at least a first user interface element on the screen, together with the first video, the first user interface element indicative of a feature detected in second video received from the camera. In response to detecting selection of the first user interface element, the computing device may be caused to display a portion of the second video in which the feature was detected, together with the first video and the first user interface element.

22 Claims, 20 Drawing Sheets

| Event ID | Timestamp | User ID | Location ID | Camera ID | Images | Feature Indicators | Event Type | System State | Filtering Control | Event Status | Event Disposition | Priority | Agent ID |
|---|---|---|---|---|---|---|---|---|---|---|---|---|---|
| E1 | T1 | U1 | L1 | C1 | I1 | FI1 | ET1 | AS1 | F1 | ES1 | ED1 | P1 | AID1 |
| E2 | T2 | U2 | L2 | C2 | I2 | FI2 | ET2 | AS2 | F2 | ES2 | ED2 | P2 | AID2 |
| E3 | T3 | U2 | L2 | C3 | I3 | FI3 | ET3 | AS3 | F3 | ES3 | ED3 | P3 | AID3 |
| E4 | T4 | U1 | L1 | C1 | I3 | FI4 | ET4 | AS4 | F4 | ES4 | ED4 | P4 | AID4 |

FIG. 2

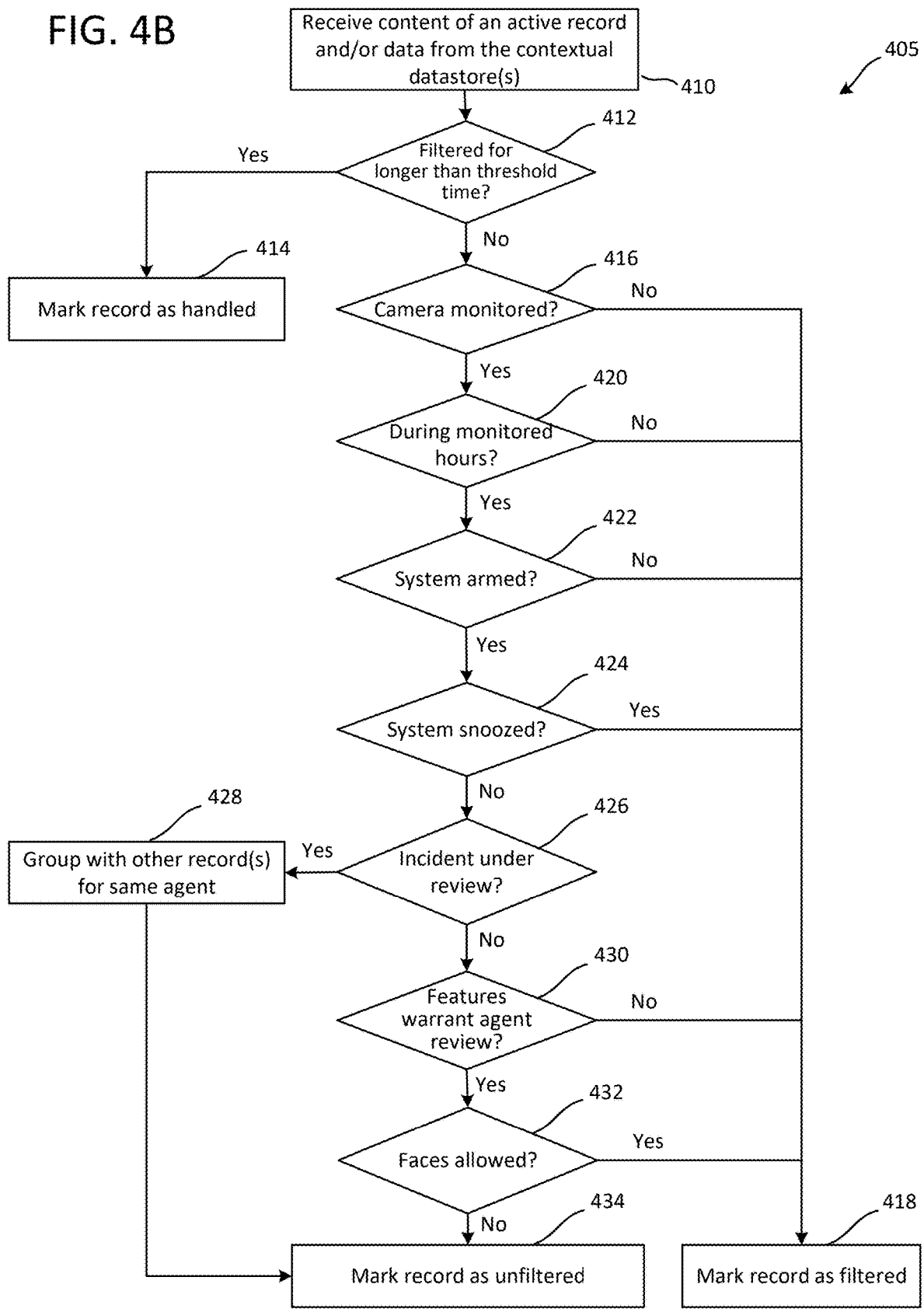

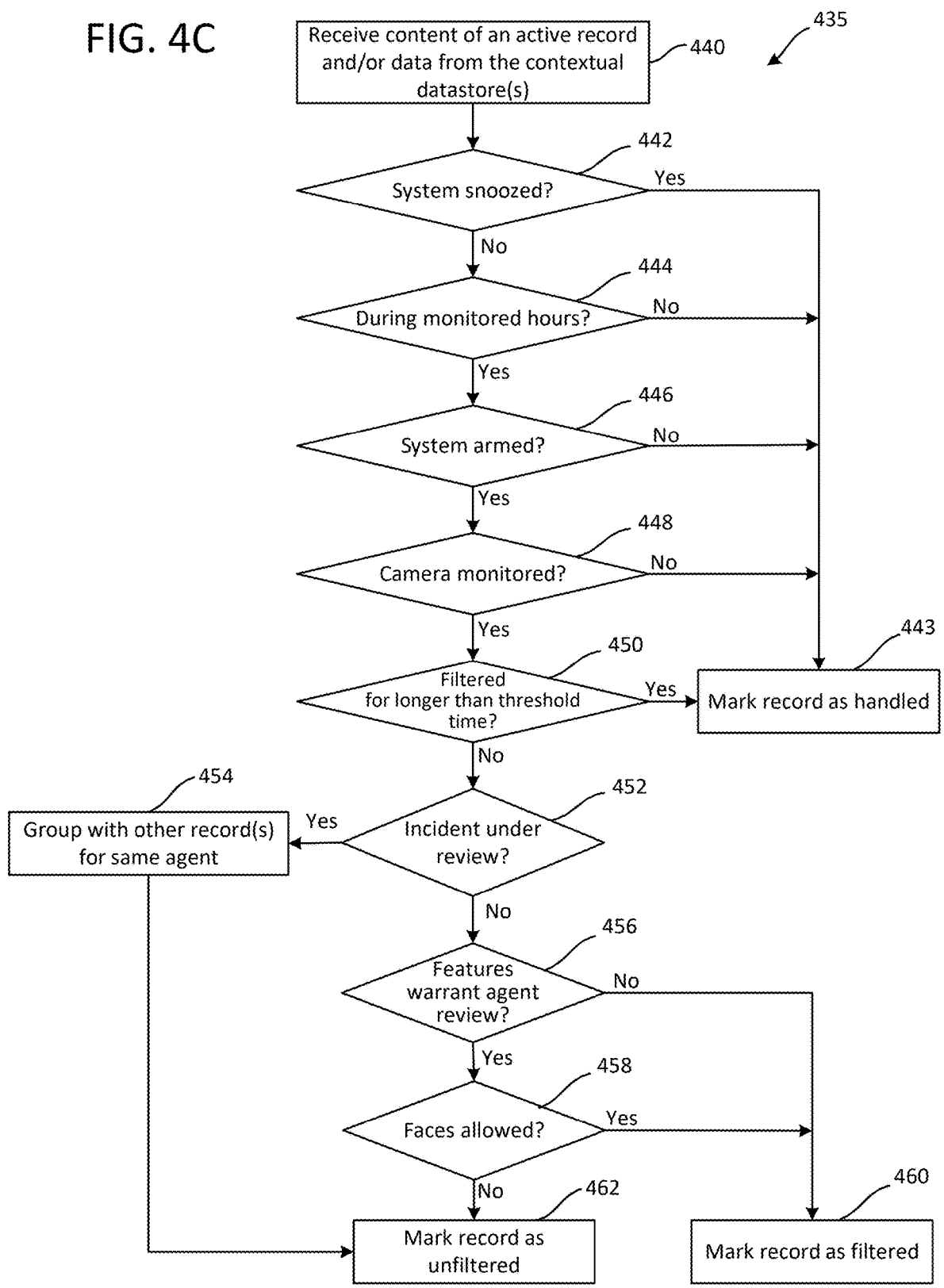

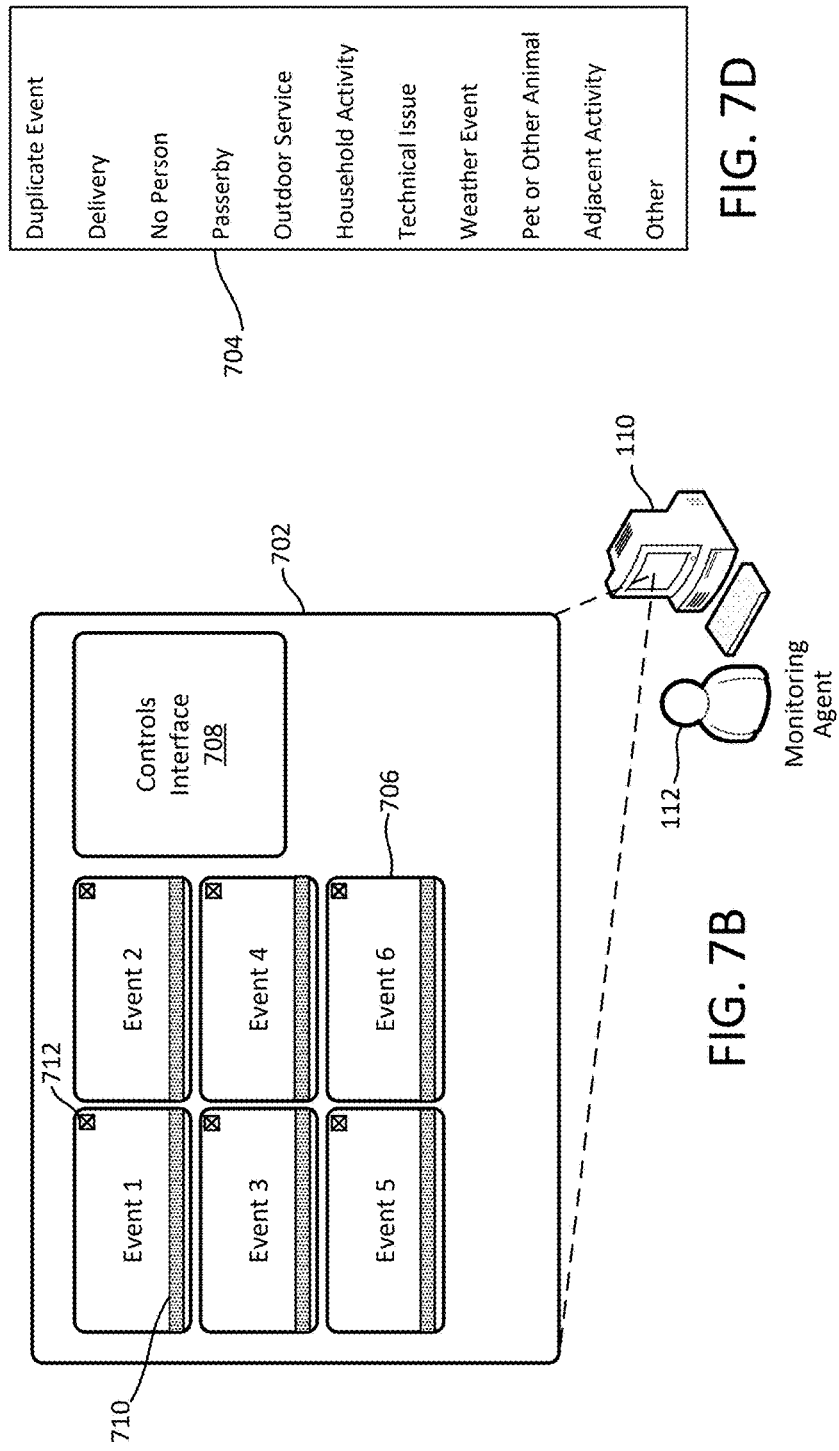
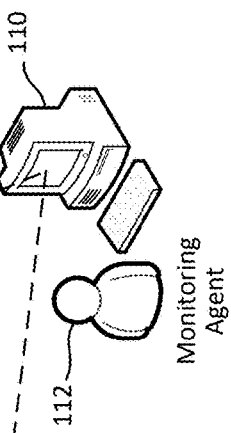
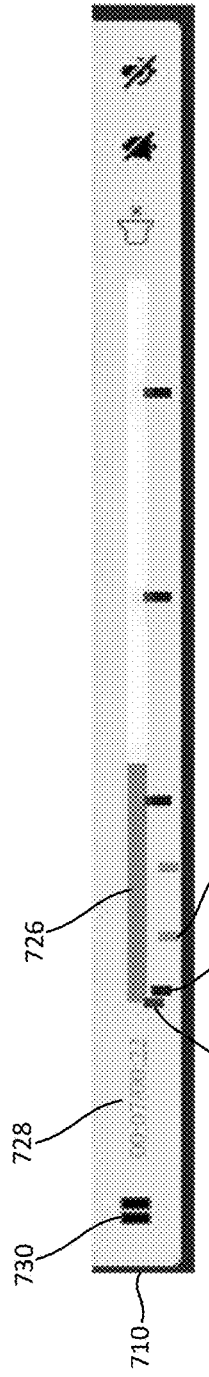
FIG. 7D
FIG. 7B
FIG. 7C

INTERACTIVE DISPLAY FOR SECURITY MONITORING SYSTEM

RELATED APPLICATIONS

This application claims the benefit under 35 U.S.C. § 119(e) to U.S. Provisional Application Ser. No. 63/573,154, entitled INTERACTIVE DISPLAY FOR SECURITY MONITORING SYSTEM, filed Apr. 2, 2024, the entire contents of which are incorporated herein by reference for all purposes.

BACKGROUND

Some security systems enable remote monitoring of locations using cameras and other equipment.

SUMMARY

In some aspects, the techniques described herein relate to a method including: causing a computing device to display on a screen first video received from a camera at a monitored location; causing the computing device to display at least a first user interface element on the screen, together with the first video, the first user interface element indicative of a feature detected in second video received from the camera; and in response to detecting selection of the first user interface element, causing the computing device to display a portion of the second video in which the feature was detected, together with the first video and the first user interface element.

In some aspects, the techniques described herein relate to a method including: receiving, by an application and from a remote computing system, at least a first image associated with a first event record for a first event detected at a first monitored location and at least a second image associated with a second event record for a second event detected at a second monitored location; causing, by the application, a computing device to display the first image and the second image simultaneously on a screen; receiving, by the application and from the remote computing system, a priority associated with the first event record; and causing, by the application and based at least in part on the priority, the computing device to (A) display additional information together with the first image, or (B) determine a relative position of the first image and the second image on the screen.

In some aspects, the techniques described herein relate to a system including: one or more processors; and one or more computer-readable mediums encoded with instructions which, when executed by the one or more processors, cause the system to: cause a computing device to display on a screen first video received from a camera at a monitored location; cause the computing device to display at least a first user interface element on the screen, together with the first video, the first user interface element indicative of a feature detected in second video received from the camera; and in response to detecting selection of the first user interface element, cause the computing device to display a portion of the second video in which the feature was detected, together with the first video and the first user interface element.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

FIG. 2 shows an example table that may be used by the security system shown in FIG. 1 to store records for detected events, according to some implementations of the present disclosure.

FIG. 4B is a flow chart showing a first example process that may be executed by the event filtering and grouping component shown in FIG. 4A to determine whether a record is to be marked as handled or filtered and/or is to be grouped with related records, according to some implementations of the present disclosure.

FIG. 4C is a flow chart showing a second example process that may be executed by the event filtering and grouping component shown in FIG. 4A to determine whether a record is to be marked as handled or filtered and/or is to be grouped with related records, according to some implementations of the present disclosure.

FIG. 7B shows an example screen that a monitoring application may present on a monitoring device operated by a monitoring agent (e.g., as shown in FIG. 7A) in response to the assignment of several records to that monitoring agent, according to some implementations of the present disclosure.

FIG. 7C shows a detailed view of a timelapse bar shown in FIG. 7B, according to some implementations of the present disclosure.

FIG. 7D shows an example dropdown menu that may be presented when a monitoring agent closes one of the event windows shown in FIG. 7B, according to some implementations of the present disclosure.

DETAILED DESCRIPTION

Figure 1:
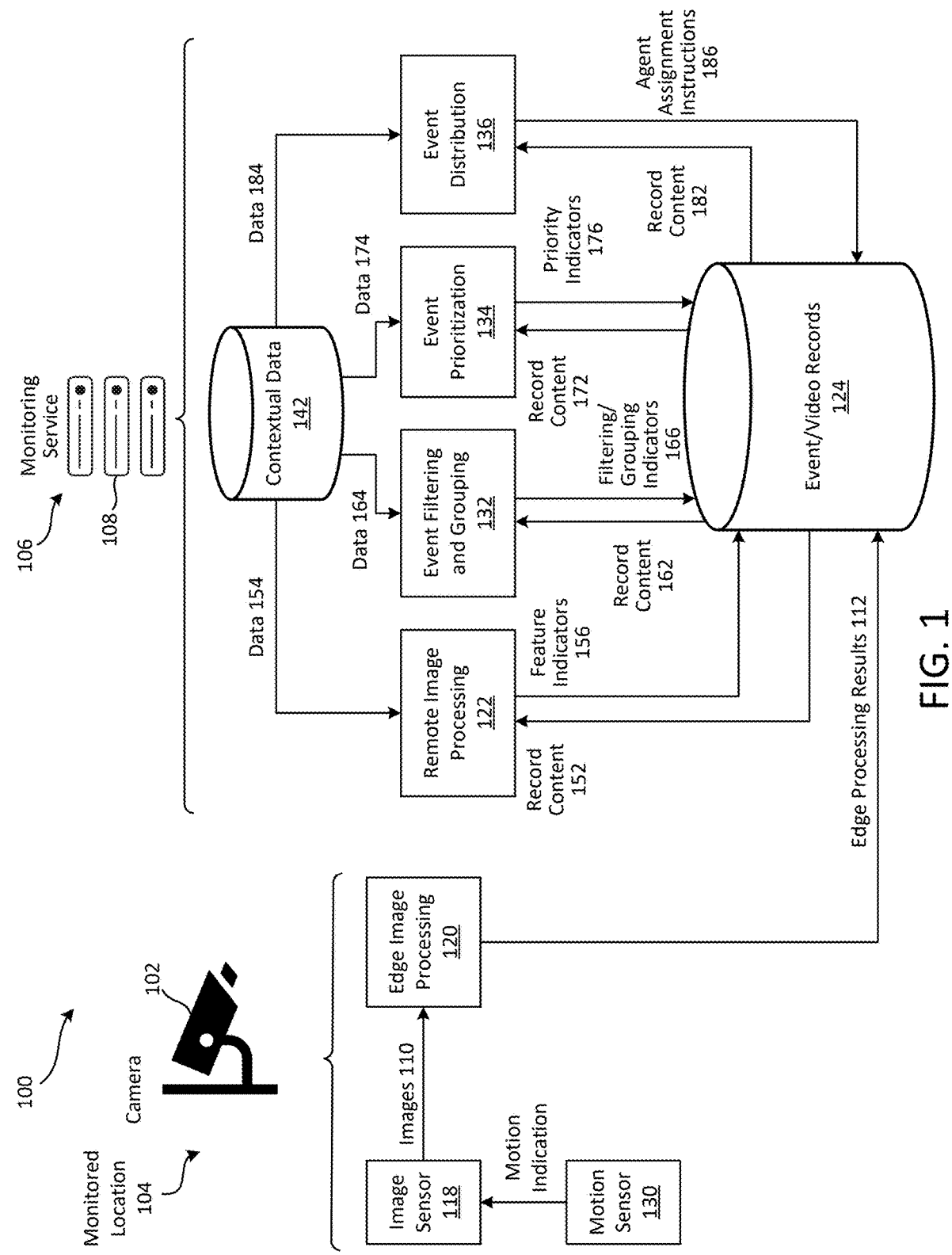
FIG. 1 shows example components and processing of a security system configured in accordance with some implementations of the present disclosure.

Existing security systems use cameras and other sensors to monitor a location for various reasons. Some such systems are mainly composed of binary sensors and are configured to detect the occurrence of certain phenomena, e.g., motion and/or sound, within or around the monitored location. In response to detecting the occurrence of such phenomena, text-based event notifications (and possibly associated images) may be sent to a remote location for processing and/or review by human monitoring agents. To facilitate review of an event notification, a monitoring agent may have access to a list of historical alarms at a monitored location and basic metadata, such as a door sensor alarm that was triggered at a specific time. When operating such systems, monitoring agents typically wait a fixed period of time after receiving an event notification and then execute a sequence of processing steps, which may involve making phone calls and/or sending text (e.g., short messaging service (SMS)) messages to primary and/or secondary contacts to attempt to obtain more information before dispatching. In many cases, this process results in police being dispatched to the monitored location despite the alarm having been triggered for an innocuous reason, such as a pet or other animal, a visiting neighbor, trees moving in strong winds, delivery personnel, a door-to-door salesperson, etc., rather than an actual security concern. As used herein, a "security concern" may refer to any circumstance that a customer is likely to consider unacceptable from a safety, security, or well-being perspective, such a burglary attempt, package theft attempt, a vandalism attempt, a stranger peering through windows, etc.

In such existing security systems, records of events relating to events detected by the system (referred to herein as "records") are typically queued for review in an order of occurrence, e.g., on a first-in-first-out basis, and an effort is made to distribute the queued records evenly across all the available monitoring agents. These types of security systems may be incapable of/inefficient at performing monitoring of certain systems that result in higher volumes of records and/or that demand various rates of review and response times (e.g., involving varying levels of security concerns, such as a first record relating to a neighbor's child retrieving a toy from the lawn and a second record relating to a stranger approaching the backdoor of a property while carrying a weapon). For instance, one goal of an outdoor monitoring system may be to quickly alert monitoring agents about security events detected by outdoor cameras so as to enable the monitoring agents to intervene and prevent incidents from escalating, if necessary, such as by stopping a would-be intruder from entering a residence. As such outdoor monitoring systems may generate a very large quantity of records of events of disparate types, employing a first-in-first-out queue to assign events to monitoring agents can be unworkable and/or difficult to implement in a cost-effective manner, as a very large number of monitoring agents would be needed to review the high volume of records quickly enough to intervene, when needed, in an effective manner. Further, existing security systems generally have only a manual capability to redistribute work from one monitoring agent to another, or do not redistribute the records at all, and are thus incapable of automatically redistributing work amongst monitoring agents due to a varying volume of records, a change in availability of monitoring agents, etc. Finally, existing approaches for presenting information to monitoring agents for review may be inadequate for certain types of security systems, such as an outdoor monitoring system in which it can be important for a monitoring agent to decide in a matter of seconds whether to engage with an individual to attempt to thwart a potential security situation.

Offered is a security system that may be configured to (1) minimize the burden on monitoring agents by determining that certain records do not require review by a monitoring agent (e.g., based on data in the record or associated contextual data meeting one or more criteria) or as being related to the same incident as another record that is already being reviewed, thus causing the system to refrain from assigning such records to monitoring agents for review and/or "pulling," e.g., unassigning, such records from monitoring agents to whom they were previously assigned; (2) prioritize records (e.g., based on a likelihood that the record relates to a security concern or other activity of interest to a customer, such as a utility worker approaching the property, etc., and/or a relative age of the record) and control the distribution of event records to monitoring agents for review (and/or annotate records that have already been distributed to monitoring agents) based on the determined priority and/or determined threat scores; (3) assign and/or reassign records to monitoring agents for review based on the current volume of records in need of review by monitoring agents, the current availability of monitoring agents, and/or the qualifications of the monitoring agents who are available; and/or (4) distilling and combining disparate sources of live and/or historical contextual information about a monitored location and presenting an interactive user interface to a monitoring agent that allows the monitoring agent to quickly acquire additional information about a live event (e.g., while viewing one or more live video feeds from the monitored location) in a way that reduces the cognitive load on the monitoring agent and facilitates prompt, accurate decision making with respect to the event in question.

In some implementations, the security system may be configured to implement functionality (1) noted above by employing a filtering process to identify certain records that do not require review by a monitoring agent based on, for example, content of the records (e.g., indicators of detected features in captured images) and/or one or more items of contextual data of the security system (e.g., whether the system is armed, in a snoozed state, etc.) and/or by grouping certain records with other records that are already being or have previously been reviewed by monitoring agents.

In some implementations, the security system may be configured to implement functionality (2) noted above by assigning priorities, such as, levels, scores, etc., to individual records to ensure timely review of the records that are most likely to represent actual security concerns and/or other activities of interest to a customer. Such priorities may be determined, for example, based on certain content of the record (e.g., indicators of detected features in captured images, a timestamp indicating when an event was detected, etc.) and/or one or more items of contextual data (e.g., historical events occurring at the monitored location, region-specific crime data, the type, performance characteristic(s), and/or connection quality of a camera that detected the event, etc.). In some implementations, such prioritization may be performed on an ongoing basis as new data becomes available and the determined priorities, such as levels, scores, etc., may be adjusted as further information about the incident to which the record relates is acquired, further features are identified within the image(s) of the record, previously identified features within the images of the record are reclassified, and/or contextual data of the security system 100 changes.

In some implementations, the security system may implement functionality (3) noted above by assigning, unassigning, and/or reassigning records across multiple monitoring agents based on, for example, content of the records (e.g., types of features detected in captured images, priority levels/scores assigned to the records, geographic location identifiers for the records, the current status of the records, etc.) and/or one or more items of contextual data of the security system, such as a quantity of records that are in need of review by monitoring agents, a number of monitoring agents that are currently using the system, a quantity of reviewing slots (described below) that are active within the system, a quantity of reviewing slots to which records have not already been assigned, and/or the qualifications of the monitoring agents to review records (e.g., by preferably assigning at least certain types of records for review by more experienced monitoring agents or by regulating the types of records that can be assigned to monitoring agents having particular qualifications or limitations).

In some implementations, the security system may implement functionality (4) noted above by generating a robust and interactive user interface (UI) for monitoring agents to review live events. For example, in some implementations, the user interface may present, together with one or more windows showing live video feeds from cameras at a given monitored location, one of more of: (A) annotated thumbnail images concerning certain features detected in images from event(s), (B) information concerning previous events that occurred at the monitored location, (C) information concerning notifications that were sent to customers concerning previous events, (D) images of one or more faces of individuals allowed to be at the monitored location, (E) historical notes made by one or more agents concerning events at the monitored location, (F) data concerning the customer, such as the address of the monitored location, a safe word set by the customer, (G) an indication of the current monitoring status of the monitored location (e.g., "off," "home," "away," "snoozed"), (H) an indication of the most recently calculated threat score for the event under review, etc. Further, in some implementations, some or all forgoing information may be presented in the form of or in association with UI elements that, when selected, can yield further information and/or functionality that can significantly enhance the monitoring agent's ability to quickly and effectively assess the security risk presented by an incident under review. As one example of such interactivity, in some implementations, selection of a thumbnail image or other UI element corresponding to a feature detected in an image may cause the security system to play back recorded video that includes the image in which the feature was detected, e.g., beginning shortly prior the image frame in which the feature was detected.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

A. SYSTEM OVERVIEW

FIG. 1 shows example components of a security system 100 configured in accordance with some embodiments of the present disclosure as well as example interactions or data flows that may take place amongst such components. As shown in FIG. 1, the security system 100 may include, among other components, one or more cameras 102 disposed at a monitored location 104 (e.g., a residence, business, parking lot, etc.), and a monitoring service 106 (e.g., including one or more servers 108) located remoted from the camera(s) 102, e.g., within a cloud-based service, such as the surveillance center environment 926 described below in Section G (in connection with FIG. 9). As described below in connection with FIGS. 7A and 8A, the security system 100 may additionally include one or more monitoring devices 714 operated by monitoring agents 716. An example computing system 1100 that may be used to implement any of the computer-based components disclosed herein, e.g., the camera 102, the server(s) 108, the monitoring device(s) 714, and/or the customer device(s) 902 is described below in Section I (in connection with FIG. 11). Although not illustrated in FIGS. 1, 7A and 8A, it should be appreciated the various illustrated components may communicate with one another via one or more networks, e.g., the Internet.

As shown in FIG. 1, a camera 102 may include, among other components, a motion sensor 130, an image sensor 118, and an edge image processing component 120. In some implementations, the camera 102 may include one or more processors and one or more computer-readable mediums, and the one or more computer-readable mediums may be encoded with instruction which, when executed by the one or more processors, cause the camera 102 to implement some or all of the functionality of the edge image processing component 120 described herein. In some implementations, some or all of such components of the camera 102 may be included in or otherwise supported by a housing (not illustrated).

As also shown in FIG. 1, the monitoring service 106 may include, among other components, a remote image processing component 122, an event filtering and grouping component 132, an event prioritization component 134, an event distribution component 136, one or more contextual datastore(s) 142, and one or more event/video datastore(s) 124. In some implementations, the server(s) 108 of the monitoring service 106 may include one or more processors and one or more computer-readable mediums, and the one or more computer-readable mediums may be encoded with instruction which, when executed by the one or more processors, cause the server(s) 108 to implement some or all of the functionality of the remote image processing component 122, the event filtering and grouping component 132, the event prioritization component 134, and/or the event distribution component 136 described herein.

As indicated by arrows in FIG. 1, the remote image processing component 122, the event filtering and grouping component 132, the event prioritization component 134, and the event distribution component 136 may all be in communication with the contextual datastore(s) 142 and the event/video datastore(s) 124, e.g., via one or more networks, such as the network 920 described below in Section G (in connection with FIG. 9). In some implementations, the monitoring service 106 or another component within the surveillance center environment 926 (see FIG. 9) may provide one or more application programming interfaces (APIs) that can be used by the edge image processing component 120, the remote image processing component 122, the event filtering and grouping component 132, the event prioritization component 134, and the event distribution component 136 to write data to the event/video datastore(s) 124 and the contextual datastore(s) 142 and/or fetch data from the event/video datastore(s) 124 and the contextual datastore(s) 142, as needed.

As illustrated in FIG. 1, the image sensor 118 may acquire images 110 (e.g., digital data representing one or more acquired frames of pixel values) from the monitored location 104 and pass such images 110 to the edge image processing component 120 for processing. In some implementations, for example, the motion sensor 130 may detect motion at the monitored location 104 and provide a signal to the image sensor 118. The motion sensor 130 may, for example, be a passive infrared (PIR) sensor. In response to receiving a signal from the motion sensor 130, the image sensor 118 may begin acquiring frames of images 110 of a scene within the camera's field of view. In some implementations, the image sensor 118 may continue collecting frames of images 110 until no motion is detected by the motion sensor 130 for a threshold period of time (e.g., twenty seconds). As a result, the images 110 acquired by the image sensor 118 may be a video clip of a scene within the camera's field of view that begins when motion was first detected and ends after motion has ceased for the threshold period of time. The foregoing implementation, in which a motion sensor 130 is used to trigger the collection of images by the image sensor 118 may help reduce power consumption by the camera 102 and may thus be particularly useful in a circumstance in which the camera 102 is powered using a battery (not illustrated).

In some implementations, rather than relying upon a motion sensor 130 (e.g., a PIR sensor) to trigger the collection of frames of images 110, the camera 102 may instead continuously collect frames of images 110 and rely upon one or more image processors (e.g., machine learning (ML) models and/or other computer vision (CV) processing components) of the edge image processing component 120 to process the collected frames to detect motion within the field of view of the camera 102. Accordingly, in such implementations, rather than relying upon a motion indication provided by a motion sensor 130 to determine the start and end of a video clip for further processing, the camera 102 may instead rely upon a motion indication provided by such image processor(s) for that purpose. The foregoing implementation, in which an image sensor image sensor 118 continuously collects frames of images 110 may be particularly useful in implementations in which the camera 102 receives power from an external power source (e.g., an alternating current (AC) outlet, a solar panel, etc.)

The edge image processing component 120 may include one or more image processors (e.g., ML models and/or other CV processing components) to identify features (e.g., motion, persons, objects, etc.) within the images 110, and the remote image processing component 122 may include one or more different image processors (e.g., ML models and/or other CV processing components) to identify features within the images 110. The image processors may, for example, process images 110 to detect motion, to identify people, to identify faces, to identify objects, to perform facial recognition, etc. In some implementations, the processing power of the server(s) 108 employed by the monitoring service 106 may be significantly greater than that of the processor(s) included in the edge image processing component 120, thus allowing the monitoring service 106 to employ more complex image processors and/or to execute a larger number of such image processors in parallel.

As shown in FIG. 1, the edge image processing component 120 may generate edge processing results 112 corresponding to one or more identified features of the images 110 (and, optionally, the images 110 themselves) and may send the edge processing results 112 to the event/video datastore(s) 124 so as to cause the event/video datastore(s) 124 to generate a new record for a particular event (e.g., by creating a new row within a table 202—described below in connection with FIG. 2) and store data for the event within that record. In some implementations, the edge processing results 112 may include metadata for the event, such as an identifier for the event, a timestamp representing when the event occurred, an identifier for a customer who resides at or otherwise has permission to enter the monitored location 104, an identifier for the monitored location 104, a geographic latitude of the monitored location 104, an identifier for the camera 102 that captured the images 110, etc.

As noted above, in some implementations, the event/video datastore(s) 124 may include the table 202 (see FIG. 2) that includes rows of data representing records of respective detected events. Although the table 202 is depicted as a single table in FIG. 2, it should be appreciated that it may instead include multiple tables that are linked together or cross-reference one another in a suitable fashion. Individual columns of the table 202 may represent an item or piece of data or metadata associated with the record represented in the corresponding row (e.g., a unique identifier for the event, a timestamp for the event, images for the event and/or a pointer to a location at which images for the event are stored, an identifier of a monitored location 104 to which the record relates, an identifier of a customer who resides at or otherwise has permission to enter the monitored location 104, an identifier of a camera 102 that captured the images for the event, a priority indicator, such as a level, score, etc., for the event, etc. In some implementations, the table 202 may represent a compilation of records for a large number of events detected by the security system 100, including records that need to be assigned to monitoring agents 716 for review (referred to herein as "queued" records), records that have been assigned to monitoring agents 716 for review, and records that have been handled/canceled by monitoring agents 716 or as a result of automated processing performed by the security system 100. Additional details concerning the example table 202 are described below in connection with FIG. 2.

As can be seen in FIG. 1, and further discussed below, various component(s) of the security system 100 may be configured to access (e.g., perform read/write operations from/to) the event/video datastore(s) 124, such as to retrieve information (e.g., images, metadata, etc.) from a record and/or to store modified/new information to a record. The various items of data included within a record stored in the event/video datastore(s) 124 are sometimes referred to herein as "record content."

In some implementations, one or more components of the security system 100 may retrieve some or all of the content from a record stored by the event/video datastore(s) 124 in response to receiving an indication of a change or modification to a record. As such, in some such implementations, one or more of the components of the security system 100 may be configured to retrieve content from a record stored by the event/video datastore(s) 124 (e.g., to perform their configured—for processing) any time new/modified information has been written to that record, e.g., based on receiving an indication that the new/modified information has been written to that record. Additionally or alternatively, in some such implementations, one or more of the components of the security system 100 may be configured to retrieve content from a record stored by the event/video datastore(s) 124 (e.g., to perform their configured—for processing) when particular new/modified information has been written to a particular portion (e.g., a particular column) of that record, e.g., based on receiving an indication that the particular information has been written to that particular portion of the record, as is discussed below. In some implementations, one or more components of the security system 100 may be similarly configured to retrieve contextual data from the contextual datastore(s) 142 when particular new/modified information has been added to the contextual datastore(s) 142, e.g., based on receiving an indication of change or modification to the contextual datastore(s) 142, as described in more detail below. As such, the component(s) of the security system 100 may process at least partially in a nonsequential manner and/or one or more components of the security system 100 may process at least partially in parallel to and/or concurrently with one or more other components of the security system 100, as is further discussed below.

In some implementations, indication(s) that new/modified information has been written to a record stored by the event/video datastore(s) 124 and/or the contextual datastore(s) 142 may be provided by the event/video datastore(s) 124 and/or the contextual datastore(s) 142, respectively, and/or one or more of the components of the security system 100 (e.g., the components that stored the new/modified information in the event/video datastore(s) 124 and/or the contextual datastore(s) 142).

In other implementations, indication(s) that new/modified information has been written to a record stored by the event/video datastore(s) 124 and/or the contextual datastore(s) 142 may additionally or alternatively be received from one or more event handlers (also referred to as event listeners) configured to detect when data for a record has been sent to the event/video datastore(s) 124 and/or the contextual datastore(s) 142 and/or has been received from the security system 100 generally (e.g., as a global indication). In such implementations, the event handler(s) may be registered to receive notifications when data has been written to the event/video datastore(s) and/or the contextual datastore(s) 142 and, in response to receiving such notifications, the event handler(s) may notify one or more components of the security system 100 that the data has been added to the table 202 and/or the contextual datastore(s) 142. In some such implementations, one or more event handlers may be registered to receive a notification when particular data has been written to a portion (e.g., column) of the record and/or the contextual datastore(s) 142 and, in response to receiving such notification, the event handler(s) may notify one or more particular components of the security system 100 that such data has been added to the table 202 and/or the contextual datastore(s) 142. For example, an event handler may be registered to identify when new/additional images have been added to the table 202 (e.g., as images 214) and, in response, may notify the remote image processing component 122 about the addition of those images, as discussed below. For further example, an event handler may be registered to identify when a system state for the security system 100 is changed in a profiles datastore(s) 142A (shown in FIG. 4A) corresponding to one or more of the contextual datastore(s) 142 and, in response, may notify the event filtering and grouping component 132 of that state change, as discussed below. As another example, an event handler may be registered to identify when an indication of the availability of a monitoring agent 716 has changed (e.g., the monitoring agent has freed up a review slot) in a monitoring agent datastore(s) 142C (shown in FIG. 6A) corresponding to one or more of the contextual datastore(s) 142 and, in response, may notify the event distribution component 136 about that change, as discussed below. The recipient components may perform their configured—for processing using the retrieved information and, if new/modified information is determined/generated, send the modified/new information to the event/video datastore(s) 124 (e.g., to modify/add to the content in the row of the table 202 corresponding to the record) and/or the contextual datastore(s) 142. Furthermore, modifying/adding of the content for a record and/or the contextual datastore(s) 142 in such fashion may further trigger one or more of the other components of the security system 100 to retrieve the new/modified information, as discussed herein.

FIG. 2 shows an example table or data structure of events 202 that may be used to store the records for various events detected by the security system 100. As shown, for individual events, the table 202 may be populated with data representing, among other things, an event identifier (ID) 204, a timestamp 206, a user ID 208, a location ID 210, a camera ID 212, images 214, feature indicators 216, an event type 218, a system state 220, a filtering control 222, an event status 224, an event disposition 226, a priority 228, and an agent ID 230.

The event IDs 204 may identify the different events that the security system 100 has detected, and the data in the same row as a given event ID 204 may correspond to that same event.

The timestamps 206 may indicate times at which the corresponding events were detected.

The user IDs 208 may represent the customers to whom the detected events relate (e.g., the customer who resides at or otherwise has permission to enter a monitored location 104 at which an event was detected).

The location IDs 210 may identify the monitored locations (e.g., the monitored location 104) at which the events were detected.

The camera IDs 212 may represent the cameras (e.g., the camera 102) that recorded one or more images of the detected events.

The images 214 may represent one or more images (e.g., snapshots or video streams) that were acquired by the cameras (e.g., the images 110 acquired by the camera 102 shown in FIG. 1) identified with the camera IDs 212 when the events were detected. In some implementations, the images 214 may include objects containing links or pointers to such image(s).

The feature indicators 216 may include information concerning one or more features identified in the images 214 for a record, e.g., features identified by the edge image processing component 120 and/or the remote image processing component 122. Such information may include, for example, indicators of motion detected in the images 214, indicators of people detected in the images 214, indicators of faces detected in the images 214, indicators of weapons detected in the images 214, etc. Various ways in which the feature indicators 216 can be used by one or more components of the monitoring service 106 to enhance the operability of the security system 100 are described below.

The event types 218 may indicate how the event was detected or the type of component that triggered detection of the event. For example, the value "ET1" for an event type 218 in the table 202 may correspond to "outdoor camera activity" if the event corresponding to the event ID 204 having a value of "E1" was detected by the camera 102 and the camera 102 was positioned outside.

The system state 220 may indicate a state of a local monitoring system at the time of the event (e.g., "off," "home," "away," "armed," and/or temporarily disabled or "snoozed," etc.). In some implementations, the system state 220 may indicate an operational state of the local monitoring system when the event was detected (e.g., that the local monitoring system was "armed" when the event occurred). The system state 220 may be determined and/or set in any of a number of ways. For example, referring to FIG. 9, in some implementations, a user may operate a customer application 904 on a customer device 902 and/or a keypad 908 to adjust the system state 220.

The filtering controls 222 may be binary indicators (e.g., true or false, "yes" or "no," "filtered" or "not filtered," "1" or "0" timestamp or "null," etc.) representing whether the records have been designated as "filtered," e.g., as result of processing by the event filtering and grouping component 132, as described below in connection with FIGS. 4A-C. In some implementations, such binary indicators may identify times at which the event filtering and grouping component 132 designated the records as filtered (e.g., using a timestamp). In other implementations, timestamps indicating times at which respective events were designated as filtered may be populated in separate columns of the table 202. As described in more detail below in connection with FIGS. 6A-E, in some implementations, the value of the filtering control 222 may determine whether the event distribution component 136 assigns such records to monitoring agents 716 for review or unassigns such records from monitoring agents 716 to whom they were previously assigned. In some implementations, the filtering control 222 may be turned off when records are initially written to the event/video datastore(s) 124, thus causing them to be initially designated as "unfiltered."

The event statuses 224 may represent the state of the security system's 100 processing with respect to individual records. For example, an event status 224 for a record may indicate that the record is active and in need of further processing (e.g., "new"), is awaiting review by a monitoring agent 716 (e.g., "assigned"), is being actively being reviewed by a monitoring agent (e.g., "reviewing"), has been marked as "canceled" or "handled" (e.g., by a monitoring agent 716 or automatically by the event filtering and grouping component 132), has "expired," has resulted in emergency "dispatch" services, and/or is on "hold" (e.g., has been grouped with a similar, related record that is currently being reviewed by a monitoring agent 716). The various components of the security system 100 may recognize certain event statuses 224 (e.g., "new," "assigned," "reviewing," and "hold") as corresponding to "active" records, e.g., records that are to be subjected to further automated processing by one or more components of the security system 100, and may recognize other event statuses 224 (e.g., "canceled," "handled," "expired," or "dispatch") as corresponding to "inactive" records, e.g., events that do not require further automated processing by the security system 100.

Further, as described in more detail in connection with FIGS. 6A-D, some of the processing performed by the event distribution component 136 may be performed only for "queued" records, e.g., records that are in need of review by a monitoring agent 716 but have not yet been assigned to a monitoring agent 716 for review. In some implementations, the active records in the event/video datastore(s) 124 that have an event status 224 of "new" (as opposed to "assigned," "reviewing" or "hold") and that have a filtering control 222 indicating the record has not been marked as filtered may be considered "queued" records. The collection of records having such characteristics is sometimes referred to herein as the "record queue" or simply the "queue." Still further, as explained below in connection with FIGS. 4B and 4C, in some implementations, the event filtering and grouping component 132 may mark a record as handled by the security system 100 in various circumstances, such as when the filtering control 222 for the record has been marked as filtered for more than a threshold amount of time (e.g., five minutes), thus effectively labeling that record as "inactive."

The event dispositions 226 may represent the disposition of the incident in question following review by one or more monitoring agents 716 and/or a customer, such as that the incident was an "emergency" situation (e.g., when a life threatening or violent situation took place) or an "urgent" situation (e.g., package theft, property damage, or vandalism), that the incident was "handled" by the monitoring agent 716, that the police or fire department was "dispatched" to address the incident, that review of the incident was "canceled" after a person accurately provided a safe word or other identifying information, that review of the incident was "canceled" by the customer (e.g., via the customer application 904 shown in FIG. 9), etc. In some implementations, the noted event dispositions 226 may be used, for example, to determine whether to send a notification (e.g., a push notification, SMS message, email, etc.) to the customer, whether to tag the record for review by the customer, etc.

The priority 228 may, for example, be a numerical value (e.g., a priority level or score) representing a determined relative degree of urgency for reviewing that record. In some implementations, the priority 228 may take into account both the likelihood that the occurrence of an event represents an actual security concern or other activity of interest to a customer, and the relative age of the event (e.g., how long in the past it occurred), thus ensuring timely review of all records with weight being given to those records that are most likely to represent actual security concerns or other activities of interest.

The agent IDs 230 may identify monitoring agents 716 that have been selected to review individual records (e.g., the monitoring agents 716 to which the event distribution component 136 has assigned such records, such as described below in connection with FIGS. 6A-E). The agents ID 230 may further identify particular review slots for the identified monitoring agents 716 who are to review the records. As described in more detail below in connection with FIGS. 7A and 7B, such a review slot may correspond, for example, to a particular event window 706 on a screen of the monitoring device 714 in which information corresponding to the record is to be reviewed.

Although not illustrated in FIG. 2, it should be appreciated that the table 202 may additionally include other data that can be used for various purposes, such as an indication of the geographic location/coordinates of the monitored location 104, descriptions of the records (e.g., "Back Yard Camera Detected Motion"), actions taken by monitoring agents 716 while reviewing information corresponding to records, one or more recorded audio tracks for the record, status changes of one or more sensors (e.g., door lock sensors) at monitored locations 104, etc.

In some implementations, the table 202 may additionally include various contextual information relating to the detected event, which may be determined/retrieved from the contextual datastore(s) 142 by one or more components of the security system 100 and added to the table 202, such as whether the camera 102 is currently being monitored, a time period during which the camera 102 is to be monitored, recognized faces for the monitored location 104, a type, performance characteristics, and/or connection quality of the camera 102, historical records for the monitored location 104, similar related events that have been grouped with the current event, metadata indicating a geographic location/coordinates of the monitored location 104 (e.g., local crime information), etc. As discussed herein, the data within the records represented in the table 202 may be added or modified by one or more components of the security system 100 as such component(s) perform their configured—for processing.

Referring once again to FIG. 1, similar to the edge image processing component 120, the remote image processing component 122 may perform processing on the images (or portions of the images, e.g., one or more frames identified by the edge image processing component 120) acquired by the camera 102 to identify one or more features. In some implementations, the processing performed by one or more of the image processors of the edge image processing component 120 may be used to inform and/or enhance the processing that is performed by one or more of the image processors of the remote image processing component 122.

As one example, one or more of the image processors of the edge image processing component 120 may perform initial processing to identify key frames within the images that potentially represent motion, people, faces, etc., and one or more of the image processors of the remote image processing component 122 may perform additional processing only on the key frames that were identified by the one or more image processors of the edge image processing component 120. As another example, one or more of the image processors of the edge image processing component 120 may perform processing on the images to identify particular frames that include motion, and one or more of the image processors of the remote image processing component 122 may perform processing to detect people only on the particular frames that were identified by the one or more image processors of the edge image processing component 120. As yet another example, one or more of the image processors of the edge image processing component 120 may perform processing on the images to identify particular frames that include images of people, and one or more of the image processors of the remote image processing component 122 may perform processing to detect and/or recognize faces only on the particular frames that were identified by the one or more image processors of the edge image processing component 120. As still another example, one or more of the image processors of the edge image processing component 120 may perform processing on the images to identify particular frames that include images of faces, and one or more of the image processors of the remote image processing component 122 may perform processing to perform enhanced face recognition and/or recognize faces only on the particular frames that were identified by the one or more image processors of the edge image processing component 120. Further, in some implementations, the remote image processing component 122 may itself perform processing using multiple different image processing models, where certain of the image processors are dependent on the results obtained by one or more other image processors.

B. THE IMAGE PROCESSING COMPONENT(S)

As shown in FIG. 1, in some implementations, the remote image processing component 122 may be a software application that is executed by one or more processors of the monitoring service 106. For example, as noted in Section A, in some implementations, the server(s) 108 of the monitoring service 106 (see FIG. 1) may include one or more computer-readable mediums encoded with instructions which, when executed by one or more processors of the server(s) 108, cause the server(s) 108 to implement the functionality of the remote image processing component 122 described herein.

As shown in FIG. 1, the remote image processing component 122 may receive content 152 of a record stored in the event/video datastore(s) 124 (e.g., some or all of the data from a row of the table 202). The content 152 may include, for example, one or more images (e.g., still images and/or video) or pointers to one or more locations at which such image(s) are stored, and possibly other data from the record, such as an identifier for the record, indicators of identified features within images for the record, a timestamp representing when an event was detected, an identifier for a customer who resides at or otherwise has permission to enter the monitored location 104, an identifier for the monitored location 104, an identifier for the camera 102 that captured the images, etc. As discussed above, in some implementations, the remote image processing component 122 may retrieve the content 152 in response to receiving an indication or otherwise determining that a record stored in the event/video datastore(s) 124 has been added or modified. For example, the remote image processing component 122 may receive such an indication (e.g., from the event/video datastore(s) 124, an event handler, or the edge image processing component 120) any time one or more images 214 are added to or modified for a record.

As shown in FIG. 1, in some implementations, the remote image processing component 122 may further receive data 154 from the contextual datastore(s) 142. In some implementations, the data 154 may include, for example, information from one or more profiles corresponding to the monitored location 104 and/or a customer, and such information may be used to enhance or improve the processing performed by the remote image processing component 122. As one example, the data 154 may include one or more biometric embeddings for known individuals (e.g., corresponding to profiles created for such individuals) that may be used, for example, to perform facial recognition. As another example, the data 154 may identify the geographic latitude of the monitored location 104, and the identified geographic latitude may be used to select an ML model that takes into account the daylight hours and/or possible weather effects (e.g., snow) that are commonly encountered at the identified latitude, or may be provided as an input feature to an ML model that was trained using geographic latitude as one of its input features. As discussed above, in some implementations, the remote image processing component 122 may receive the data 154 in response to a change or modification to the contextual datastore(s) 142. In some implementations, the remote image processing component 122 may retrieve the data 154 from the contextual datastore(s) 142 in response to an event.

The remote image processing component 122 may process the images (and possibly other data) included within, or pointed to by, the content 152 received from the event/video datastore(s) 124 (and optionally, the data 154 received from the contextual datastore(s) 142) to detect and/or confirm the presence of one or more features (e.g., motion, people, faces, recognized faces, etc.) within such images. The remote image processing component 122 may generate one or more feature indicators 156 corresponding to the identified feature (s) and cause such indicator(s) 156 to be added to the record for the event, e.g., by writing them to the row of the table 202 corresponding to the event (e.g., as feature indicators 216).

In some implementations, the feature indicators 216 may be sent to the event/video datastore(s) 124 as they are generated by the remote image processing component 122 (e.g., as features are detected/confirmed within the images that are included within, or pointed to by, the content 152 received from the event/video datastore(s) 124). For example, the remote image processing component 122 may generate and send to the event/video datastore(s) 124, at a first time, a first feature indicator 216 corresponding to an identified person and may generate and send to the event/video datastore(s) 124, at a second time, after the first time, a second feature indicator 216 corresponding to an identified face.

Figure 3:
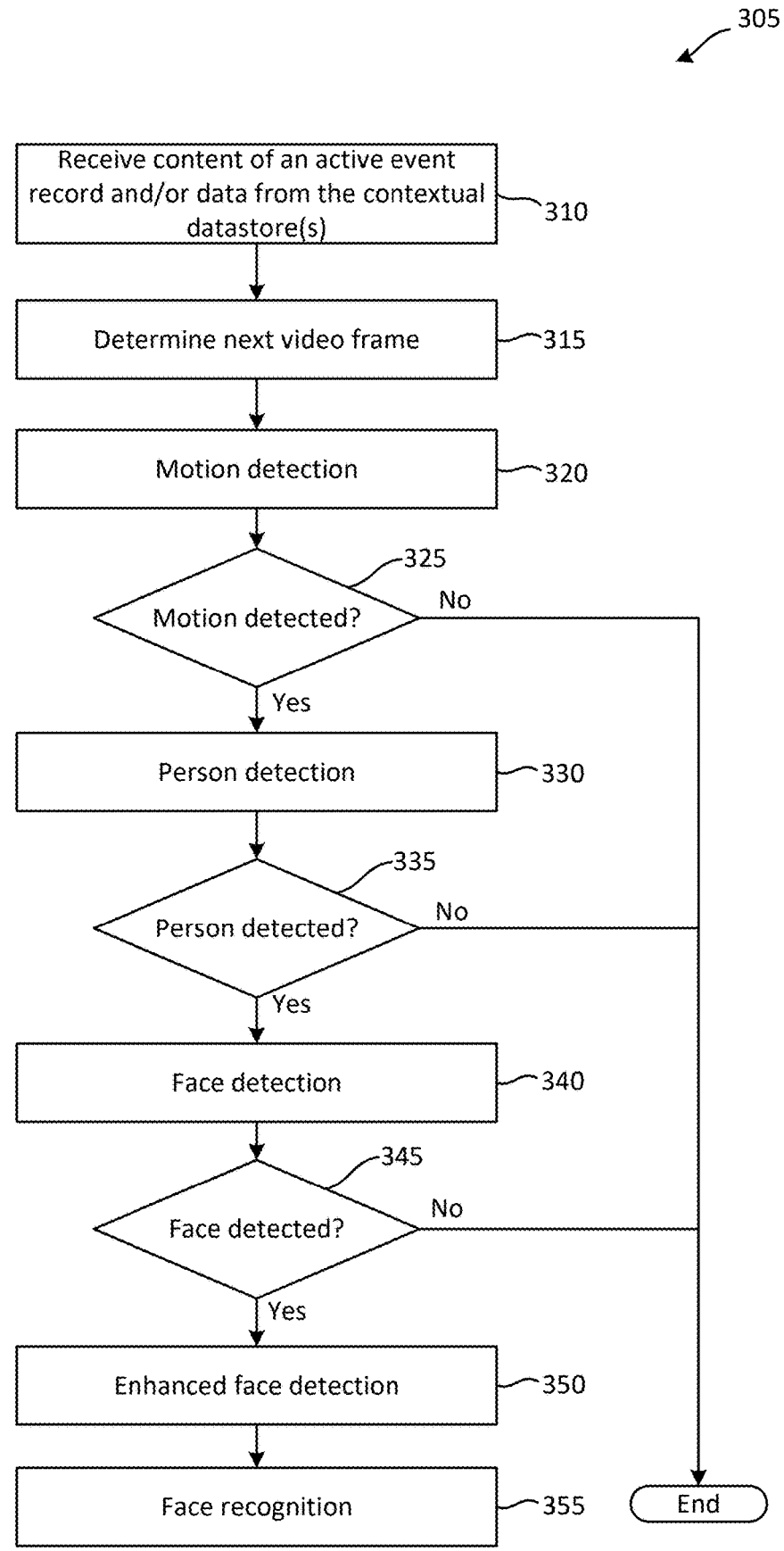
FIG. 3 shows an example process for performing dependent image processing, according to some implementations of the present disclosure.

FIG. 3 is a flow chart showing an example process 305 that may be employed by the remote image processing component 122 to perform dependent image processing in accordance with some implementations of the present disclosure. As shown in FIG. 3, the process 305 may begin at a step 310, at which the remote image processing component 122 may receive content 152 from an active record within the event/video datastore(s) 124 and may optionally also receive data 154 from the contextual datastore(s) 142. As noted above in connection with FIG. 2, in some implementations, a record in the table 202 may be considered "active" if it has an event status 224 of "new," "assigned," "reviewing," or "hold." As described in Section A, the remote image processing component 122 may identify active records in need of processing in any of numerous ways and may, for instance, retrieve the content 152 and/or the data 154 from the datastore(s) 124, 142 in response to receiving a notification or otherwise determining that the content 152 and/or the data 154 has changed in a potentially relevant way.

At a step 315, the remote image processing component 122 may determine a next frame of recorded video that is included within, or pointed to by, the content 152 received from the event/video datastore(s) 124. In some implementations, for example, the content 152 may include, or point to, a sequence of frames of video, and the remote image processing component 122 may process those frames, or perhaps some subset of the frames (e.g., every tenth frame), in sequence, with the "next frame" determined at the step 315 corresponding to the next unprocessed frame in the sequence of frames.

At a step 320 of the process 305, the remote image processing component 122 may, for example, cause one or more first image processors to perform processing on the frame (and perhaps one or more adjacent or nearby frames) to determine whether the frame corresponds to a moving object. In some implementations, for example, motion may be detected by using one or more functions of the OpenCV library (accessible at the uniform resource locator (URL) "opencv.org") to detect a difference between frames that indicates an object represented in the frames was motion. When, at the step 320, the remote image processing component 122 determines that a frame includes an object that was in motion when the frame was acquired, the remote image processing component 122 may generate a feature indicator 216 indicative of the detected motion, and cause that feature indicator 216 to be added to the record for the event.

Per a decision 325, if the remote image processing component 122 determines that the frame does not correspond to a moving object, the process 305 may terminate. If, on the other hand, the remote image processing component 122 determines (at the decision 325) that the frame does correspond to a moving object, the process 305 may instead proceed to a step 330, at which the remote image processing component 122 may cause one or more second image processors to perform processing on the frame to determine whether the frame includes a person. One example of an ML model that may be used for person detection is YOLO (accessible via the URL "github.com"). When, at the step 330, the remote image processing component 122 determines that a frame includes a person, the remote image processing component 122 may generate a feature indicator 216 indicative of the detected person, and cause that feature indicator 216 to be added to the record for the event.

Per a decision 335, if the remote image processing component 122 determines that the frame does not include a person, the process 305 may terminate. If, on the other hand, the remote image processing component 122 determines (at the decision 335) that the frame does include a person, the process 305 may instead proceed to a step 340, at which the remote image processing component 122 may cause one or more third image processors to perform processing on the frame to determine whether the frame includes a face. One example of an ML model that may be used for face detection is RetinaFace (accessible via the URL "github.com"). When, at the step 340, the remote image processing component 122 determines that a frame includes a face, the remote image processing component 122 may generate a feature indicator 216 indicative of the detected face, and cause that feature indicator 216 to be added to the record for the event.

Per a decision 345, if the remote image processing component 122 determines that the frame does not include a face, the process 305 may terminate. If, on the other hand, the remote image processing component 122 determines (at the decision 345) that the frame does include a face, the process 305 may instead proceed to a step 350, at which the remote image processing component 122 may cause one or more fourth image processors to perform enhanced facial recognition processes to more accurately identify and locate the face in the frame. One example of an ML model that may be used for enhanced face detection is MTCNN_face_detection_alignment (accessible via the URL "github.com"). The remote image processing component 122 may then generate a new feature indicator 216 indicative of the results of the enhanced face detection, and cause that feature indicator 216 to be added to the record for the event, and/or may modify the feature indicator generated at the step 340 to include such a result.

Finally, the process 305 may proceed to a step 355, at which the remote image processing component 122 may perform facial recognition on the face detected in the frame, such as by generating biometric embeddings of the detected face and comparing those embeddings against a library of known faces (e.g., embeddings included in the data 154) to attempt to determine an identity of the person based on the identified face. One example of an ML model that may be used for facial recognition is AdaFace (accessible via the URL "github.com"). When, at the step 355, the remote image processing component 122 determines that a known face is represented in the frame, the remote image processing component 122 may generate a feature indicator 216 indicative of the recognized face, and cause that feature indicator 216 to be added to the record for the event.

It should be appreciated that, in some implementations, some or all of the steps of the process 305 may alternatively or additionally be performed by the edge image processing component 120 shown in FIG. 1, with the edge image processing component 120 generating one or more feature indicators 156 corresponding to identified feature(s) and causing such indicator(s) 156 to be added to the record for the event, e.g., by writing them to the row of the table 202 corresponding to the event (e.g., as feature indicators 216). It should also be appreciated that, in some implementations, rather than performing dependent image processing (e.g., shown in FIG. 3), the edge image processing component 120 and/or the remote image processing component 122 may instead use one or more ML models and/or other computer vision (CV) processing components to perform image processing of one or more the types described, or perhaps other types of image processing to identify one or more other feature types, in parallel or partially in parallel. In such implementations, the edge image processing component 120 and/or the remote image processing component 122 may generate feature indicators 156 indicative of the features detected by the respective components, and cause such feature indicators 216 to be added to records, as soon as they are generated by the respective ML models and/or other computer vision (CV) processing components. Additionally, as noted above, in some implementations, the edge image processing results received from the edge image processing component 120 may be used to enhance the image processing that is performed by the remote image processing component 122, such as by identifying one or more key frames that are to be further processed by the remote image processing component 122.

In some implementations, the edge image processing component 120 and/or the remote image processing component 122 may additionally or alternatively be configured to identify circumstances in which the same feature is detected in images repeatedly over a short period of time, e.g., by detecting the same feature more than a threshold number of times within a given number of consecutive image frames and, in response to identifying such a circumstance, may add a feature indicator 216 to a record indicative of such a determination. As discussed below in connection with FIGS. 4A-C, the presence of a feature indicator 216 of this type may be indicative of an innocuous trigger for an event, e.g., heavy rain or trees moving in the wind, and, in some implementations, may be used by the event filtering and grouping component 132 to mark such records as filtered so that those records need not be reviewed by monitoring agents 716 (shown in FIGS. 7A and 7B).

Further, in some implementations, edge image processing component 120 and/or the remote image processing component 122 may additionally or alternatively employ one or more ML models and/or other computer vision (CV) processing components configured to perform person reidentification, such as by comparing images of multiple records to identify instances in which the same person/face appeared in images that were acquired for events that occurred within a relatively short time period (e.g., five minutes) of one another. One example of an ML model that may be used for person reidentification is Torchreid (accessible via the URL "github.com"). In some implementations, upon identifying such an instance, the edge image processing component 120 and/or the remote image processing component 122 may add a feature indicator 216 indicative of such a determination to the record(s) for the later detected event(s). As discussed below in connection with FIGS. 4A-C, the presence of a feature indicator 216 of this type may be indicative of a record that is substantively duplicative of another record (e.g., relating to an event involving the same person), and, in some implementations, may be used by the event filtering and grouping component 132 to mark such records as filtered records so that those records need not be reviewed by monitoring agents 716.

C. THE EVENT FILTERING AND GROUPING COMPONENT

As shown in FIG. 1, in some implementations, the event filtering and grouping component 132 may be a software application that is executed by one or more processors of the monitoring service 106. For example, as noted in Section A, in some implementations, the server(s) 108 of the monitoring service 106 (see FIG. 1) may include one or more computer-readable mediums encoded with instructions which, when executed by one or more processors of the server(s) 108, cause the server(s) 108 to implement the functionality of the event filtering and grouping component 132 described herein.

The event filtering and grouping component 132 may determine whether individual records stored in the event/video datastore(s) 124 are to be (A) flagged as not requiring review by a monitoring agent 716 (e.g., by setting the filtering control 222 for the record to "true," "filtered," or the like), (B) designated as "inactive," e.g., by changing the value of the event status 224 for a record to "handled," such that it will not be subjected to further processing by at least some components of the security system 100, or (C) placed on "hold" while another record related to the same incident is being evaluated (e.g., via real-time or near real time evaluation of streamed video) by a monitoring agent 716, thus minimizing the quantity of records that need to be reviewed by monitoring agents 716. In other words, the event filtering and grouping component 132 may determine whether individual records are to be "filtered out" from being assigned to one or more monitoring agents 716, such as by the event distribution component 136 (described below in connection with FIGS. 6A-E), whether individual records are to be "filtered out" from being further processed by various components of the security system 100, and/or whether individual records are to be "grouped" with other records (e.g., a record relating to a common incident or monitored location that is already being reviewed by a monitoring agent 716) so that multiple monitoring agents 716 do not end up reviewing the same incident at a monitored location 104.

As shown in FIG. 1, in some implementations, the event filtering and grouping component 132 may receive content 162 of the record (e.g., some or all of the data for the record within a row of the table 202) and/or may receive data 164 from the contextual datastore(s) 142. As discussed above in Section A, in some implementations, the event filtering and grouping component 132 may retrieve the content 162 in response to receiving an indication or otherwise determining that a record stored in the event/video datastore(s) 124 has been added or modified, and/or may retrieve the data 164 in response to receiving an indication or otherwise determining that information in contextual datastore(s) 142 that is relevant to the processing performed by the event filtering and grouping component 132 has been added or modified.

As illustrated in FIG. 1, based on the content 162 and/or the data 164, the event filtering and grouping component 132 may write one or more filtering/grouping indicators 166 to the record for the event in the event/video datastore(s) 124, such as by making an API call to write such filtering/grouping indicator(s) 166 to the row of the table 202 corresponding to the event (e.g., by adding or modifying a filtering control 222 or changing the value of the event status 224 to "handled" or "hold").

As noted above, the event filtering and grouping component 132 may add one or filtering/grouping indicators 166 to the record stored in the event/video datastore(s) 124 for an event, such as by making an API call to write such filtering/grouping indicator(s) 166 to the row of the table 202 corresponding to the event (e.g., by setting a filtering control 222 for the record or changing the event status 224 for the record to "handled" or "hold"). Such filtering/grouping indicators 166 may represent whether the records need to be reviewed by monitoring agents 716, whether the records need to be subjected to further processing by certain system components, and/or whether the records have been grouped with other records for related events. For example, in instances where the event filtering and grouping component 132 determines a record needs to be reviewed by a monitoring agent 716 (e.g., to not filter out the record), the event filtering and grouping component 132 may set the filtering/grouping indicator(s) 166 to indicate that the record is unfiltered (e.g., by setting a filtering control 222 for the record to "false," "no," "unfiltered," "0," "null," or the like). For further example, in instances where the event filtering and grouping component 132 additionally or alternatively determines that a record is to be grouped with another record, the event filtering and grouping component 132 may set the filtering/grouping indicator(s) 166 to indicate that the record has been grouped with the other record (e.g., by setting the event status 224 for the record to "hold"). As still another example, in instances where the event filtering and grouping component 132 determines the record for an event does not need to be reviewed by a monitoring agent 716 (e.g., to filter out the record), the event filtering and grouping component 132 may set the filtering/grouping indicator(s) 166 to indicate that the record is filtered (e.g., by setting the filtering control 222 for the record to "true," "yes," "filtered," "1," a timestamp corresponding to a time of day when the event filtering and grouping component 132 determined that the record was to be filtered out, or the like).

Figure 4A:
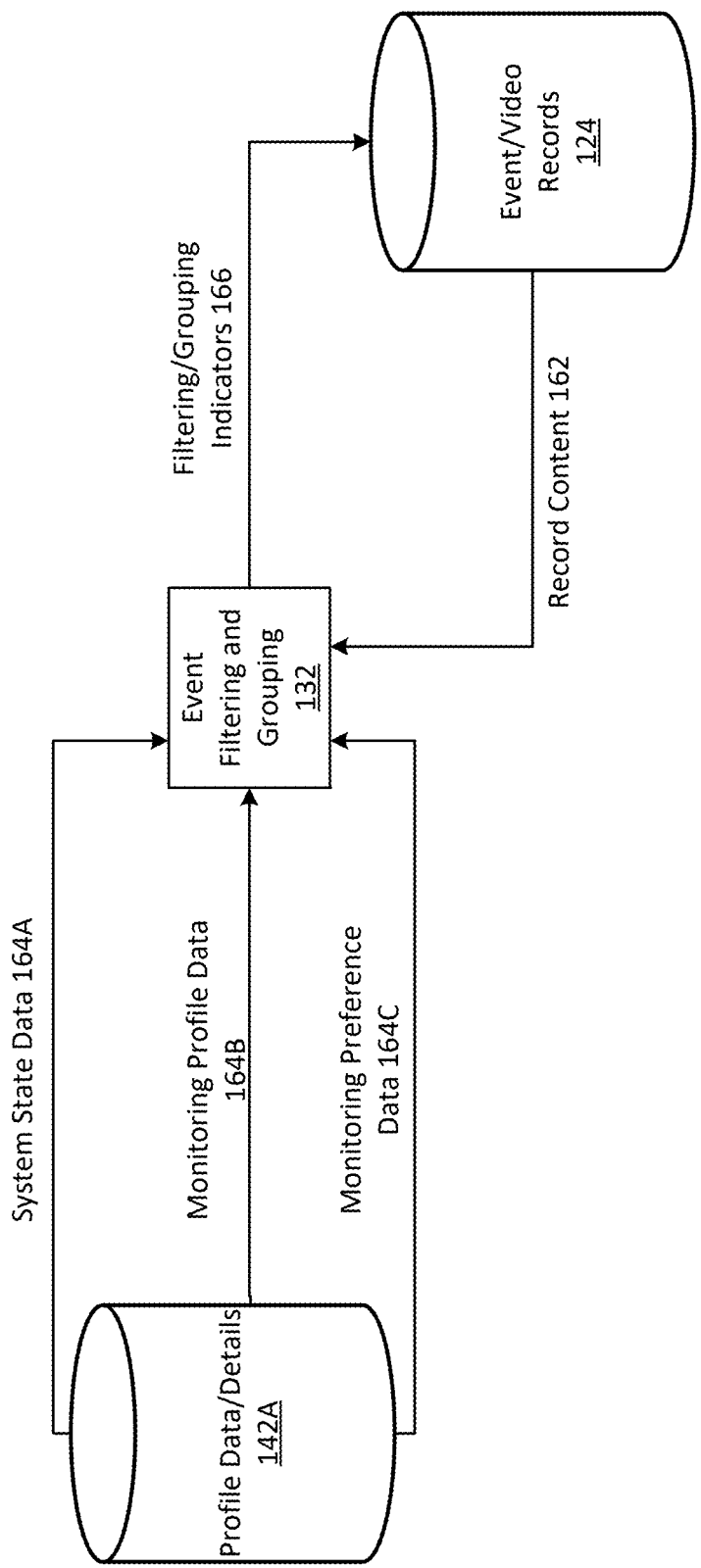
FIG. 4A shows example processing that may be performed by the event filtering and grouping component shown in FIG. 1, according to some implementations of the present disclosure.

FIG. 4A is a diagram illustrating example processing that may be performed by the event filtering and grouping component 132 in accordance with some of the implementations of the present disclosure. As shown, the event filtering and grouping component 132 may receive and process (e.g., "consider") various items of information when determining whether to generate one or more filtering/grouping indicator(s) 166 for a record, including the content 162 of the record received from the event/video datastore(s) 124, as well as system state data 164A, monitoring profile data 164B, and/or monitoring preference data 164C received from the contextual datastore(s) 142 (e.g., one or more datastores 142A including profile information for customers, monitored locations 104, etc.).

The profiles datastore(s) 142A shown in FIG. 4A may correspond, for example, to one or more of the contextual datastore(s) 142 shown in FIG. 1, and the system state data 164A, the monitoring profile data 164B, and the monitoring preference data 164C shown in FIG. 4A may correspond to respective portions of the data 164 shown in FIG. 1. In some implementations, the event filtering and grouping component 132 may retrieve the system state data 164A, the monitoring profile data 164B and/or the monitoring preferences data 164C using, for example, an identifier for the monitored location 104 at which the event occurred, an identifier for the customer who resides at or otherwise has permission to enter the monitored location 104, a timestamp indicating a time at which an event was detected at the monitored location 104, an identifier for the camera 102 that captured the images, or other information that may be included in the content 162 received from the event/video datastore(s) 124 for a record.

The system state data 164A may indicate, for example, an operational state of the security system 100 for the monitored location 104, thus allowing the event filtering and grouping component 132 to filter out certain records on that basis, as described in more detail below in connection with FIGS. 4B-C. The system state data 164A may indicate, for example, whether the security system 100 is currently "armed" at the monitored location 104 and/or whether the security system 100, or the camera 102 that captured the images, is currently in a "snoozed" state for the monitored location 104. As used herein, a security system 100 may be "armed" for a monitored location 104 when it is currently configured to actively monitor for and respond to security concerns and/or other activities of interest and a security system 100 or one or more cameras 102 may be "snoozed" for a monitored location 104 when it is currently configured to temporarily ignore detected events. In some implementations, the state of a security system 100 for a monitored location 104 (e.g., "off," "home," "armed" or "snoozed") may be controlled by a customer, e.g., by operating a customer application 904 and/or a keypad 908, e.g., as described below in Section G (in connection with FIG. 9).

The monitoring profile data 164B may indicate, for example, one or more parameters relating to the type and/or scope of monitoring services that the security system 100 is to perform for the monitored location 104, e.g., based on a service level requested by a customer, thus allowing the event filtering and grouping component 132 to filter out certain records based on such parameter(s), as described in more detail below in connection with FIGS. 4B-C. The monitoring profile data 164B may indicate, for example, whether the security system 100 is to perform continuous monitoring (twenty-four hours a day, seven days a week) for the monitored location 104, monitoring only between certain hours (e.g., between 8:00 PM and 6:00 AM or between 9:00 AM and 5:00 PM) for the monitored location 104, which camera(s) 102 are to be used by the security system 100 to perform the monitoring for the monitored location 104, etc.

The monitoring preference data 164C may, for example, identify one or more user-selected preference settings concerning the type and/or scope of monitoring the security system 100 is to perform for the monitored location 104, thus allowing the event filtering and grouping component 132 to filter out certain records based on such preference setting(s), as described in more detail below in connection with FIG. 4B-C. In some implementations, the monitoring preference data 164c may, for example, identify one or more features the security system 100 is to look for in images for a detected event, thus allowing the event filtering and grouping component 132 to filter out records for which such features are not identified. In some implementations, the monitoring preference data 164C may additionally or alternatively include recognized faces for the monitored location 104 (e.g., faces of persons allowed to be within/near the monitored location 104) and/or a preference setting indicating whether events involving recognized faces are to be ignored, thus allowing the event filtering and grouping component 132 to filter out records that include images including such faces based on such preference settings. In some implementations, the monitoring preference data 164C may additionally or alternatively include data indicating whether the security system 100 is to use one or more particular cameras 102 for monitoring purposes and/or particular types of monitoring that is to be performed using one or more particular cameras (e.g., time periods/windows during which one or more cameras 102 are to be used by the security system 100 for monitoring purposes), thus allowing the event filtering and grouping component 132 to filter out records that include images acquired by one or more particular cameras 102 and/or at particular times.

Figure 7A:
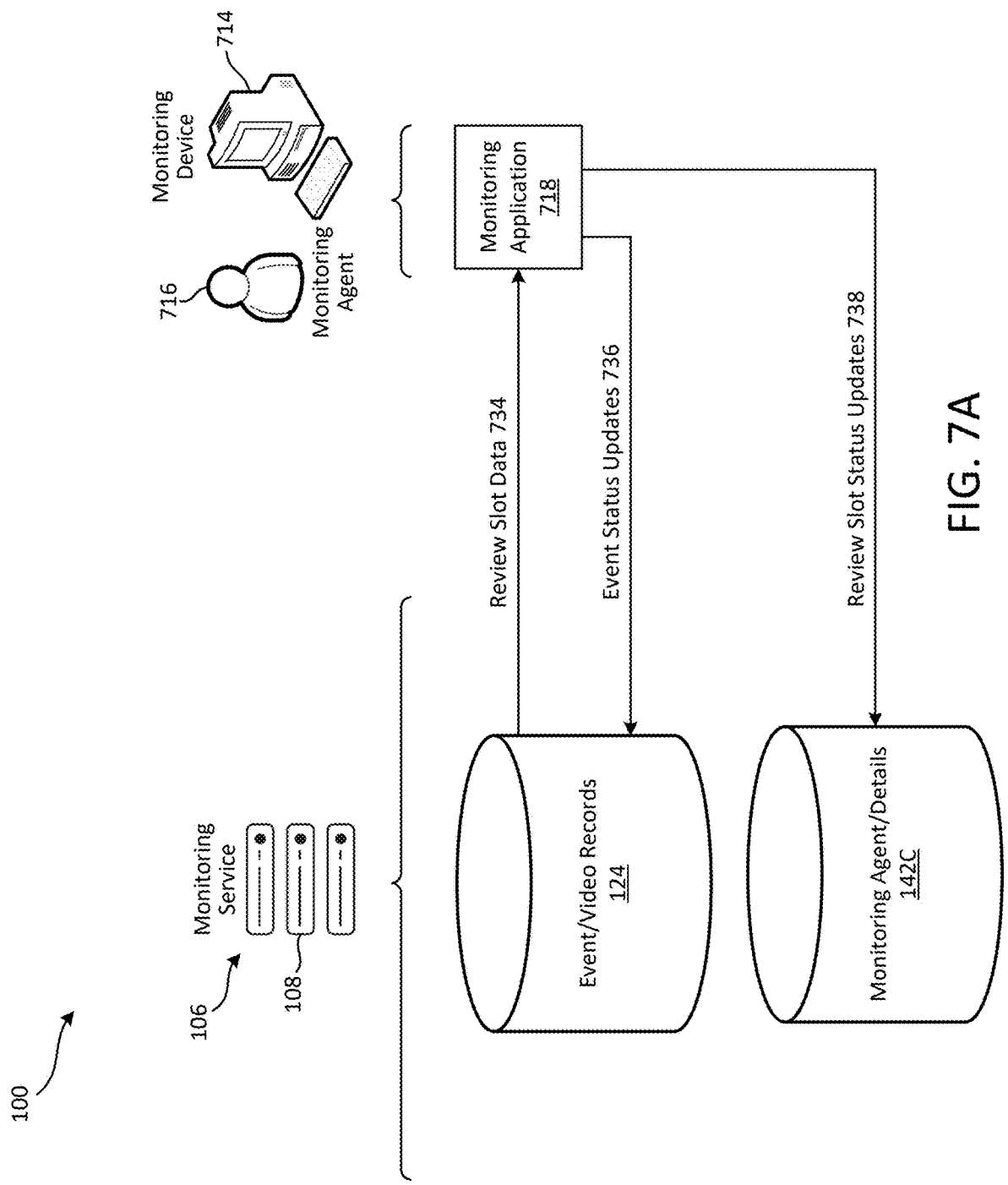
FIG. 7A is computing architecture diagram showing example components and processing of the security system to enable a monitoring application to present event windows for records on a screen of a monitoring device in accordance with some implementations of the present disclosure.
Figure 8A:
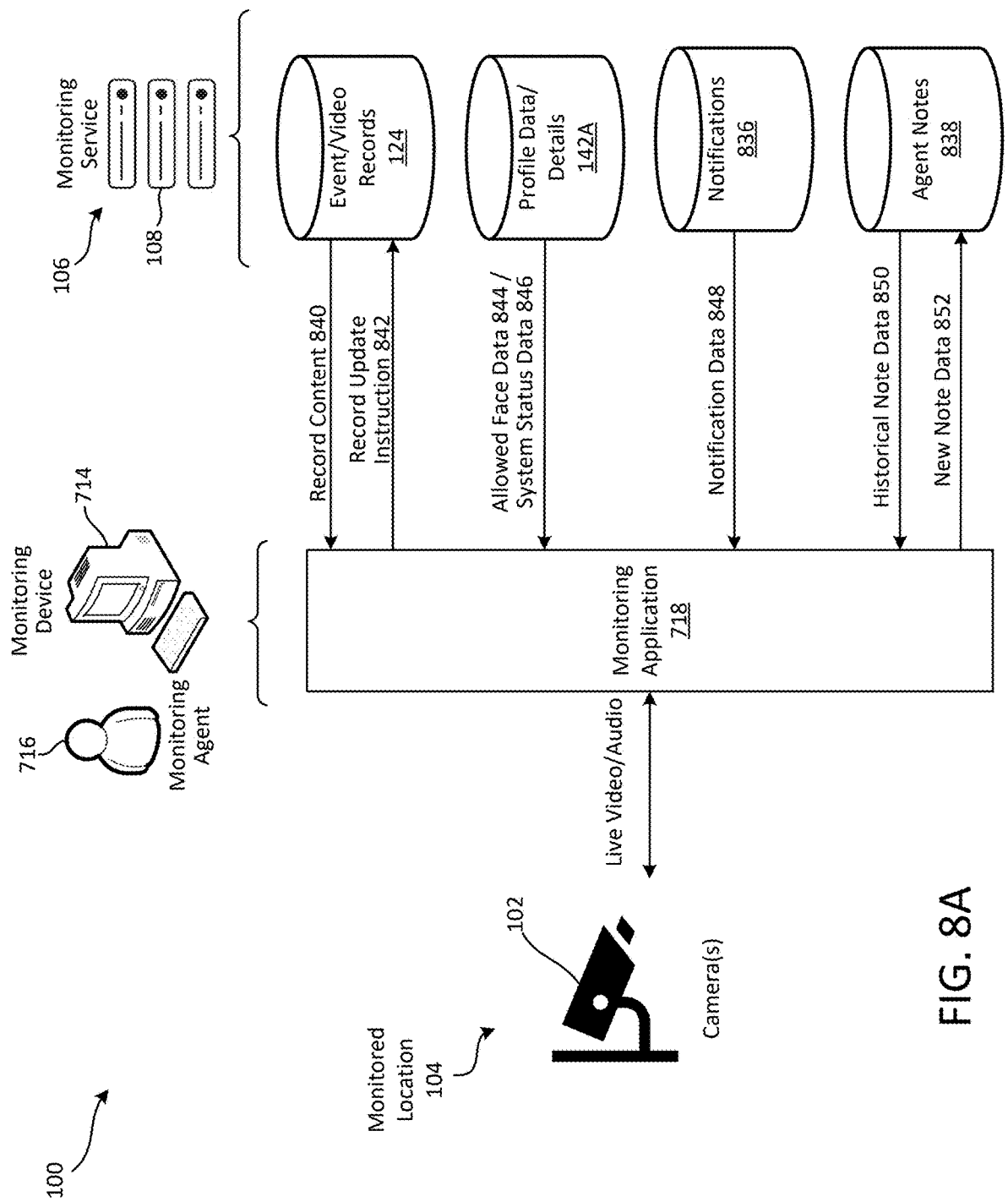
FIG. 8A is computing architecture diagram showing example components and processing of the security system to enable a monitoring application to present an interactive screen that enables a monitoring agent to conduct a detailed review of an incident at a monitored location in accordance with some implementations of the present disclosure.
Figure 8B:
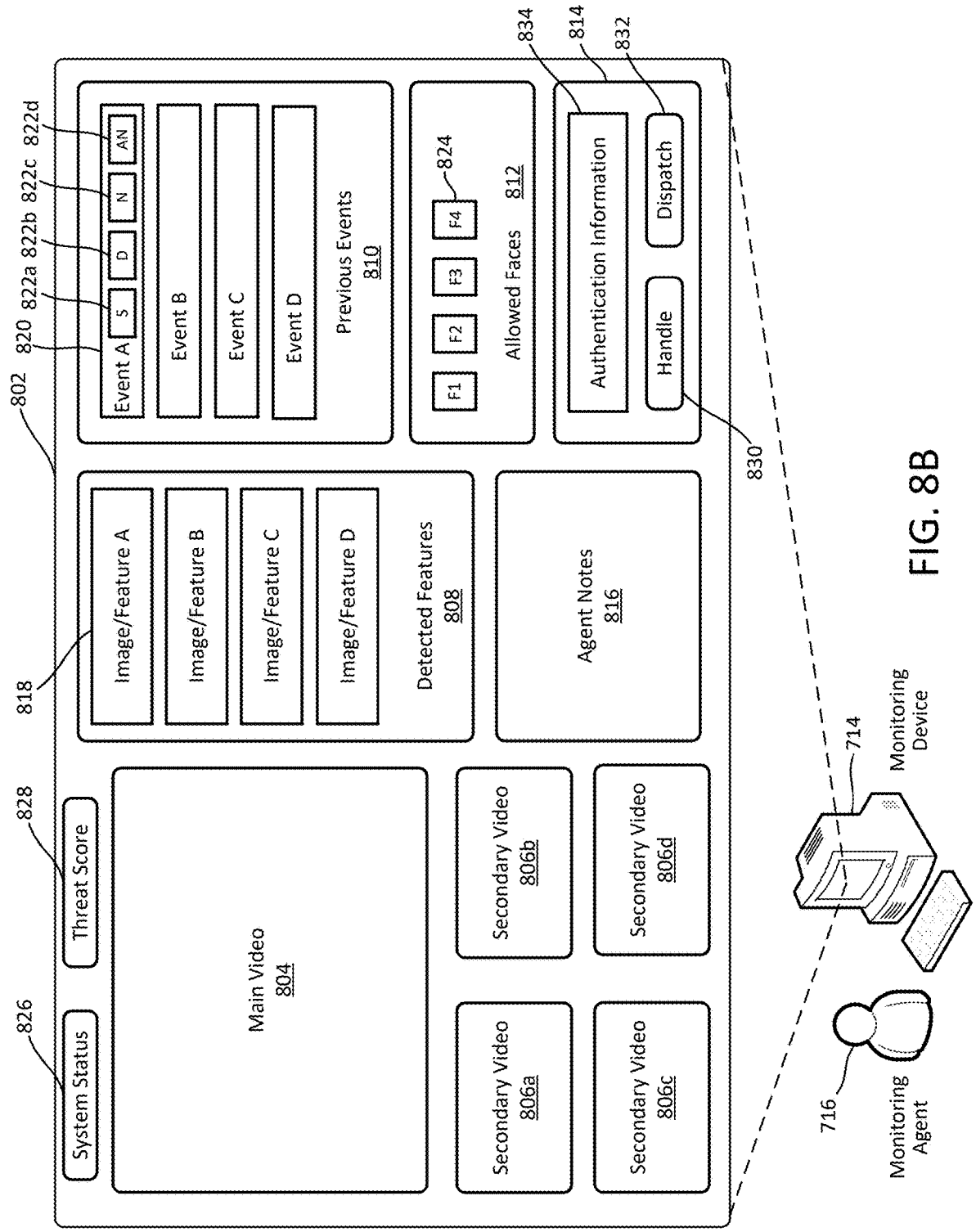
FIG. 8B shows an example screen that a monitoring application may present on a monitoring device operated by a monitoring agent (e.g., as shown in FIG. 8A) in response to selection of a record (e.g., by selecting one of the event windows shown in FIG. 7B), according to some implementations of the present disclosure.

In some implementations, to enable the event filtering and grouping component 132 to identify records that are to be grouped with a record under consideration, the content 162 that the event filtering and grouping component 132 receives from the event/video datastore(s) 124 (as shown in FIG. 4A) may additionally include an indication that another, related record is currently under review by a monitoring agent 716, such as in response to the monitoring agent 716 selecting an event window 706 to enable detailed review of an event (e.g., as described below in connection with FIGS. 7B and 8B). Such a selection of an event window 706 may, for example, cause the event status 224 for the corresponding record to change to "reviewing." In response to the event filtering and grouping component 132 identifying another record that (A) has an event status 224 of "reviewing" and (B) is from the same monitored location 104 (and possibly that also has a timestamp 206 within a threshold time period of the timestamp 206 of the record under consideration), the event filtering and grouping component 132 may add one or more grouping indicators to the record under consideration, such as calling an API of the event/video datastore(s) 124 to change the event status 224 of the record to "hold." As described in more detail in Section E below, the event distribution component 136 may use such grouping indicators to control whether and/or how records are assigned to monitoring agents 716 for review, such as by refraining from assigning records with an event status 224 of "hold" to monitoring agents 716 and/or "pulling," e.g., unassigning, such records from monitoring agents 716 to whom they were previously assigned.

FIG. 4B is a flow chart showing a first example process 405 that may be employed by the event filtering and grouping component 132 to determine whether a given record is to be marked as filtered or handled and/or grouped with one or more other records in accordance with some implementations of the present disclosure. As shown in FIG. 4B, the process 405 may begin at a step 410, at which the event filtering and grouping component 132 may receive content 162 of an active record and/or data 164 from the contextual datastore(s) 142, e.g., as illustrated in FIG. 4A. As noted above in connection with FIG. 2, in some implementations, a record in the table 202 may be considered "active" if it has an event status 224 of "new," "assigned," "reviewing," or "hold." As described in Section A, the event filtering and grouping component 132 may identify active records in need of processing in any of numerous ways and may, for instance, retrieve the content 162 and/or the data 164 from the datastore(s) 124, 142 in response to receiving a notification or otherwise determining that the content 162 and/or the data 164 has changed in a potentially relevant way.

As discussed above in connection with FIG. 4A, the content 162 may include one or more items of data from an active record stored in the event/video datastore(s) 124, such as one or more feature indicators 216 and/or other metadata relating to the event (e.g., an indication of a time at which the event was detected, an indication of the status of the security system 100 when the event was detected, etc.) and the data 164 may include one or more items of data from a user profile corresponding to the monitored location 104, such as system state data 164A, monitoring profile data 164B, and/or monitoring preference data 164C, which may be retrieved from the profiles datastore(s) 142A.

At a decision 412 of the process 405, the event filtering and grouping component 132 may determine whether the record under consideration has been marked as filtered, e.g., pursuant to a step 418 (described below) during a previous iteration of the process 405, for more than a threshold period of time (e.g., five minutes). The event filtering and grouping component 132 may make such a determination, for example, based on the value of timestamp corresponding to the filtering control 222.

When, at the decision 412, the event filtering and grouping component 132 determines that the record has been marked as filtered for more than the threshold period of time, the process 405 may proceed to a step 414, at which the event filtering and grouping component 132 may mark the record as handled, e.g., by changing the value of the event status 224 for the record to "handled." As discussed above, marking a record as handled in such fashion may render the record "inactive," such that it will not be subjected to further processing by at least some components of the security system 100.

When, at the decision 412, the event filtering and grouping component 132 determines that the record under consideration has not been marked as filtered for more than the threshold period of time, the process 405 may proceed to a decision 416.

At the decision 416, the event filtering and grouping component 132 may determine whether the camera 102 that captured the images 214 for the record under consideration is included among the camera(s) 102 the security system 100 is to use for monitoring purposes. The event filtering and grouping component 132 may make such a determination, for example, by comparing the camera ID 212 included in the content 162 received from the event/video datastore(s) 124 with identifiers of one or more to-be-monitored cameras included within the data 164 received from the contextual datastore(s) 142, e.g., as part of the monitoring profile data 164B and/or monitoring preference data 164C received from the profiles datastore(s) 142A, as discussed above in connection with FIG. 4A.

When, at the decision 416, the event filtering and grouping component 132 determines that the camera 102 that captured the images 214 for the record under consideration is not included among the camera(s) 102 the security system 100 is to use for monitoring purposes, the process may proceed to a step 418, at which the event filtering and grouping component 132 may mark the record as filtered, thus indicating that the record does not need to be reviewed by a monitoring agent 716. In some implementations, for example, the event filtering and grouping component 132 may perform the step 418 by using an API of the event/video datastore(s) 124 to cause the filtering control 222 for the record under consideration to be changed to "true," or the like, as discussed above.

When, on the other hand, the event filtering and grouping component 132 determines (at the decision 416) that the camera 102 that captured the images 214 for the record under consideration is included among the camera(s) 102 the security system 100 is to use for monitoring purposes, the process 405 may instead proceed to a decision 420, at which the event filtering and grouping component 132 may determine whether the event occurred during a time period/window in which the security system 100 was to perform monitoring for the monitored location 104. The event filtering and grouping component 132 may make such a determination, for example, by comparing the timestamp 206 of the record under consideration with one or more time periods/windows identified within the data 164 received from the contextual datastore(s) 142, e.g., as part of the monitoring profile data 164B and/or monitoring preference data 164C received from the profiles datastore(s) 142A, as discussed above in connection with FIG. 4A.

When, at the decision 420, the event filtering and grouping component 132 determines that the event did not occur during a time period/window in which the camera 102 was to be used by the security system 100 for monitoring purposes, the process may proceed to the step 418 (described above), at which the event filtering and grouping component 132 may mark the record as filtered, thus indicating that the record need not be reviewed by a monitoring agent 716.

When, on the other hand, the event filtering and grouping component 132 determines (at the decision 420) that the event did occur during a time period/window in which the camera 102 was to be used by the security system 100 for monitoring purposes, the process 405 may instead proceed to a decision 422, at which the event filtering and grouping component 132 may determine whether the security system 100 was in an armed state for the monitored location 104 when the event occurred and/or is currently in an armed state. The event filtering and grouping component 132 may make such determinations, for example, by evaluating the value of the system state 220 included in the content 162 received from the event/video datastore(s) 124 and/or information included in the data 164 received from the contextual datastore(s) 142, e.g., as a portion of the system state data 164A received from the profiles datastore(s) 142A, as discussed above in connection with FIG. 4A.

When, at the decision 422, the event filtering and grouping component 132 determines that the security system 100 was not in an armed state for the monitored location 104 when the event occurred and/or is not currently in an armed state, the process may proceed to the step 418 (described above), at which the event filtering and grouping component 132 may mark the record as filtered, thus indicating that the record need not be reviewed by a monitoring agent 716.

When, on the other hand, the event filtering and grouping component 132 determines (at the decision 422) that the security system 100 was is an armed state for the monitored location 104 when the event occurred and/or is currently in an armed state, the process 405 may instead proceed to a decision 424, at which the event filtering and grouping component 132 may determine whether the security system 100 (and/or, in some implementations, the camera 102) was snoozed (e.g., temporarily disabled by a customer) when the event occurred and/or is currently snoozed. Similar to the decision 422, the event filtering and grouping component 132 may make such determinations, for example, by evaluating the value of the system state 220 included in the content 162 received from the event/video datastore(s) 124 and/or information included in the data 164 received from the contextual datastore(s) 142, e.g., the system state data 164A received from the profiles datastore(s) 142A, as discussed above in connection with FIG. 4A.

When, at the decision 424, the event filtering and grouping component 132 determines that the security system 100 (and/or, in some implementations, the camera 102) was snoozed when the event occurred and/or is currently snoozed, the process may proceed to the step 418 (described above), at which the event filtering and grouping component 132 may mark the record as filtered, thus indicating that the record need not be reviewed by a monitoring agent 716.

When, on the other hand, the event filtering and grouping component 132 determines (at the decision 424) that the security system 100 (and/or, in some implementations, the camera 102) was not snoozed when the event occurred and/or is not currently snoozed, the process 405 may instead proceed to a decision 426, at which the event filtering and grouping component 132 may determine whether there is an active incident review currently in progress for the monitored location 104. The event filtering and grouping component 132 may make such a determination, for example, by determining whether the event status 224 of another record for another event detected at the same monitored location 104 (and possibly within a threshold time period of the event under consideration) is "reviewing," which may indicate that the event is being actively reviewed by the same or a different monitoring agent 716, e.g., via a screen 802 like that shown in FIG. 8B (described below).

When, at the decision 426, the event filtering and grouping component 132 determines that there is currently an active incident review in progress for the monitored location 104, the process 405 may proceed to a step 428, at which the event filtering and grouping component 132 may cause the record under consideration to be grouped with the other record that has the event status 224 of "reviewing." The event filtering and grouping component 132 may perform the step 428, for example, by causing the event status 224 for the record under consideration to be changed to "hold." As explained below in Section E (in connection with FIGS. 6B and 6E), the event distribution component 136 may refrain from assigning records with event statuses 224 of "hold" to monitoring agents 716 or may "pull," e.g., unassign, such records from monitoring agents to which they were previously assigned, thus ensuring that only a single monitoring agent bears responsibility for reviewing a given incident at a monitored location 104.

In some implementations, the event filtering and grouping component 132 may additionally add the event ID 204 of the record whose status 224 was changed to "hold" to the record with which it was grouped (i.e., the record determined to have the event status 224 with a value of "reviewing"), such as by adding the event ID 204 of the record whose status 224 was changed to "hold" to a "linked events" column (not shown in FIG. 2) of the record having the "reviewing" status 224. As described below in Section F (in connection with FIGS. 8A and 8B), in some implementations, the monitoring application 718 may use information concerning such linked events to identify records for which feature UI elements 818 are to be presented within a detected feature presentation window 808 of a screen 802 when a monitoring agent 716 is performing a detailed review of an incident. Further, as also described below in Section F (in connection with FIGS. 8A and 8B), in some implementations, when the monitoring application 718, based on actions taken by a monitoring agent 716, changes the event status 224 for a record from "reviewing" to another value, e.g., "canceled," "handled," "dispatch," or "new," the monitoring application 718 may likewise change the event status 224 (and possibly other information, e.g., the event disposition 226) for such linked event(s) to be the same as the record whose event status 224 was changed from "reviewing" to the other value, thus allowing such records to be acted on as a group based on the monitoring agent's detailed review of the incident in question.

When, on the other hand, the event filtering and grouping component 132 determines (at the decision 426) that there is not currently an active incident review in progress for the monitored location 104, the process 405 may instead proceed to a decision 430, at which the event filtering and grouping component 132 may determine whether review of the record by a monitoring agent 716 is warranted. The event filtering and grouping component 132 may make such a determination, for example, by evaluating the feature indicators 216, if any, that are included in the content 162 received from the event/video datastore(s) 124.

In some implementations, the event filtering and grouping component 132 may determine that review by a monitoring agent 716 is warranted in response to determining that the record includes at least one feature indicator 216 and/or one or more certain types of feature indicators 216. For example, in some implementations, the event filtering and grouping component 132 may determine that review by a monitoring agent 716 is warranted in response to determining that the record includes a feature indicator 216 indicative of a person, a face, a weapon, etc.

In some implementations, the event filtering and grouping component 132 may additionally or alternatively determine that review by a monitoring agent 716 is not warranted in response determining that the record includes one or more certain types of feature indicators 216. For example, as noted above, in some implementations, the edge image processing component 120 and/or the remote image processing component 122 may be configured to identify circumstances in which the same feature is detected in images repeatedly over a short period of time, e.g., more than a threshold number of times within a given number of consecutive image frames, and may add a feature indicator 216 to a record that is indicative of such a determination. In such implementations, the event filtering and grouping component 132 may determine that review by a monitoring agent 716 is not warranted when the record includes that type of feature indicator 216, as such a feature indicator 216 may be indicative of an innocuous trigger for an event, e.g., rain or trees moving in the wind. As also noted above, in some implementations, the edge image processing component 120 and/or the remote image processing component 122 may additionally or alternatively employ one or more re-identification ML models or the like to compare images of multiple records to identify instances in which the same person/face appeared within a short time period. In some implementations, the event filtering and grouping component 132 may likewise determine that review by a monitoring agent 716 is not warranted when the record includes that type of feature indicator 216, as such a feature indictor 216 may indicate that the record is substantively duplicative to another record.

In some implementations, the event filtering and grouping component 132 may additionally or alternatively determine whether review by a monitoring agent 716 is warranted (per the decision 430) based on the presence and/or absence of some combination of two or more particular types of feature indicators 216 within a record. Furthermore, since the edge image processing component 120 and/or remote image processing component 122 may continue to evaluate records so long as they remain "active" in the system 100 (e.g., when they have an event status 224 of "new," "assigned," "reviewing," or "hold"), in some implementations, the event filtering and grouping component 132 may update its determination at the decision 430 as new and/or different features are detected within images corresponding to the record under consideration. For instance, if a feature indicator 216 for a record indicates that a person has been detected in one or more images, the event filtering and grouping component 132 may initially determine (per the decision 430) that review by a monitoring agent 716 is not warranted, but may subsequently determine that review by a monitoring agent is warranted upon determining that another feature indicator 216 indicates that the person has entered the boundaries of the monitored location 104. Such a process may thus enable the event filtering and grouping component 132 to refrain from requiring monitoring agents 716 from reviewing records corresponding to instances in which a person may simply be passing by the monitored location 104, e.g., on a sidewalk in front of the property.

When, at the decision 430, the event filtering and grouping component 132 determines that review by a monitoring agent 716 is not warranted, the process 405 may proceed to the step 418 (described above), at which the event filtering and grouping component 132 may mark the record as filtered, thus indicating that the record need not be reviewed by a monitoring agent 716.

When, on the other hand, the event filtering and grouping component 132 determines (at the decision 430) that review by a monitoring agent 716 is warranted, the process 405 may instead proceed to a decision 432, at which the event filtering and grouping component 132 may determine whether one or more of the detected features correspond to an allowed face (e.g., a face of a person who is authorized to be within or around the monitored location 104). The event filtering and grouping component 132 may make such a determination, for example, by determining whether the feature indicators 216 included in the content 162 received from the event/video datastore(s) 124 indicate that the edge image processing component 120 and/or the remote image processing component 122 determined that one or more faces were recognized in the images for the record under consideration and that those recognized faces are of people who are authorized to be within or around the monitored location 104.

When, at the decision 432, the event filtering and grouping component 132 determines that the feature indicators 216 indicate that one or more allowed faces were recognized in the images for the record under consideration, the process 405 may proceed to the step 418, at which the event filtering and grouping component 132 may mark the record as filtered, thus indicating that the record need not be reviewed by a monitoring agent 716. In some implementations, the feature indicators 216 may include values indicating a degree of confidence that the edge image processing component 120 and/or remote image processing component 122 accurately detected one or more features (e.g., a value indicating a degree of confidence that a face was recognized in an image). In such implementations, the event filtering and grouping component 132 may proceed to the step 418 (per the decision 432) only if the value exceeds a particular threshold.

When, on the other hand, the event filtering and grouping component 132 determines (at the decision 432) that no allowed faces were recognized in the images for the record under consideration (or a confidence value for the detection of an allowed face is not sufficiently high), the process 405 may instead proceed to a step 434, at which the event filtering and grouping component 132 may mark the record as unfiltered. In some implementations, for example, the event filtering and grouping component 132 may perform the step 434 by using an API of the event/video datastore(s) 124 to cause the filtering control 222 for the record to be changed to "false," or the like, as discussed above.

It should be appreciated that, in some implementations, the event filtering and grouping component 132 may perform a subset of the steps and/or decisions illustrated in FIG. 4B. In some implementations, for example, the event filtering and grouping component 132 may perform a subset of the steps and/or decisions based on the content 162 received from the event/video datastore(s) 124 for the record under consideration and/or the data 164 received from the contextual datastore(s) 142. For example, if the content 162 does not include one or more feature indicators 216 for the record, the event filtering and grouping component 132 may not perform at least the decision 430 (e.g., may skip over the decision 430). Alternatively, the event filtering and grouping component 132 may mark a record as filtered if not enough information (e.g., within the content 162 and/or data 164) is available to perform a decision/step of the process 405. For example, for the decision 430, if the content 162 for the record does not include any feature indicators 216, the process 405 may proceed directly to the step 418. In some implementations, for further example, the event filtering and grouping component 132 may always perform a first subset of steps and/or decisions, such as the step 410 and the decision 412, while conditionally performing a second subset of decisions and/or steps based on the content 162 received from the event/video datastore(s) 124 for the record, where determining (at the decision 412) that that the filtering control 222 for the record has been set for more than a threshold amount of time may cause the process 405 to proceed to an initial step and/or decision of the second subset.

In some implementations, as a still further example, the subset of steps performed by the event filtering and grouping component 132 may be based on new/modified information added to the record and/or the contextual datastore(s) 142 which caused the event filtering and grouping component 132 to retrieve the content 162 and/or the data 164 (e.g., based on receiving an indication that the new/modified information was added to the record and/or the contextual datastore(s) 142). In other words, in some implementations, the event filtering and grouping component 132 may perform only the decisions/steps of the process 405 that are needed to process the new/modified information that was added to the record and/or the contextual datastore(s) 142. For example, if the event filtering and grouping component 132 retrieves the content 162 based on the addition or modification of feature indicators 216 for the record, then the event filtering and grouping component 132 may perform the decision 430. For further example, if the event filtering and grouping component 132 retrieves the data 164 based on a change in the system state (e.g., indicating that the system has been disarmed), then the event filtering and grouping component 132 may perform the decision 422. In some such implementations, performing the decisions/steps to process the new/modified information may include the event filtering and grouping component 132 "picking up" the process 405 beginning at an initial decision/step for processing the new/modified information. In other words, the subset of steps performed by the event filtering and grouping component 132 may begin with a decision/step to which the new/modified information relates and continue therefrom through the remaining decisions/steps of the process 405. For example, if the event filtering and grouping component 132 retrieves the content 162 based on the modification or addition of feature indicators 216 for a record, then the event filtering and grouping component 132 may pick up the process 405 at the decision 430 and then continue performing the process 405 illustrated in FIG. 4B (e.g., proceed to the decision 432 or the step 418).

FIG. 4C is a flow chart showing a second example process 435 that may be employed by the event filtering and grouping component 132 to determine whether a given record is to be marked as filtered or handled and/or grouped with one or more other records in accordance with some implementations of the present disclosure. The process 435 is similar to the process 405 (shown in FIG. 4B) in many respects, with the primary difference being that the decisions 442, 444, 446, and 448, determine whether the record in question is to be marked as handled, and thus cause certain components of the security system 100 to cease further processing of that record (because it is no longer an "active" record), as opposed to determining whether to mark the record as filtered, and thus cause the event distribution component 136 to refrain from assigning that record to a monitoring agent 716 for review (as described below in Section E).

As shown in FIG. 4C, the process 435 may begin at a step 440, at which the event filtering and grouping component 132 may receive content 162 of an active record and/or data 164 from the contextual datastore(s) 142, e.g., as illustrated in FIG. 4A. As noted above in connection with FIG. 2, in some implementations, a record in the table 202 may be considered "active" if it has an event status 224 of "new," "assigned," "reviewing," or "hold." As described in Section A, the event filtering and grouping component 132 may identify active records in need of processing in any of numerous ways and may, for instance, retrieve the content 162 and/or the data 164 from the datastore(s) 124, 142 in response to receiving a notification or otherwise determining that the content 162 and/or the data 164 has changed in a potentially relevant way.

As discussed above in connection with FIG. 4A, the content 162 may include one or more items of data from an active record stored in the event/video datastore(s) 124, such as one or more feature indicators 216 and/or other metadata relating to the event (e.g., an indication of a time at which the event was detected, an indication of the status of the security system 100 when the event was detected, etc.) and the data 164 may include one or more items of data from a user profile corresponding to the monitored location 104, such as system state data 164A, monitoring profile data 164B, and/or monitoring preference data 164C, which may be retrieved from the profiles datastore(s) 142A.

At a decision 442 of the process 435, the event filtering and grouping component 132 may determine whether the security system 100 (and/or, in some implementations, the camera 102) was snoozed (e.g., temporarily disabled by a customer) when the event occurred and/or is currently snoozed. The event filtering and grouping component 132 may make such determinations, for example, by evaluating the value of the system state 220 included in the content 162 received from the event/video datastore(s) 124 and/or information included in the data 164 received from the contextual datastore(s) 142, e.g., the system state data 164A received from the profiles datastore(s) 142A, as discussed above in connection with FIG. 4A.

When, at the decision 442, the event filtering and grouping component 132 determines that the security system 100 (and/or, in some implementations, the camera 102) was snoozed when the event occurred and/or is currently snoozed, the process may proceed to a step 443, at which the event filtering and grouping component 132 may mark the record as handled, thus indicating that the record need not be further processed by certain components of the system 100 (because it is "inactive"). In some implementations, for example, the event filtering and grouping component 132 may perform the step 443 by using an API of the event/video datastore(s) 124 to change the value of the event status 224 to "handled." As discussed above, marking a record as handled in such fashion may render the record "inactive," such that it will not be subjected to further processing by at least some components of the security system 100.

When, on the other hand, the event filtering and grouping component 132 determines (at the decision 442) that the security system 100 (and/or, in some implementations, the camera 102) was not snoozed when the event occurred and/or is not currently snoozed, the process 435 may instead proceed to a decision 444, at which the event filtering and grouping component 132 may determine whether the event occurred during a time period/window in which the security system 100 was to perform monitoring for the monitored location 104. The event filtering and grouping component 132 may make such a determination, for example, by comparing the timestamp 206 of the record under consideration with one or more time periods/windows identified within the data 164 received from the contextual datastore(s) 142, e.g., as part of the monitoring profile data 164B and/or monitoring preference data 164C received from the profiles datastore(s) 142A, as discussed above in connection with FIG. 4A.

When, at the decision 444, the event filtering and grouping component 132 determines that the event did not occur during a time period/window in which the camera 102 was to be used by the security system 100 for monitoring purposes, the process may proceed to the step 443 (described above), at which the event filtering and grouping component 132 may mark the record as handled, thus indicating that the record need not be further processed by certain components of the system 100 (because it is "inactive").

When, on the other hand, the event filtering and grouping component 132 determines (at the decision 444) that the event did occur during a time period/window in which the camera 102 was to be used by the security system 100 for monitoring purposes, the process 435 may instead proceed to a decision 446, at which the event filtering and grouping component 132 may determine whether the security system 100 was in an armed state for the monitored location 104 when the event occurred and/or is currently in an armed state. The event filtering and grouping component 132 may make such determinations, for example, by evaluating the value of the system state 220 included in the content 162 received from the event/video datastore(s) 124 and/or information included in the data 164 received from the contextual datastore(s) 142, e.g., as a portion of the system state data 164A received from the profiles datastore(s) 142A, as discussed above in connection with FIG. 4A.

When, at the decision 446, the event filtering and grouping component 132 determines that the security system 100 was not in an armed state for the monitored location 104 when the event occurred and/or is not currently in an armed state, the process may proceed to the step 443 (described above), at which the event filtering and grouping component 132 may mark the record as handled, thus indicating that the record need not be further processed by certain components of the system 100 (because it is "inactive").

When, on the other hand, the event filtering and grouping component 132 determines (at the decision 446) that the security system 100 was in an armed state for the monitored location 104 when the event occurred and/or is currently in an armed state, the process 435 may instead proceed to a decision 448, at which the event filtering and grouping component 132 may determine whether the camera 102 that captured the images 214 for the record under consideration is included among the camera(s) 102 the security system 100 is to use for monitoring purposes. The event filtering and grouping component 132 may make such a determination, for example, by comparing the camera ID 212 included in the content 162 received from the event/video datastore(s) 124 with identifiers of one or more to-be-monitored cameras included within the data 164 received from the contextual datastore(s) 142, e.g., as part of the monitoring profile data 164B and/or monitoring preference data 164C received from the profiles datastore(s) 142A, as discussed above in connection with FIG. 4A.

When, at the decision 448, the event filtering and grouping component 132 determines that the camera 102 that captured the images 214 for the record under consideration is not included among the camera(s) 102 the security system 100 is to use for monitoring purposes, the process may proceed to the step 443, at which the event filtering and grouping component 132 may mark the record as handled, thus indicating that the record need not be further processed by certain components of the system 100 (because it is "inactive").

When, on the other hand, the event filtering and grouping component 132 determines (at the decision 448) that the camera 102 that captured the images 214 for the record under consideration is included among the camera(s) 102 the security system 100 is to use for monitoring purposes, the process 435 may instead proceed to a decision 450, at which the event filtering and grouping component 132 may determine whether the record has been marked as filtered (e.g., at a step 460 during a prior iteration of the process 435) for more than a threshold period of time (e.g., five minutes). The event filtering and grouping component 132 may make such a determination, for example, based on the value of timestamp corresponding to the filtering control 222 for the record.

When, at the decision 450, the event filtering and grouping component 132 determines that the record has been marked as filtered for more than the threshold period of time, the process 435 may proceed to the step 443, at which the event filtering and grouping component 132 may mark the record as handled, thus indicating that the record need not be further processed by certain components of the system 100 (because it is "inactive").

When, on the other hand, the event filtering and grouping component 132 determines (at the decision 450) that the record under consideration has not been marked as filtered for more than the threshold period of time, the process 435 may instead proceed to a decision 452, at which the event filtering and grouping component 132 may determine whether there is an active incident review currently in progress for the monitored location 104. The event filtering and grouping component 132 may make such a determination, for example, by determining whether the event status 224 of another record for another event detected at the same monitored location 104 (and possibly within a threshold time period of the event under consideration) is "reviewing," which may indicate that the event is being actively reviewed by the same or a different monitoring agent 716, e.g., via a screen 802 like that shown in FIG. 8B (described below).

When, at the decision 452, the event filtering and grouping component 132 determines that there is currently an active incident review in progress for the monitored location 104, the process 435 may proceed to a step 454, at which the event filtering and grouping component 132 may cause the record under consideration to be grouped with the other record that has the event status 224 of "reviewing." The event filtering and grouping component 132 may perform the step 454, for example, by causing the event status 224 for the record under consideration to be changed to "hold." As explained below in Section E (in connection with FIGS. 6B and 6E), the event distribution component 136 may refrain from assigning records with event statuses 224 of "hold" to monitoring agents 716 or may "pull," e.g., unassign, such records from monitoring agents to which they were previously assigned, thus ensuring that only a single monitoring agent bears responsibility for reviewing a given incident at a monitored location 104.

In some implementations, the event filtering and grouping component 132 may additionally add the event ID 204 of the record whose status 224 was changed to "hold" to the record with which it was grouped (i.e., the record determined to have the event status 224 with a value of "reviewing"), such as by adding the event ID 204 of the record whose status 224 was changed to "hold" to a "linked events" column (not shown in FIG. 2) of the record having the "reviewing" status 224. As described below in Section F (in connection with FIGS. 8A and 8B), in some implementations, the monitoring application 718 may use information concerning such linked events to identify records for which feature UI elements 818 are to be presented within a detected feature presentation window 808 of a screen 802 when a monitoring agent 716 is performing a detailed review of an incident. Further, as also described below in Section F (in connection with FIGS. 8A and 8B), in some implementations, when the monitoring application 718, based on actions taken by a monitoring agent 716, changes the event status 224 for a record from "reviewing" to another value, e.g., "canceled," "handled," "dispatch," or "new," the monitoring application 718 may likewise change the event status 224 (and possibly other information, e.g., the event disposition 226) for such linked event(s) to be the same as the record whose event status 224 was changed from "reviewing" to the other value, thus allowing such records to be acted on as a group based on the monitoring agent's detailed review of the incident in question.

When, on the other hand, the event filtering and grouping component 132 determines (at the decision 452) that there is not currently an active incident review in progress for the monitored location 104, the process 435 may instead proceed to a decision 456, at which the event filtering and grouping component 132 may determine whether review of the record by a monitoring agent 716 is warranted. The event filtering and grouping component 132 may make such a determination, for example, by evaluating the feature indicators 216, if any, that are included in the content 162 received from the event/video datastore(s) 124.

In some implementations, the event filtering and grouping component 132 may determine that review by a monitoring agent 716 is warranted in response to determining that the record includes at least one feature indicator 216 and/or one or more certain types of feature indicators 216. For example, in some implementations, the event filtering and grouping component 132 may determine that review by a monitoring agent 716 is warranted in response to determining that the record includes a feature indicator 216 indicative of a person, a face, a weapon, etc.

In some implementations, the event filtering and grouping component 132 may additionally or alternatively determine that review by a monitoring agent 716 is not warranted in response determining that the record includes one or more certain types of feature indicators 216. For example, as noted above, in some implementations, the edge image processing component 120 and/or the remote image processing component 122 may be configured to identify circumstances in which the same feature is detected in images repeatedly over a short period of time, e.g., more than a threshold number of times within a given number of consecutive image frames, and may add a feature indicator 216 to a record that is indicative of such a determination. In such implementations, the event filtering and grouping component 132 may determine that review by a monitoring agent 716 is not warranted when the record includes that type of feature indicator 216, as such a feature indicator 216 may be indicative of an innocuous trigger for an event, e.g., rain or trees moving in the wind. As also noted above, in some implementations, the edge image processing component 120 and/or the remote image processing component 122 may additionally or alternatively employ one or more re-identification ML models or the like to compare images of multiple records to identify instances in which the same person/face appeared within a short time period. In some implementations, the event filtering and grouping component 132 may likewise determine that review by a monitoring agent 716 is not warranted when the record includes that type of feature indicator 216, as such a feature indictor 216 may indicate that the record is substantively duplicative to another record.

In some implementations, the determination the event filtering and grouping component 132 may additionally or alternatively determine whether review by a monitoring agent 716 is warranted (per the decision 456) based on the presence and/or absence of some combination of two or more particular types of feature indicators 216 within a record. Furthermore, since the edge image processing component 120 and/or remote image processing component 122 may continue to evaluate records so long as they remain "active" in the system 100 (e.g., when they have an event status 224 of "new," "assigned," "reviewing," or "hold"), in some implementations, the event filtering and grouping component 132 may update its determination at the decision 456 as new and/or different features are detected within images corresponding to the record under consideration. For instance, if a feature indicator 216 for a record indicates that a person has been detected in one or more images, the event filtering and grouping component 132 may initially determine (per the decision 456) that review by a monitoring agent 716 is not warranted, but may subsequently determine that review by a monitoring agent is warranted upon determining that another feature indicator 216 indicates that the person has entered the boundaries of the monitored location 104. Such a process may thus enable the event filtering and grouping component 132 to refrain from requiring monitoring agents from reviewing records corresponding to instances in which a person may simply be passing by the monitored location 104, e.g., on a sidewalk in front of the property.

When, at the decision 456, the event filtering and grouping component 132 determines that review by a monitoring agent 716 is not warranted, the process 405 may proceed to the step 460 (described above), at which the event filtering and grouping component 132 may mark the record as filtered, thus indicating that the record need not be reviewed by a monitoring agent 716.

When, on the other hand, the event filtering and grouping component 132 determines (at the decision 456) that review by a monitoring agent 716 is warranted, the process 405 may instead proceed to a decision 458, at which the event filtering and grouping component 132 may determine whether one or more of the detected features correspond to an allowed face (e.g., a face of a person who is authorized to be within or around the monitored location 104). The event filtering and grouping component 132 may make such a determination, for example, by determining whether the feature indicators 216 included in the content 162 received from the event/video datastore(s) 124 indicate that the edge image processing component 120 and/or the remote image processing component 122 determined that one or more faces were recognized in the images for the record under consideration and that those recognized faces are of people who are authorized to be within or around the monitored location 104.

When, at the decision 458, the event filtering and grouping component 132 determines that the feature indicators 216 indicate that one or more allowed faces were recognized in the images for the record under consideration, the process 435 may proceed to the step 460, at which the event filtering and grouping component 132 may mark the record as filtered, thus indicating that the record need not be reviewed by a monitoring agent 716. In some implementations, the feature indicators 216 may include values indicating a degree of confidence that the edge image processing component 120 and/or remote image processing component 122 accurately detected one or more features (e.g., a value indicating a degree of confidence that a face was recognized in an image). In such implementations, the event filtering and grouping component 132 may proceed to the step 460 (per the decision 458) only if the value exceeds a particular threshold.

When, on the other hand, the event filtering and grouping component 132 determines (at the decision 458) that no allowed faces were recognized in the images for the record under consideration (or a confidence value for the detection of an allowed face is not sufficiently high), the process 435 may instead proceed to a step 462, at which the event filtering and grouping component 132 may mark the record as unfiltered. In some implementations, for example, the event filtering and grouping component 132 may perform the step 462 by using an API of the event/video datastore(s) 124 to cause the filtering control 222 for the record to be changed to "false," or the like, as discussed above.

It should be appreciated that, in some implementations, the event filtering and grouping component 132 may perform a subset of the steps and/or decisions illustrated in FIG. 4C. In some implementations, for example, the event filtering and grouping component 132 may perform a subset of the steps and/or decisions based on the content 162 received from the event/video datastore(s) 124 for the record under consideration and/or the data 164 received from the contextual datastore(s) 142. For example, if the content 162 does not include one or more feature indicators 216 for the record, the event filtering and grouping component 132 may not perform at least the decision 456 (e.g., may skip over the decision 456). Alternatively, the event filtering and grouping component 132 may mark a record as filtered if not enough information (e.g., within the content 162 and/or data 164) is available to perform a decision/step of the process 435. For example, for the decision 456, if the content 162 for the record does not include any feature indicators 216, the process 435 may proceed directly to the step 460. In some implementations, for further example, the event filtering and grouping component 132 may always perform a first subset of steps and/or decisions, such as the step 440 and the decision 450, while conditionally performing a second subset of decisions and/or steps based on the content 162 received from the event/video datastore(s) 124 for the record, where determining (at the decision 450) that the filtering control 222 for the record has been set for more than a threshold amount of time may cause the process 435 to proceed to an initial step and/or decision of the second subset.

In some implementations, as a still further example, the subset of steps performed by the event filtering and grouping component 132 may be based on new/modified information added to the record and/or the contextual datastore(s) 142 which caused the event filtering and grouping component 132 to retrieve the content 162 and/or the data 164 (e.g., based on receiving an indication that the new/modified information was added to the record and/or the contextual datastore(s) 142). In other words, in some implementations, the event filtering and grouping component 132 may perform only the decisions/steps of the process 435 that are needed to process the new/modified information that was added to the record and/or the contextual datastore(s) 142. For example, if the event filtering and grouping component 132 retrieves the content 162 based on the addition or modification of feature indicators 216 for the record, then the event filtering and grouping component 132 may perform the decision 456. For further example, if the event filtering and grouping component 132 retrieves the data 164 based on a change in the system state (e.g., indicating that the system has been disarmed), then the event filtering and grouping component 132 may perform the decision 446. In some such implementations, performing the decisions/steps to process the new/modified information may include the event filtering and grouping component 132 "picking up" the process 435 beginning at an initial decision/step for processing the new/modified information. In other words, the subset of steps performed by the event filtering and grouping component 132 may begin with a decision/step to which the new/modified information relates and continue therefrom through the remaining decisions/steps of the process 435. For example, if the event filtering and grouping component 132 retrieves the content 162 based on the modification or addition of feature indicators 216 for a record, then the event filtering and grouping component 132 may pick up the process 435 at the decision 456 and then continue performing the process 435 illustrated in FIG. 4C (e.g., proceed to the decision 458 or the step 460).

D. THE EVENT PRIORITIZATION COMPONENT

As shown in FIG. 1, in some implementations, the event prioritization component 134 may be a software application that is executed by one or more processors of the monitoring service 106. For example, as noted in Section A, in some implementations, the server(s) 108 of the monitoring service 106 (see FIG. 1) may include one or more computer-readable mediums encoded with instructions which, when executed by one or more processors of the server(s) 108, cause the server(s) 108 to implement the functionality of the event prioritization component 134 described herein.

The event prioritization component 134 may be configured to determine priority levels/scores for records of events stored in the event/video datastore(s) 124. The priority level/score assigned to a record may represent, for example, a relative degree of urgency in the review of that record. In some implementations, the priority level/score may take into account both the likelihood that the occurrence of an event represents an actual security concern or other activity of interest, and the relative age of the event (e.g., how long in the past it occurred), thus ensuring timely review of all records with weight being given to those records that are most likely to represent actual security concerns and/or other activities of interest.

As shown in FIG. 1, in some implementations, the event prioritization component 134 may receive content 172 of records from the event/video datastore(s) 124) (and optionally data 174 from the contextual datastore(s) 142) and, based on that information, may determine and send one or more priority indicators 176 for respective records to the event/video datastore(s) 124, e.g., to be added as priorities 228 to the table 202. As discussed above in Section A, in some implementations, the event prioritization component 134 may retrieve the content 172 in response to receiving an indication or otherwise determining that a record stored in the event/video datastore(s) 124 has been added or modified, and/or may retrieve the data 174 in response to receiving an indication or otherwise determining that information in contextual datastore(s) 142 that is relevant to the processing performed by event prioritization component 134 has been added or modified.

As described in more detail below in connection with FIG. 5A, in some implementations, the content 172 received and processed by the event prioritization component 134 to determine a priority 228 for a record may include some or all of the contents of the record in the event/video datastore (s) 124, such as one or more feature indicators 216 (e.g., indications of one or more detected persons, unrecognized faces, groups of people, one or more detected persons approaching the camera 102, detected weapons, etc.). As also described in more detail below in connection with FIG. 5A, in some implementations, the data 174 received and processed by the event prioritization component 134 to determine a priority 228 for a record may include information from a user profile corresponding to the monitored location 104 (e.g., security state data, monitoring profile data, monitoring preference data), information indicative of one or more characteristics of a camera 102 at the monitored location 104, information indicative of states and/or outputs of one or more other components/sensors (e.g., motion detectors, smoke detectors, glass break detectors, etc.) at the monitored location 104, information identifying a geographic location/coordinates of the monitored location 104, etc., thus allowing the event prioritization component 134 to determine the priority 228 for the record based on such information using one or more of the techniques described below.

As noted above, the priority 228 determined for a record may take into account both the likelihood that the occurrence of an event represents an actual security concern or other activity of interest, and the relative age/recency of the event. In one example implementation, the event prioritization component 134 may determine priorities 228 for individual records that are within a range of "1" to "100," with "1" representing the lowest possible priority 228 and "100" representing the highest possible priority 228. In such an implementation, in instances where the event prioritization component 134 determines that an event is highly likely to represent an actual security concern or other activity of interest and is relatively "old" (e.g., it has a timestamp 206 that is significantly earlier than the current time), the event prioritization component 134 may write a value of "90" as the priority 228 for the record, whereas in instances where the event prioritization component 134 determines that an event is not very likely to represent an actual security concern or other activity of interest and/or is relatively "new" (e.g., it has a timestamp that is not significantly earlier than the current time), the event prioritization component 134 may write a value of "10" as the priority 228 for the record. Further details regarding example processing that may be performed by the event prioritization component 134 to determine priorities 228 for records are discussed below in connection with FIGS. 5A-B.

Figure 5A:
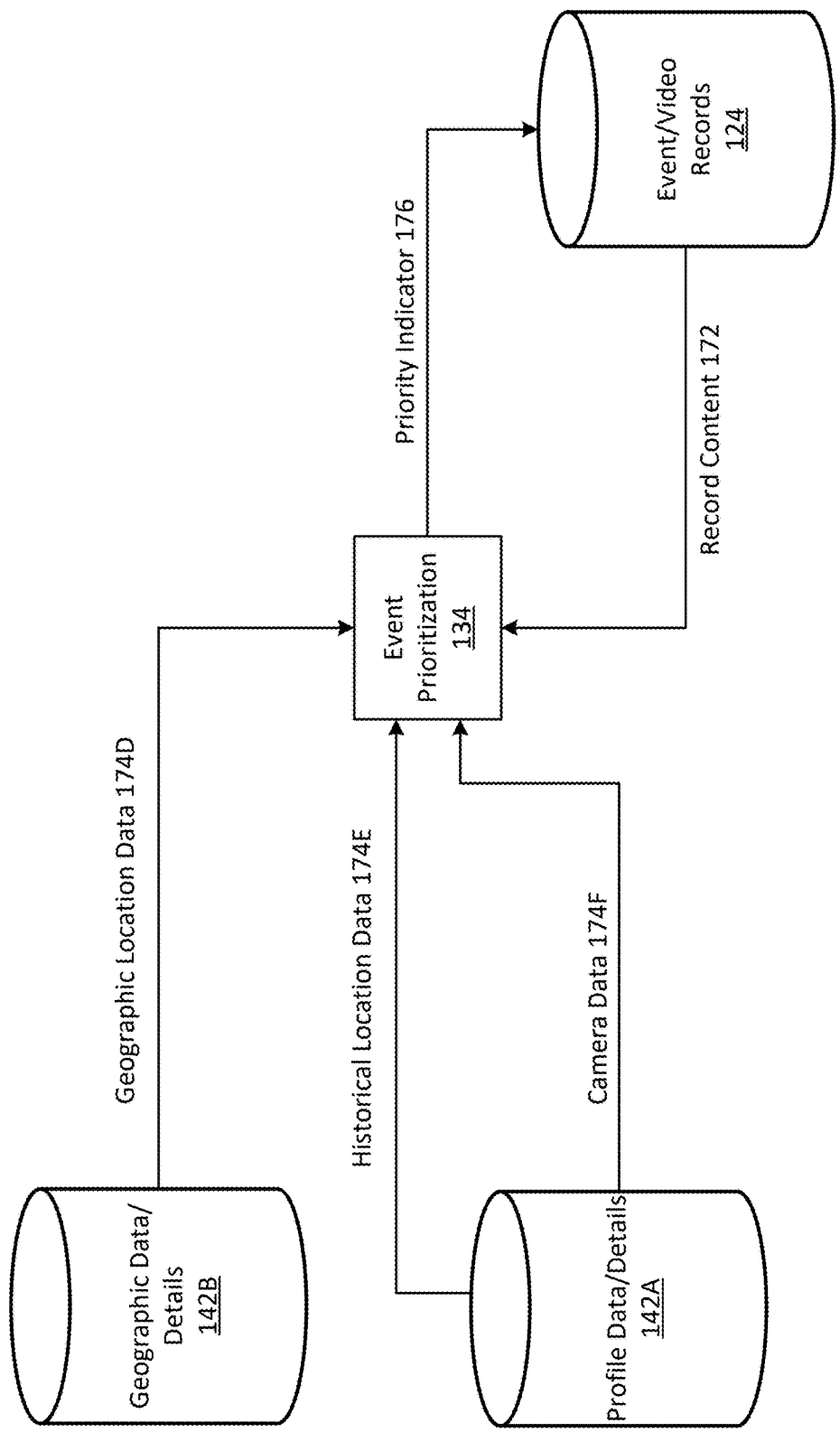
FIG. 5A is computing architecture diagram showing example components and processing of the event prioritization component shown in FIG. 1 to determine priorities for records, according to some implementations of the present disclosure.

FIG. 5A is a computing architecture diagram illustrating example components and processing for determining priority indicators 176 for records of events in accordance with some of the implementations of the present disclosure. As shown, the event prioritization component 134 may receive and process (e.g., consider) various data items of information to determine a priority indicator 176 for a record, including content 172 of the record received from the event/video datastore(s) 124, as well as geographic location data 174D received from one or more geographic information datastores 142B, historical location data 174E received from the profiles datastore(s) 142A, and/or camera data 174F received from the profiles datastore(s) 142A. The profiles datastore(s) 142A and the geographic information datastore(s) 142B shown in FIG. 5A may correspond, for example, to one or more of the contextual datastore(s) 142 shown in FIG. 1, and the geographic location data 174D, the historical location data 174E, and the camera data 174F shown in FIG. 5A may correspond to respective portions of the data 174 shown in FIG. 1.

In some implementations, the event prioritization component 134 may retrieve the geographic location data 174D, the historical location data 174E, and/or the camera data 174F using, for example, an identifier for the monitored location 104 at which the event occurred, an identifier for the customer who resides at or otherwise has permission to enter the monitored location 104, a timestamp indicating a time at which an event was detected at the monitored location 104, an identifier for the camera 102 that captured the images, a geographic location/coordinates of the monitored location 104, or other information that may be included in the content 172 of the record that is received from the event/video datastore(s) 124. In some further implementations, although not illustrated, the event prioritization component 134 may similarly receive system state data, monitoring profile data and/or monitoring preference data corresponding to the record, similar to the system state data 164A, monitoring profile data 164B and/or monitoring preference data 164C discussed above in connection with FIG. 4A, from the profiles datastore(s) 142A.

The geographic location data 174D the event prioritization component 134 receives from the geographic information datastore(s) 142B (as shown in FIG. 5A) may, for example, indicate a frequency/recency of criminal events in a geographic region of the monitored location 104, thus allowing the event prioritization component 134 to determine a priority 228 for a record based on such geographic region-specific information.

The historical location data 174E the event prioritization component 134 receives from the profiles datastore(s) 142A (as shown in FIG. 5A) may include various items of data relating to one or more previous records for events that occurred at the monitored location 104, thus allowing the event prioritization component 134 to determine a priority 228 for a record based on one or more previous records for one or more events that occurred at the monitored location 104. In some implementations, the historical location data 174E may include, for example, one or more event dispositions 226 for the previous record(s). For example, historical location data 174E indicating that the last five events detected at the monitored location 104 were marked as handled, such as for being weather-related, may be used by the event prioritization component 134 to determine a priority 228 for the record.

The camera data 174F the event prioritization component 134 receives from the profiles datastore(s) 142A (as shown in FIG. 5A) may indicate various characteristics of the camera 102 that captured the images 214 for the record, thus allowing the event prioritization component 134 to determine a priority 228 for a record based on the camera 102 that captured the images for that record. The camera data 174F may indicate, for example, a type of the camera 102 (e.g., whether the camera 102 is configured for indoor monitoring or outdoor monitoring, whether the camera 102 is powered via a wire or battery, etc.), performance characteristics of the camera 102 (e.g., performance load capabilities, such as the capability to be viewed while recording video without a decline in performance and/or quality), and/or a connection quality of the camera 102 (e.g., a strength of the camera's 102 connection to the Internet).

In some implementations, the event prioritization component 134 may implement rules or logic to process the various items of information for a record (e.g., the content 172, the geographic location data 174D, the historical location data 174E, and/or the camera data 174F) to determine a priority 228 for the record according to one or more rules. In some such implementations, the value of the priority 228 determined for a record may increase/decrease as additional information relating to the record is processed by the event prioritization component 134 or as time elapses. For example, the addition of one or more feature indicators 216 to a record indicating the presence of unrecognized persons (e.g., as a result of image analysis performed by the remote image processing component 122) may cause the event prioritization component 134 to increase the value of the priority 228 for a record, whereas the addition of one or more feature indicators 216 indicating the detection of recognized persons (e.g., as a result of facial recognition processing performed by the remote image processing component 122) may cause the event prioritization component 134 to decrease the value of the priority 228 for a record. In some implementations, the feature indicators 216 may include confidence scores (e.g., representing a confidence that an ML model accurately identified a feature), and such confidence scores may additionally be taken into account when calculating the value of the priority 228.

As another example, the addition of one or more feature indicators 216 indicating the presence of persons with a potential weapon may increase the value of the priority 228 for a record and, in some instances, may event result in assigning a maximum value to the priority 228 for that record. For further example, if the event prioritization component 134 determines that the images for a record were captured by a camera 102 having favorable characteristics (e.g., uses a wired power cable, has high performance capabilities, a good internet connection, and/or has better characteristics than an additional camera 102 at the same monitored location 104), the event prioritization component 134 may increase the value of the priority 228 for the record for that event (e.g., to prioritize it over other records from the same monitored location 104 that include images from cameras 102 having less favorable characteristics). As another example, if the event prioritization component 134 determines that a record represents an event that recently occurred or is approaching a "stale"/"expired" threshold of recency (e.g., five minutes since detection/occurrence), the event prioritization component 134 may increase the value of the priority 228 for the record (e.g., based on the likelihood of being able to effectively thwart an intruder being high or about to decrease, respectively).

As an even further example, if the event prioritization component 134 determines (e.g., based on the historical location data 174E) that a monitored location 104 experienced several recent events that were determined to not be a security concern or other activity of interest based on the (type of) weather and/or a recognized person's historical patterns (e.g., a pattern corresponding to a recognized person being detected around 5 pm every day), the event prioritization component 134 may decrease value of the priority 228 for the record (e.g., based on the likelihood of an actual security concern or other activity of interest being present being low). As a still additional example, if the event prioritization component 134 determines that an event occurred in an area with a high crime rate, the event prioritization component 134 may increase the value of the priority 228 for the corresponding record. As yet another example, if the event prioritization component 134 determines (e.g., using a timestamp) that an event occurred during a particular time of day (e.g., during daylight hours, such as 9:00 am to 5:00 pm), the event prioritization component 134 may increase the value of the priority 228 for the corresponding record (e.g., based on the homeowner being less likely to be present).

In some implementations, the event prioritization component 134 may initially use the received information (e.g., the content 172, the geographic location data 174D, the historical location data 174E, and/or the camera data 174F) to calculate or otherwise determine a threat score representing an estimated likelihood that the event corresponds to an actual security concern or other activity of interest and then combine the determined threat score with an indication of the age of the event (e.g., based on the timestamp 206) to calculate a priority 228 for the record. As noted above, in some implementations, such a calculation may be made to ensure timely review of all records that have not been filtered or otherwise excluded from review, with weight being given to those records that are most likely to present actual security concerns and/or other activities of interest. Although not illustrated in FIG. 2, in some implementations, the table 202 may include an additional column in which determined threat scores may be written, and updated as new information is received and processed by the event prioritization component 134, for respective records. In some implementations, such a threat score may be used for purposes in addition to or in lieu of calculating a priority 228, such as for annotating and/or organizing event windows 706 based on the threat score values (e.g., as described below in connection with FIG. 7B) and/or determining the value of a threat score indicator 828 that that a monitoring application 718 may present on a screen 802 of a monitoring device 714 (e.g., as described below in connection with FIG. 8B).

With respect to the process of calculating a score (e.g., a threat score in implementations in which a threat score is separately determined), as one example, the event prioritization component 134 may add a first number of points (or apply a first weight) to the threat score for individual unrecognized, unique faces that were detected in images for the record (e.g., as reflected in the feature indicators 216) and may subtract a second number of points (or apply a second, lesser weight) for individual recognized, unique faces that were detected in such images (e.g., as reflected in the feature indicators 216). As another example, the event prioritization component 134 may add points to the threat score for a record based on the detection of certain types of objects (e.g., a weapon) in images for the event (e.g., as reflected in the feature indicators 216) and/or may subtract points from the threat score for the record based on the detection of other types of objects (e.g., a package or a grocery bag) in such images (e.g., as reflected in the feature indicators 216), with the number of points added or subtracted depending on the type of object that was detected. As yet another example, the event prioritization component 134 may add a given number of points to the threat score for a record if the geographic location data 174D and/or the historical location data 174E indicates that the monitored location 104 and/or the geographic region in which the monitored location 104 is situated has experienced actual security threats in the past (e.g., last 24 hours, a few days, weeks or months). As still another example, the event prioritization component 134 may subtract a certain number points from the threat score for a record if the content 172 and/or data 174 indicates that a severe weather event (e.g., an event involving high winds, heavy snow or rain, etc.) was occurring when the event was detected, as such information may be indicative of an innocuous cause for detected motion as opposed to an actual security concern or other activity of interest. And as yet one more example, the event prioritization component 134 may add and/or subtract certain numbers of points to the threat score for a record if the content 172 of the record (e.g., the timestamp 206) and/or the historical location data 174E indicates that the event occurred within one or more particular windows of time (e.g., at nighttime, during a time period when the owner of the property usually comes home from work, during the workweek at a second home that the owner usually occupies only on weekends, etc.).

With respect to combining the threat score with an indication of the age of the event (in implementations in which a threat score is separately determined), the event prioritization component 134 may use any of number of approaches to calculate a suitable priority 228 for a record, with the goal being to ensure that records with lower threat scores do not become too stale to allow meaningful review and, if necessary, intervention by a monitoring agent 716 (shown in FIGS. 7A and 7B). As one example implementation, for instance, the relative age of a record may be used to determine a suitable multiplier that may be applied to the determined threat score to calculate the value of a priority 228, with the value of the multiplier increasing as the age of record increases. Ensuring timely review of records by monitoring agents 716 can be important, for example, in implementations in which an objective of the security system 100 is to intervene and stop the occurrence of activities before they escalate (e.g., by stopping an intruder from entering a residence).

With respect to the foregoing discussion, it should be appreciated that the prioritization of event records to ensure timely review of the same by monitoring agents 716 may not be necessary in most circumstances, as most of the time a sufficient number of monitoring agents 716 can be staffed to timely review all such records without employing any sort of record prioritization scheme. Such prioritization can nonetheless be helpful to account for circumstances in which the security system 100 experiences a sudden spike in the volume of detected events, a sudden spike in crime across multiple monitored locations, or a reduced staff for unanticipated reasons (e.g., a natural disaster).

In other implementations in which a threat score is separately determined, the event prioritization component 134 may implement a machine learning (ML) model configured to process the various items of information for a record (e.g., the content 172, the geographic location data 174D, the historical location data 174E and/or the camera data 174F) to assign a threat score to the record. For example, the ML model may take as input the various items information for a record and may generate a value (e.g., in a range from "0" to "1") representing the ML model's confidence that the record may be classified/categorized as a security concern or other activity of interest. In some embodiments, the confidence score determined by the ML model may be converted to a threat score within a particular range (e.g., by converting a confidence score of "0.05" to a threat score of "5," converting a confidence score of "0.5" to a threat score of "50," etc.), so that the resulting threat score falls within a predetermined range (e.g., between "1" and "100"). In some implementations, the event prioritization component 134 may use the determined threat score and an indication of the relative recently of the event (e.g., based on the timestamp 206 in the record for the event) to calculate a priority 228 for the record, such as by using the relative age of a record to determine a suitable multiplier to apply to the determined threat score to calculate the value of a priority 228, as described above. In other implementations, an indication of the relative recency of the event may be provided as an input feature to the ML model, and the ML model may generate an output value (which may represent or be converted into a priority 228) that takes the relative recently of the event into account.

In either implementation, the ML model may be trained on a corpus of training tuples including one or more items of information corresponding to records (e.g., such as the content 172, the geographic location data 174D, the historical location data 174E and/or the camera data 174F described above) and ground truth threat/priority values assigned to those records. Based on the accuracy of the ML model's predictions, e.g., based on a comparison of the ML model's generated value and an actual value assigned to the training tuple, one or more model parameters (e.g., weights) of the ML model may be updated (e.g., through backpropagation, hyperparameter tuning, etc.).

In some such implementations, the ML model may be retrained/updated based on feedback provided by one or more monitoring agents 716 that reviewed a record. For example, the feedback provided by the monitoring agent(s) 716 may correspond to a score representing an accuracy of the ML model's prediction. For further example, the feedback may correspond to a priority level/score assigned to the record by the monitoring agent(s) 716. The feedback may be used to update one or more model parameters (e.g., weights) of the ML model.

Figure 5B:
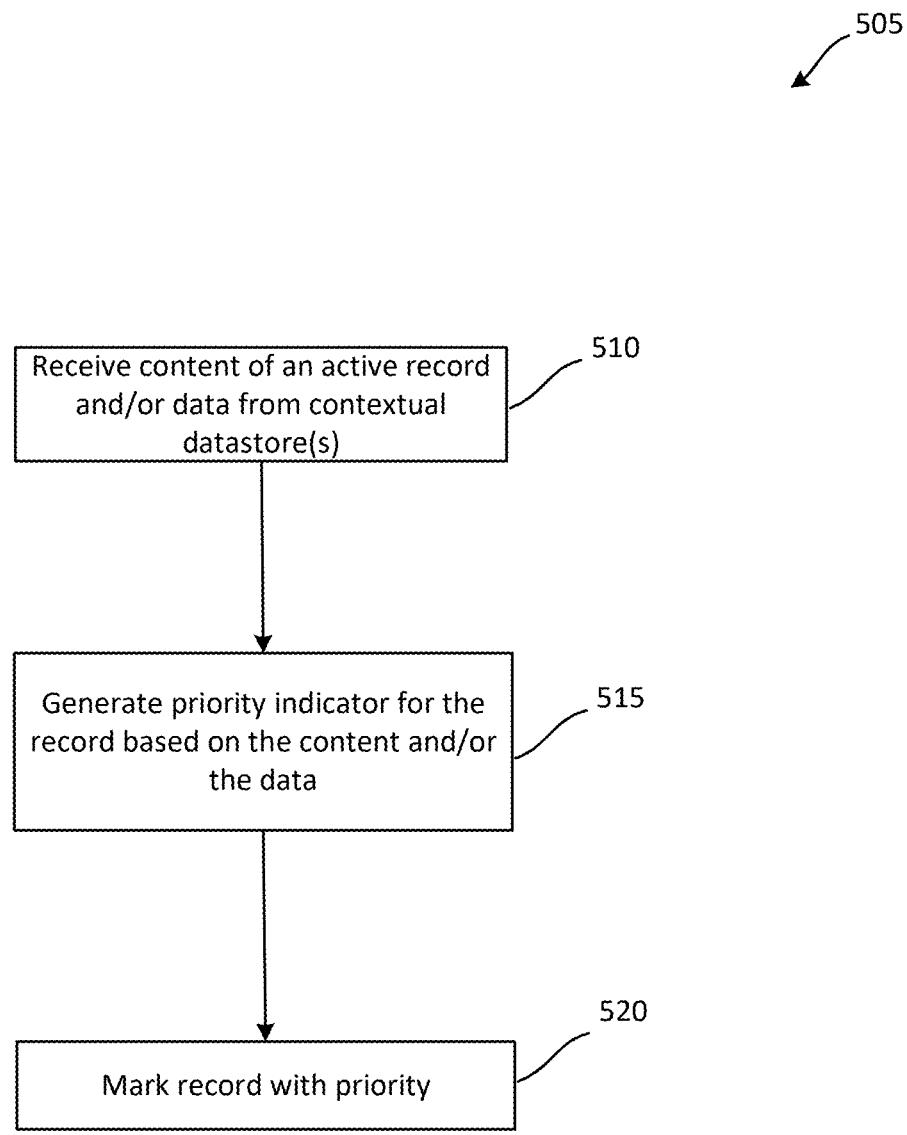
FIG. 5B is a flow chart showing an example process that may be employed by the event prioritization component shown in FIG. 5A to determine priorities for records, according to some implementations of the present disclosure.

FIG. 5B is a flow chart showing an example process 505 that may be employed by the event prioritization component 134 to assign a priority 228 to a record in accordance with some implementations of the present disclosure. As shown in FIG. 5B, the process 505 may begin at a step 510, at which the event prioritization component 134 may receive content 172 of an active record and/or data 174 from the contextual datastore(s) 142, e.g., as illustrated in FIG. 5A. As noted above in connection with FIG. 2, in some implementations, a record in the table 202 may be considered "active" if it has an event status 224 of "new," "assigned," "reviewing," or "hold." As described in Section A, the event prioritization component 134 may identify active records in need of processing in any of numerous ways and may, for instance, retrieve the content 172 and/or the data 174 from the datastore(s) 124, 142 in response to receiving a notification or otherwise determining that the content 172 and/or the data 174 has changed in a potentially relevant way.

As discussed above, content 172 received and processed by the event prioritization component 134 may include information from a record stored in the event/video datastore(s) 124, such as one or more feature indicators 216 (e.g., indicators of one or more detected persons, unrecognized faces, groups of people, one or more detected persons approaching the camera 102, detected weapons, etc.) and/or other metadata relating to the event (e.g., an indication of a time at which the event was detected, security state data, etc.) and the data 174 received and processed by the event prioritization component 134 may include one or more items of information corresponding to a geographic location/coordinates of the monitored location 104, such as geographic location data 174D, which may be retrieved from the geographic information datastore(s) 142B as shown in FIG. 5A, and/or one or more items of information from a user profile corresponding to the monitored location 104, such as camera data 174F and/or historical location data 174E, which may be retrieved from the profiles datastore(s) 142A as shown in FIG. 5A.

At a step 515 of the process 505, the event prioritization component 134 may calculate/determine the value of a priority indicator 176 for the record, based on the content 172 of the record and/or the data 174 from the contextual datastore(s) 142, as described above in connection with FIG. 5A.

At a step 520 of the process 505, the event prioritization component 134 may mark the record with the determined priority 228. For example, the step 520 may involve the event prioritization component 134 making an API call to the event/video datastore(s) 124 to cause the priority 228 for the record of the event to be changed to the value of the priority indicator 176 calculated/determined at the step 515.

As discussed above, in some implementations, the value of the priority 228 assigned to a record may be altered as new, modified, or additional data is added to the record in the table 202 and/or as the data 174 in the contextual datastore(s) 142 changes. For example, at a first time, the event prioritization component 134 may use first content 172 of a record and data 174 to assign a priority 228 to the record. The information available to the event prioritization component 134 may initially include the abovementioned camera data 174F, historical location data 174E, geographic location data 174D, and a timestamp for the record (e.g., the timestamp 206), but may not include one or more feature indicators 216 (e.g., based on the remote image processing component 122 not having generated such feature indicators 216 prior to the first time). The event prioritization component 134 may process as described above to assign a priority 228 to the record. Subsequently, new feature indicators 216 for the record may be determined, updated or otherwise become available (e.g., by the remote image processing component 122). Thereafter, the event prioritization component 134 may receive additional content 172 for the record (e.g., including the newly determined feature indicators 216) and use those feature indicators 216 to calculate/determine a new or revised priority 228 for the record, as described above in connection with FIG. 5A.

E. THE EVENT DISTRIBUTION COMPONENT

As shown in FIG. 1, in some implementations, the event distribution component 136 may be a software application that is executed by one or more processors of the monitoring service 106. For example, as noted in Section A, in some implementations, the server(s) 108 of the monitoring service 106 (see FIG. 1) may include one or more computer-readable mediums encoded with instructions which, when executed by one or more processors of the server(s) 108, cause the server(s) 108 to implement the functionality of the event distribution component 136 described herein.

The event distribution component 136 may be configured to determine an agent or other person (e.g., an available, qualified monitoring agent 716—see FIGS. 7A and 8A) to whom a record in the event/video datastore(s) 124 is to be assigned for review. An available, qualified monitoring agent 716 may be a monitoring agent 716 who is active (e.g., logged in), has the availability/capacity to review the record (e.g., has an available review slot for the record), and/or is qualified to review the record (e.g., is qualified for a type designation of the record, such as the event type 218 for the record and/or a geographic location identifier of the record). In other words, the event distribution component 136 may be configured to assign records to one or more monitoring agents 716 for review based on any number of factors or attributes (e.g., availability and/or qualifications of the monitoring agent(s) 716). The event distribution component 136 may further be configured to re-assign a record to another available, qualified monitoring agent 716, e.g., based on the monitoring agent 716 logging out or otherwise becoming unavailable (e.g., performing a further, individualized review of a record in one of the monitoring agent's review slots, such as by selecting an event window 706—shown in FIG. 7A—including data corresponding to the record), the event expiring, and/or the record being marked as inactive or filtered, as discussed below.

As shown in FIG. 1, in some implementations, the event distribution component 136 may receive content 182 of a record from the event/video datastore(s) 124, as well as data 184 from the contextual datastore(s) 142. In some implementations, the event distribution component 136 may retrieve the content 182 in response to determining that the event/video datastore(s) 124 includes a queued record. As used herein, a "queued record" refers to a record that is in need of review by a monitoring agent 716 but has not yet been assigned to a monitoring agent 716 for review. As noted above in connection with FIG. 2, in some implementations, the active records in the event/video datastore(s) 124 that (A) have an event status 224 of "new" (as opposed to "hold," "assigned" or "reviewing"), and (B) do not have a filtering control 222 indicating the record has been marked as "filtered," may be considered "queued records." The collection of records having such characteristics is sometimes referred to herein as the "record queue" or simply the "queue."

In some implementations, the event distribution component 136 may be configured to continuously parse the contents of the event/video datastore(s) 124 to identify queued records and may retrieve content 182 for those records from the event/video datastore(s) 124, as well as the data 184 from the contextual datastore(s) 142, for processing as described below. In other implementations, the event distribution component 136 may additionally or alternatively retrieve the content 182 for a queued record in response to receiving an indication (e.g., from the event/video datastore(s) 124 or an event handler) or otherwise determining that information of a queued record stored in the event/video datastore(s) 124 has been added or modified. Similarly, in some implementations, the event distribution component 136 may retrieve the data 184 in response to receiving an indication (e.g., from the contextual datastore(s) 142 or an event handler) or otherwise determining that information corresponding to the record has been added to or modified in the contextual datastore(s) 142.

As illustrated in FIG. 1, based on the received content 182 and/or the data 184, the event distribution component 136 may send agent assignment instructions 186 identifying the monitoring agent 716 to whom the queued record is to be assigned (or from whom the queued record is to be unassigned) for the record to the event/video datastore(s) 124, which instructions may cause information indicating the record has been assigned to the monitoring agent 716 (or unassigned from the monitoring agent 716) to be written to the event/video datastore(s) 124, such as by adding an agent ID 230 identifying the monitoring agent 716 to the record and changing the event status 224 for the record from "new" to "assigned" (or removing the agent ID 230 identifying the monitoring agent 716 from the record and changing the value of the event status 224 for the record from "assigned" to "new").

As described in more detail below in connection with FIGS. 6A-E, in some implementations, the content 182 received and processed by the event distribution component 136 may include information from a queued record stored in the event/video datastore(s) 124, such as a determined priority 228, a determined threat score, one or more determined feature indicators 216, a geographic location/coordinates of the monitored location 104, a description of the record, etc.), thus allowing the event distribution component 136 to assign the queued record to a monitoring agent 716 based on the information in the queued record. As also described in more detail below in connection with FIGS. 6A-E, in some implementations, the data 184 received and processed by the event distribution component 136 may include information from one or more monitoring agent datastores 142C (shown in FIG. 6A). The data 184 may, for example, include various items of information relating to one or more monitoring agents 716, such as data identifying the monitoring agent(s) 716, data indicating an activity status of the monitoring agent(s) 716, data indicating an availability of the monitoring agent(s) 716, data indicating qualifications of the monitoring agent(s) 716, data indicating a level of experience of the monitoring agent(s), etc., thus allowing the event distribution component 136 to assign the queued record to a monitoring agent 716 based, at least in part, on such information.

As described in more detail below in connection with FIGS. 6A-B, in some implementations, the event distribution component 136 may assign queued records to monitoring agents based on a current state of the record queue, i.e., the queued records included in the table 202. In particular, in some such implementations, the event distribution component 136 may be configured to determine whether the number of queued records exceeds the number of available monitoring agent review slots and may execute different processes for assigning queued records to monitoring agents 716 depending on the result of that determination.

Figure 6A:
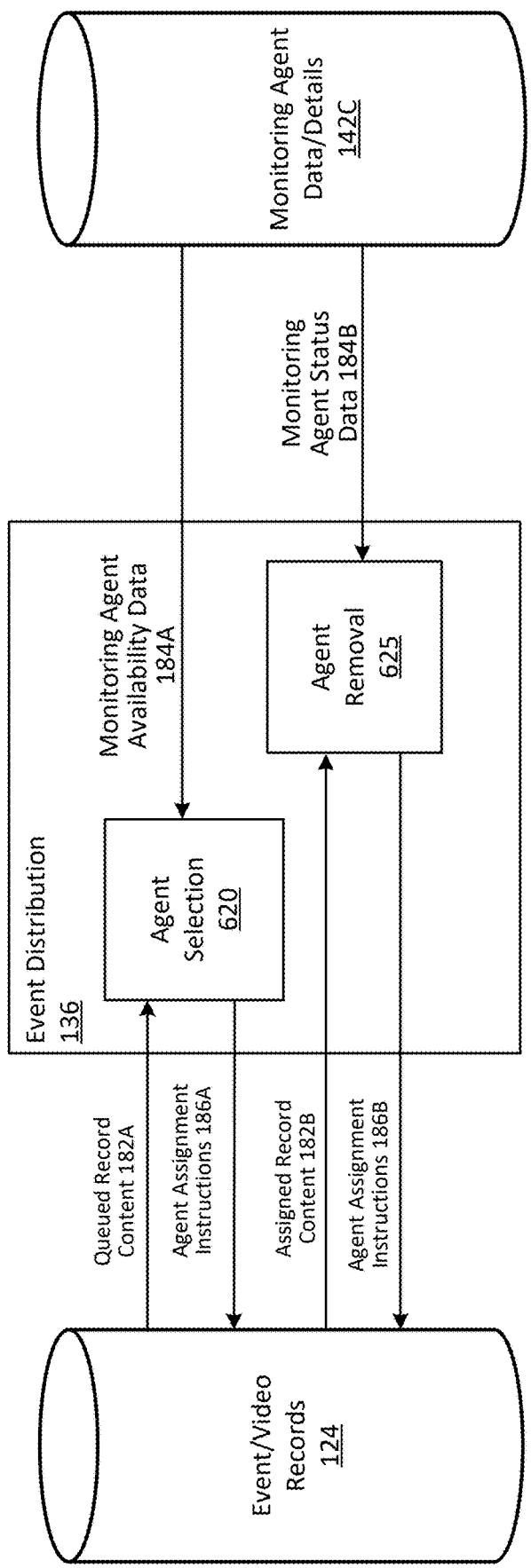
FIG. 6A is computing architecture diagram showing example components and processing of the event distribution component shown in FIG. 1 to manage the assignment of records to monitoring agents for review, according to some implementations of the present disclosure.
Figure 6B:
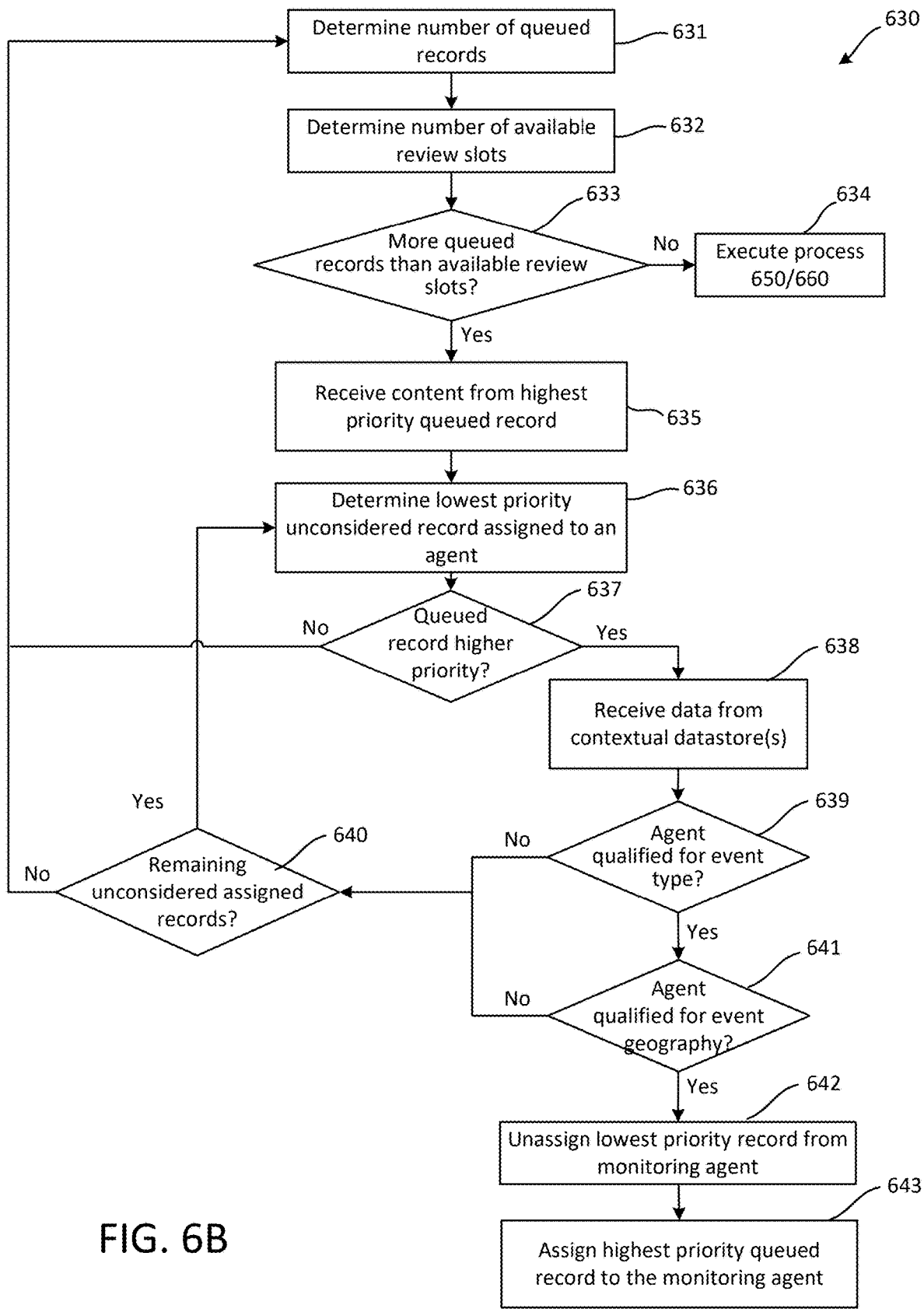
FIG. 6B is a flow chart showing a first example process that may be employed by the agent selection component shown in FIG. 6A to determine monitoring agents to whom queued records are to be assigned for review, according to some implementations of the present disclosure.
Figure 6C:
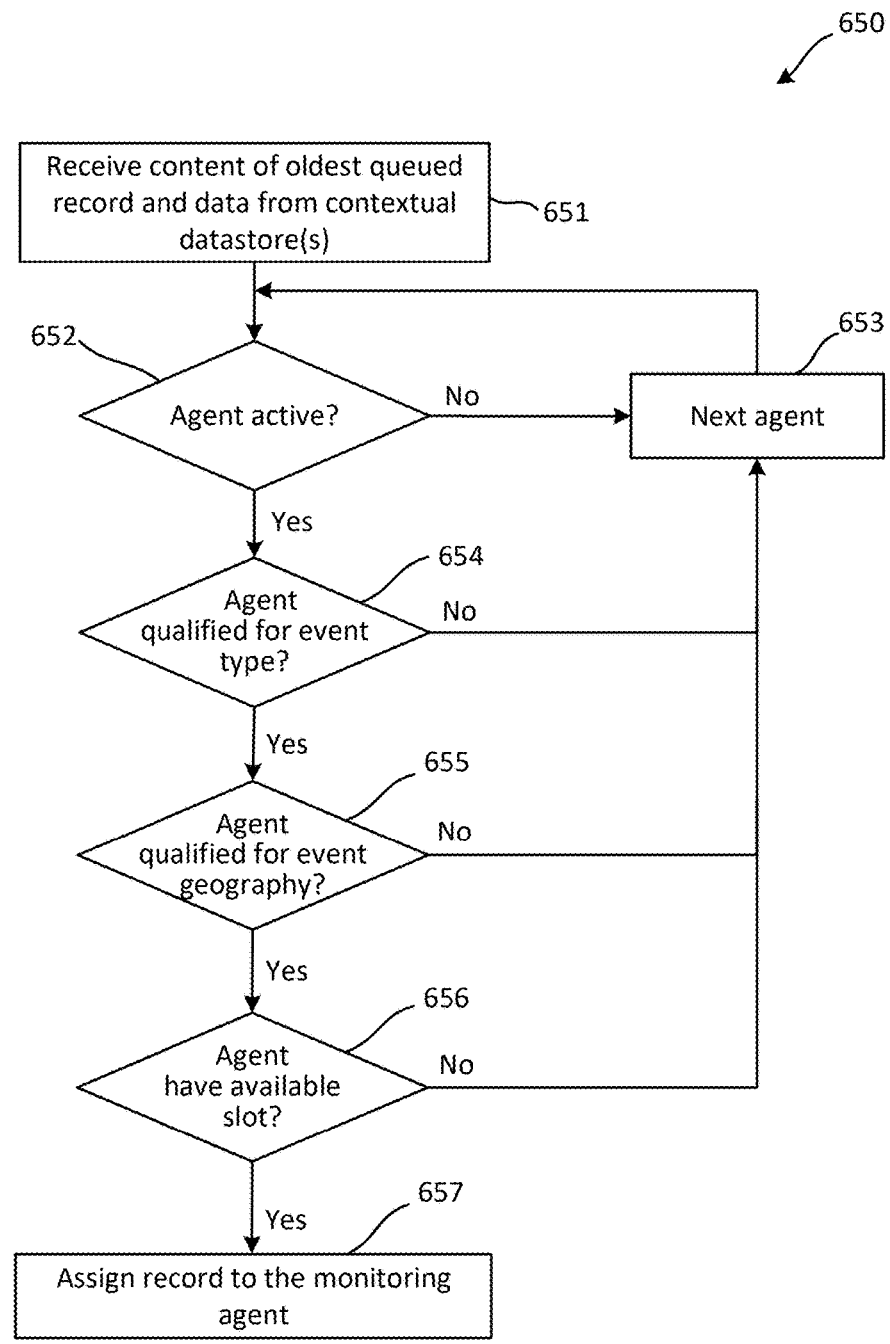
FIG. 6C is a flow chart showing a second example process that may be employed by the agent selection component shown in FIG. 6A to determine monitoring agents to whom queued records are to be assigned for review, according to some implementations of the present disclosure.
Figure 6D:
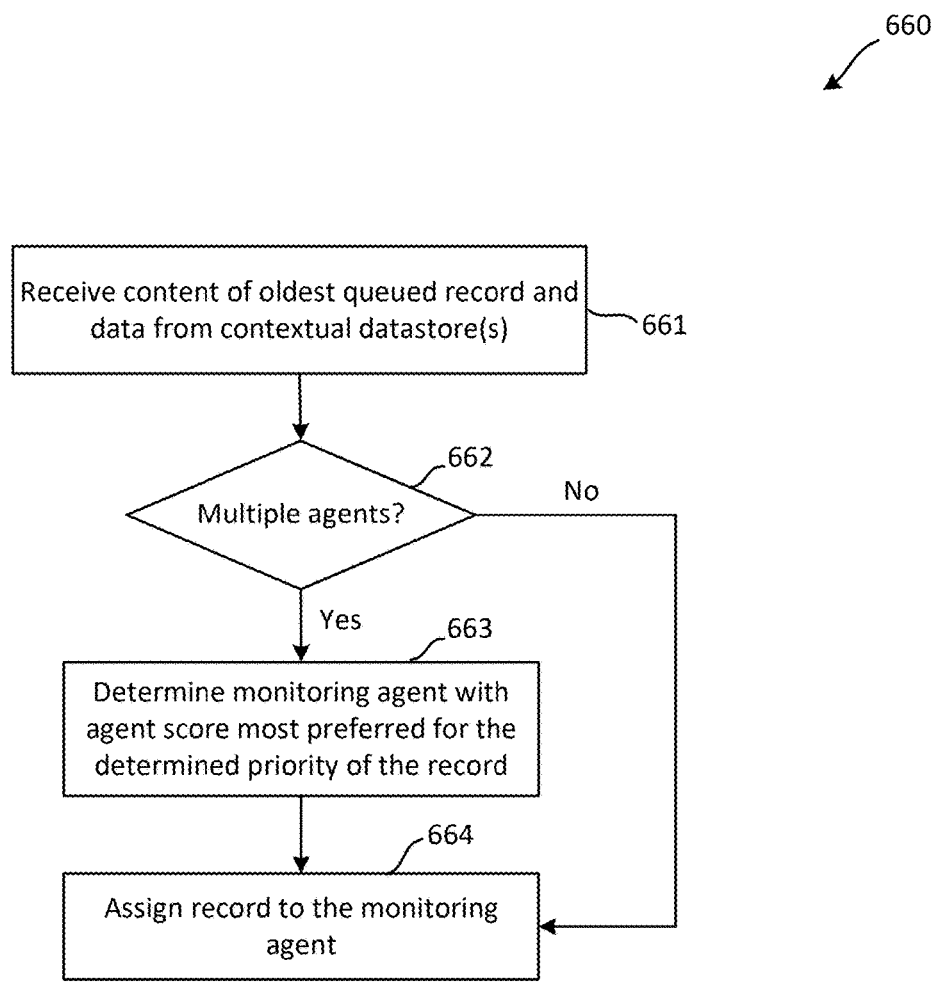
FIG. 6D is a flow chart showing a third example process that may be employed by the agent selection component shown in FIG. 6A to determine monitoring agents to whom queued records are to be assigned for review, according to some implementations of the present disclosure.

In instances where the number of queued records does not exceed the number of available monitoring agent review slots, the event distribution component 136 may assign a queued record to a qualified monitoring agent 716 as soon as the queued record is added to the table 202 and/or by assigning queued records to qualified monitoring agents 716 in the order of their timestamps 206 (with the queued records having the oldest time stamps being processed first), as is discussed below in connection with FIGS. 6C and 6D. On the other hand, in instances where the number of queued records exceeds the number of available monitoring agent review slots, the event distribution component 136 may instead assign queued records to monitoring agents 716 in an order that is based at least in part on the priorities 228 that have been determined for those records (e.g., the queued records with higher priorities 228 being assigned before queued records with lower priorities 228), as discussed below in connection with FIG. 6B. In the event that two queued records have priorities 228 with the same value, the event distribution component 136 may give priority to the oldest of the two records, e.g., the record having the least recent timestamp 206. Further, in some implementations, when the number of queued records exceeds the number of available monitoring agent review slots, the event distribution component 136 may "pull," or unassign, lower priority records from monitoring agents 716 to free up monitoring agent review slots for higher-priority records, as is discussed below in connection with FIG. 6B.

FIG. 6A is a computing architecture diagram illustrating example components and processing for managing the assignment of queued records to monitoring agents 716 in accordance with some implementations of the present disclosure. As shown, in some implementations, the event distribution component 136 may include an agent selection component 620 and an agent removal component 625. As noted above, in some implementations, the server(s) 108 of the monitoring service 106 may include instructions which, when executed by one or more processors of the server(s) 108, cause the server(s) 108 to implement the functionality of the event distribution component 136 described herein. Thus, in such implementations, the agent selection component 620 and the agent removal component 625 may be implemented, for example, by subsets of the instructions that implement the event distribution component 136, and may thus represent, for example, two sub-components of the event distribution component 136 that are configured to perform respective processes.

As shown in FIG. 6A, the agent selection component 620 may receive content 182 of a queued record (referred to herein as queued record content 182A) from the event/video datastore(s) 124, as well as data 184 concerning the availability/qualifications of monitoring agents 716 (referred to herein as monitoring agent availability data 184A) from monitoring agent datastore(s) 142C, and may use that information to assign the queued record to a particular monitoring agent 716 for review, e.g., by sending assignment instructions 186A to the event/video datastore(s) 124 for the record in question. As also shown in FIG. 6A, the agent removal component 625 may receive content 182 of a record that has already been assigned to a monitoring agent 716 for review (referred to herein as assigned record content 182B), from the event/video datastore(s) 124, as well as data 184 concerning the current status of monitoring agents 716 (referred to herein as monitoring agent status data 184B) from monitoring agent datastore(s) 142C, and may use that information to determine whether to unassign the record from the monitoring agent 716 to whom it was assigned, e.g., by sending agent assignment instructions 186B to the event/video datastore(s) 124 that cause the record in question to be unassigned from the monitoring agent 716 to whom it was previously assigned.

The queued record content 182A and/or the assigned record content 182B shown in FIG. 6A may correspond, for example, to the content 182 shown in FIG. 1. The monitoring agent datastore(s) 142C shown in FIG. 6A may correspond, for example, to one or more of the contextual datastore(s) 142 shown in FIG. 1, and the monitoring agent availability data 184A and/or the monitoring agent status data 184B shown in FIG. 6A may correspond, for example, to the data 184 shown in FIG. 1.

The monitoring agent availability data 184A the agent selection component 620 receives from the monitoring agent datastore(s) 142C may include, for example, various information about one or more available monitoring agents 716. For example, the monitoring agent availability data 184A may indicate: (A) a total number of monitoring agent review slots that are available to receive information corresponding to records, (B) identifiers of monitoring agents 716 who are available to review records (e.g., one or more agent IDs 230), (C) the number of empty/available review slots for individual monitoring agents 716, (D) one or more types of events, e.g., corresponding to event types 218 in the table 202, such as "outdoor camera activity," "indoor camera activity," etc., that individual monitoring agents 716 are qualified to review, (E) one or more feature types, e.g., corresponding the feature indicators 216 in the table 202, such as "weapon," that the monitoring agents 716 are qualified to review, (F) geographic locations/coordinates for which the monitoring agents 716 are qualified to review records, and/or (G) the relative levels of experience of individual monitoring agents 716 (referred to below as an "agent score"), such as "high," "medium," or "low," or a level/score, such as a number within a range of "0" to "100," or the like.

As noted above, in some implementations, the agent selection component 620 may receive and process both queued record content 182A and monitoring agent availability data 184A. In some implementations, the agent selection component 620 may be configured to retrieve the monitoring agent availability data 184A based on the information that is included in the queued record content 182A (e.g., based on feature indicators 216, an event type 218, a geographic location/coordinates identified within the record, etc.). In other words, upon receiving the queued record content 182A for a queued record, the agent selection component 620 may be configured to query the monitoring agent datastore(s) 142C for information sufficient to enable the agent selection component 620 to identify one or more monitoring agents 716 who (A) are available to review the queued record, and (B) are qualified to review that particular queued record.

As noted above, the order in which the agent selection component 620 selects and processes queued records (e.g., by retrieving the queued record content 182A and/or monitoring agent availability data 184A for respective records) may depend on the current state of the record queue. For example, if the agent selection component 620 determines that the number of queued records does not exceed the number of available monitoring agent review slots, then the agent selection component 620 may retrieve the queued record content 182A from the oldest queued record, such as the queued record that has the least recent timestamp 206. The oldest queued record may be selected to ensure timely handling of that event instead of selecting a record that occurred more recently. This way, no event goes unreviewed or otherwise unresolved for an extended period of time during the queuing process and agents are afforded an opportunity to intervene in timely fashion to assess and/or take necessary action(s) to address that event.

In some such implementations, the agent selection component 620 may retrieve the queued record content 182A from the queued record with the least recent timestamp 206 that does not exceed a threshold of age (e.g., does not exceed a threshold of ten minutes). A queued record having a timestamp 206 that exceeds the threshold age may indicate that a period of time to review the record in order to appropriately respond to the potential security concern or other activity of interest has lapsed. In some implementations, upon identifying a queued record having a timestamp 206 that exceeds the threshold age, the event distribution component 136 (or another component of the security system 100) may change the event status 224 for the record to "canceled" or "handled," thus effectively removing that record from the record queue.

Upon receiving the queued record content 182A from the oldest queued record (in a circumstance wherein the number of queued records does not exceed the number of available monitoring agent review slots), the agent selection component 620 may identify a monitoring agent 716 with an available monitoring agent review slot and determine whether that monitoring agent 716 is qualified to review the queued record. Example techniques the agent selection component 620 may use to identify and evaluate the qualifications of a monitoring agent 716 to review the queued record in such a circumstance (e.g., based on monitoring agent availability data 184A retrieved from monitoring agent datastore(s) 142C) are described below in connection with FIGS. 6C and 6D. Once the agent selection component 620 identifies a qualified monitoring agent 720, the agent selection component 620 may assign the queued record to that monitoring agent 716, such as by writing the agent ID 230 of the monitoring agent 716 to the queued record and changing the event status 224 for the queued record to "assigned."

If the agent selection component 620 instead determines that the number of queued records exceeds the number of available monitoring agent review slots, then the queued record content 182A may be retrieved from the queued record that has the highest priority 228. Since, in this circumstance, there are not enough available monitoring agent review slots available receive information for all the queued records in the event/video datastore(s) 124, some subset of the queued event records will need to remain unassigned temporarily until additional monitoring agent review slots become available. Accordingly, in this situation, to ensure the queued records that are most likely indicative of actual security concerns and/or other activities of interest are reviewed in a timely manner, it may be advantageous to give preference to the queued records having the highest priorities 228 when assigning the queued records to monitoring agents 716.

In some such examples, the agent selection component 620 may parse the event/video datastore(s) 124 (e.g., by calling an API of the event/video datastore(s) 124 to perform an appropriate query) to identify the queued record with the highest priority 228. In instances where two or more queued records have the same highest priority 228, the agent selection component 620 may select the queued record that is to be processed based on both the priority 228 and the recency of the events (e.g., as indicated by the timestamps 206 of the queued records). In some implementations, for example, the agent selection component 620 may select, from amongst two or more queued records having the same highest priority 228, the queued record corresponding to the least recent event.

In some instances where the agent selection component 620 determines that the number of queued records exceeds the number of available monitoring agent review slots, the agent selection component 620 may swap a queued record with a lower priority record that has already been assigned to a monitoring agent 716. In other words, in response to determining that the number of queued records exceeds the number of available monitoring agent review slots, and after retrieving the queued record content 182A, the agent selection component 620 may parse the event/video datastore(s) 124 (e.g., by calling an API of the event/video datastore(s) 124 to perform an appropriate query) to identify the queued record with the lowest priority 228 that is currently assigned to a monitoring agent 716. The agent selection component 620 may compare the identified record's priority 228 with the priority 228 for the queued record under consideration. If the identified record's priority 228 is lower than the priority 228 for the queued record, the agent selection component 620 may determine whether the monitoring agent 716 is qualified to review the queued record. Example techniques the agent selection component 620 may use in such a circumstance to determine whether the monitoring agent 716 is qualified to review the queued record (e.g., based on monitoring agent availability data 184A retrieved from monitoring agent datastore(s) 142C) are described below in connection with FIG. 6B.

If the agent selection component 620 determines that the monitoring agent 716 under consideration is qualified to review the queued record, the agent selection component 620 may unassign the previously assigned record from that monitoring agent 716 and assign the queued record to that same monitoring agent 716. To unassign the previously assigned record from the monitoring agent 716, the agent selection component 620 may, for example, send agent assignment instructions 186A to the event/video datastore(s) 124 that cause the agent ID 230 corresponding to the monitoring agent 716 to be removed from the record and cause the event status 224 of the record to be changed from "assigned" to "new." To assign the queued record to that same monitoring agent 716, the agent selection component 620 may, for example, send agent assignment instructions 186A to the event/video datastore(s) 124 that cause the agent ID 230 of the monitoring agent 716 to be added to the queued record and cause the event status 224 for the queued record to be changed from "new" to "assigned."

As noted above, in some implementations, the agent removal component 625 may receive content 182B of an assigned record, e.g., i.e., a record that has already been assigned to a monitoring agent 716 for review, from the event/video datastore(s) 124, as well as monitoring agent status data 184B, e.g., information concerning the current status of monitoring agents 716, from monitoring agent datastore(s) 142C, and may use that information to determine whether to unassign the record from the monitoring agent 716 to whom it was assigned. The agent removal component 625 may unassign a record from a monitoring agent 716, for example, by sending agent assignment instructions 186B to the event/video datastore(s) 124 that cause the record in question to be unassigned from the monitoring agent 716 to whom it was previously assigned, e.g., by removing the agent ID 230 of the monitoring agent 716 from the record and changing the event status 224 of the record from "assigned" to "new."

The assigned record content 182B may correspond, for example, some or all of the information within a record that has been assigned to a monitoring agent 716, such as the event status 224 for the record, the filtering control 222 for the record, etc. The monitoring agent status data 184B may correspond, for example, to one or more items of information relating to monitoring agent 716 to whom the record has been assigned, such as whether the monitoring agent 716 is logged in/out, a timestamp indicating when the record was assigned to the monitoring agent 716, etc. As is discussed in detail below in connection with FIG. 6E, the agent removal component 625 may determine whether a record is to be unassigned from a monitoring agent 716 based on any of a number of criteria, such as whether the assigned record content 182B indicates that the record is inactive, whether the assigned record content 182B indicates the record has been marked as filtered, whether the assigned record content 182B indicates the record has an event status 224 of "grouped" or "hold," whether the monitoring agent status data 184B indicates the record has been assigned to the monitoring agent 716 for more than a threshold amount of time, whether the monitoring agent status data 184B indicates the monitoring agent 716 is logged out, etc.

In some implementations, that agent removal component 625 may continuously parse the table 202 (e.g., by calling an API of the event/video datastore(s) 124 to perform an appropriate query) to identify records that have been assigned to monitoring agents 716. The agent removal component 625 may retrieve assigned record content 182B corresponding to an identified, assigned record to perform the abovementioned processing.

As shown in FIG. 6A, if the agent removal component 625 determines that a record is to be unassigned from a monitoring agent 716, then the agent removal component 625 may provide agent assignment instructions 186B to the event/video datastore(s) 124 that, for example, cause the agent ID 230 of the monitoring agent 716 to be removed from the record and that cause the event status 224 for the record to be changed from "assigned" to "new." In some implementations, the agent removal component 625 may further write data to a portion of the monitoring agent datastore(s) 142C indicating that the record has been unassigned from the review slot for the monitoring agent 716, thus allowing the agent selection component 620 to assign another queued record to that monitoring agent review slot in an appropriate circumstance.

In some implementations, as described in more detail below in connection with FIG. 6E, the agent removal component 625 may additionally or alternatively be configured to unassign from monitoring agents 716 one or more records that are determined to correspond to the same monitored location 104 as a record for which a monitoring agent 716 has begun a further review process. For example, in some implementations, the agent removal component 625 may determine whether the assigned record content 182B for a record indicates that the event status 224 for the record is "reviewing." In response to such a determination, the agent removal component 625 may unassign from monitoring agents 716 one or more other records in the table 202 that correspond to the same monitored location 104 (e.g., that have the same location ID 210) as the record with the "reviewing" event status 224. For example, the agent removal component 625 may send agent assignment instructions 186B to the event/video datastore(s) 124 that cause the agent ID(s) 230 of the monitoring agent(s) 716 to be removed from the record(s) and that cause the event status(es) 224 of the record(s) to be changed from "assigned" to "new." In some implementations, the agent removal component 625 may further write data to portions of the monitoring agent datastore(s) 142C indicating that the records have been unassigned from the review slots for such monitoring agents 716, thus allowing the agent selection component 620 to assign other queued records to such monitoring agent review slots in appropriate circumstances.

FIG. 6B is a flow chart showing an example process 630 that may be executed by the agent selection component 620 to determine a monitoring agent 716 to whom a queued record is to be assigned in accordance with some implementations of the present disclosure. As shown in FIG. 6B, the process 630 may begin at a step 631, at which the agent selection component 620 may determine a number of queued records that are currently present in the event/video datastore(s) 124.

As discussed above, a queued record may correspond to a record that is in need of review by a monitoring agent 716, but has not yet been assigned to a monitoring agent 716 for review. As further discussed above, the event distribution component 136 may be configured to perform some or all of the automated processing described herein (e.g., the process 630) only for queued records, e.g., active records that have an event status 224 of "new" (as opposed to "assigned," "reviewing," or "hold") and that do not have a filtering control 222 that indicates the record has been marked as filtered. As such, in some implementations, determining the number of queued records may include the agent selection component 620 determining a number of records included in the table 202 that both (A) have event statuses 224 of "new," and (B) do not have filtering controls 222 indicting the records have been marked as filtered.

In other implementations, the table 202 may be configured with an additional column (not shown in FIG. 2) that signifies whether or not particular records are currently within the record queue, such as a column having a value or "1" if a record is in the record queue and a value of "0" if the record is not in the record queue, and the agent selection component 620 may rely on that column to determine the number of queued records per the step 631 and/or to otherwise identify queued records within the table 202. In such an implementation, another process may be implemented by the event distribution component 136, or another component of the security system 100 (e.g., the event filtering and grouping component 132), to continually evaluate the event statuses 224 and filtering controls 222 of records to determine appropriate values of the column signifying whether the records are in the record queue.

At a step 632 of the process 630, the agent selection component 620 may determine a number of available monitoring agent review slots. As noted above, in some implementations, the agent selection component 620 may determine the number of available monitoring agent review slots based on monitoring agent availability data 184A received from the monitoring agent datastore(s) 142C. For example, in some implementations, the agent selection component 620 may query the monitoring agent datastore(s) 142C for the number of available review slots across all available monitoring agents 716. The agent selection component 620 may, for instance, query the monitoring agent datastore(s) 142C for metadata about the monitoring agents 716 who are currently available to review records, and may parse that metadata to identify the number of available monitoring agent review slots for those monitoring agents 716.

At a decision 633 of the process 630, the agent selection component 620 may compare the number of queued records determined at the step 631 with the number of available monitoring agent review slots determined at the step 632 to determine whether the number of queued records determined at the step 631 exceeds the number of available monitoring agent review slots determined at the step 632.

When, at the decision 633, the agent selection component 620 determines that the number of queued records exceeds the number of available monitoring agent review slots, the process 630 may proceed to a step 635, at which the agent selection component 620 may receive queued record content 182A for the queued record in the table 202 that has the highest priority 228. As noted above, the queued record content 182A may include one or more items of information from the queued record, such as a priority 228 of the queued record, feature indicators 216 within the queued record, a geographic location/coordinates of the monitored location 104 corresponding to the queued record, a description of the queued record, a filtering control 222 for the queued record, etc.

When, at the decision 633, the agent selection component 620 determines that the number of queued records does not exceed the number of available monitoring agent review slots, the process 630 may instead proceed to a step 634, at which the agent selection component 620 may execute the process 650 or the process 660, as discussed below in connection with FIGS. 6C and 6D, respectively.

At a step 636 of the process 630, the agent selection component 620 may determine, amongst the records in the table 202 that have already been assigned to monitoring agents 716 and that have not yet been considered by the decision 637 and subsequent steps, the record that has the lowest priority 228. In some implementations, the agent selection component 620 may identify the records that have already been assigned to monitoring agents 716 by parsing the table 202 to identify the records that have event statuses 224 of "assigned." In instances where two or more assigned records have the same lowest priority 228, the agent selection component 620 may determine the assigned record at the step 636 based on both the priority 228 and the recency of the events (e.g., as indicated by the timestamps 206 of the assigned records). In some implementations, for example, the agent selection component 620 may select, from amongst two or more assigned records having the same lowest priority 228, the assigned record corresponding to the most recent event.

At a decision 637, the agent selection component 620 may compare the priority 228 of the queued record for which the queued record content 182A was received at the step 635 with the priority 228 of the assigned record identified at the step 636 to determine whether the priority 228 of the queued record for which the queued record content 182A was received at the step 635 is higher than the priority 228 of the assigned record identified at the step 636.

When, at the decision 637, the agent selection component 620 determines that the priority 228 of the queued record under consideration is higher than the priority 228 of the assigned record identified at the step 636, the process 630 may proceed to a step 638, at which the agent selection component 620 may receive monitoring agent availability data 184A from the monitoring agent datastore(s) 142C. As discussed above, the monitoring agent availability data 184A may include one or more items of information relating to one or more monitoring agent(s) 716, such as data identifying the one or more monitoring agents 716 (e.g., agent IDs 230), data indicating an availability of the monitoring agents 716, data indicating one or more types of events that the monitoring agents 716 are qualified to review, data indicating one or more geographic locations/coordinates for which the monitoring agents 716 are qualified to review records, data indicating agent scores for the monitoring agents 716, etc.

When, at the decision 637, the agent selection component 620 determines that the priority 228 for the queued record under consideration is not higher than the priority 228 for the record identified at the step 636, the process 630 may return to the step 631.

At a decision 639, the agent selection component 620 may determine whether the monitoring agent 716 to whom the record identified at the step 636 has been assigned is qualified to review the type of event that is represented by the queued record. The type of event that is represented by the queued record may be determined, for example, based one or more of the event type 218 for the record, the feature indicator(s) 216 for the record, the priority 228 for the record, etc. Data that indicates the qualifications of the monitoring agent 716 under consideration may be determined, for example, based on the monitoring agent availability data 184A received at the step 638. In some implementations, the agent selection component 620 may determine whether that monitoring agent 716 is qualified to review the type of event represented by the queued record under consideration by determining whether the qualifications of the monitoring agent 716 indicated in the monitoring agent availability data 184A are adequate to review the type of event represented by the queued record under consideration.

When, at the decision 639, the agent selection component 620 determines that the monitoring agent 716 to whom the record identified at the step 636 has been assigned is qualified to handle the event type in question, the process 630 may proceed to a decision 641, at which the agent selection component 620 may determine whether that monitoring agent 716 is qualified to review events that occurred within the geographic location/coordinates identified in the queued record under consideration. Such geographic location/coordinates may be determined, for example, based on the location ID 210 for the queued record. In some implementations, the agent selection component 620 may use the location ID 210 of the queued record under consideration to query the monitoring agent datastore(s) 142C or another repository to obtain data representing the geographic location/coordinates of the monitored location 104. Data that indicates the qualifications of the monitoring agent 716 under consideration, and which may be used to determine whether that monitoring agent 716 is qualified to review events that occurred within the geographic location/coordinates of the monitored location 104 (as described above), may be determined, for example, based on the monitoring agent availability data 184A received at the step 638. In some implementations, the agent selection component 620 may determine whether the monitoring agent 716 is qualified to review events that occurred within the geographic location/coordinates identified in the queued record under consideration by determining whether the qualifications of the monitoring agent 716 indicated in the monitoring agent availability data 184A are adequate to review events that occurred within the geographic location/coordinates identified in the queued record under consideration.

When, at the decision 639, the agent selection component 620 determines that the monitoring agent 716 to whom the record identified at the step 636 has been assigned is not qualified to handle the event type in question, the process 630 may instead proceed to a decision 640, at which the agent selection component 620 may determine whether there are any remaining records included in the table 202 that (A) are currently assigned to a monitoring agent 716, and (B) have not yet been considered by the decisions 639 and/or 641. In some implementations, for instance, the agent selection component 620 may track the assigned records it has selected at the step 636 and evaluated at the decision 639 and/or 641, so that if the step 636 is repeated following the decision 640, then the agent selection component 620 will not identify that same assigned record a second time and will instead identify the assigned record having the next highest priority 228 (or which is the next most recent if two or more assigned records have the same next highest priority 228).

When, at the decision 640, the agent selection component 620 determines that there are one or more records included in the table 202 that are currently assigned to a monitoring agent 716 and have not yet been considered by the decisions 639 and/or 641, the process 630 may return to the step 636 (described above), at which the agent selection component 620 may identify, amongst the remaining assigned records identified at the decision 640, the assigned record that has the lowest priority 228. As noted above, in some implementations, the agent selection component 620 may track the assigned records it has selected at the step 636 and evaluated at the decision 639 and/or 641, so that when the step 636 is repeated following the decision 640, the agent selection component 620 will not identify that same assigned record a second time and will instead identify the assigned record having the next highest priority 228 (or which is the next most recent if two or more assigned records have the same next highest priority 228).

When, at the decision 640, the agent selection component 620 determines that there are no remaining records included in the table 202 that are currently assigned to a monitoring agent 716 and have not yet been considered by the decisions 639 and/or 641, the process 630 may return to the step 631.

When, at the decision 641, the agent selection component 620 determines (e.g., as described above) that the monitoring agent 716 to whom the record identified at the step 636 has been assigned is qualified to review events that occurred within the geographic location/coordinates identified in the queued record under consideration, the process 630 may proceed to a step 642, at which the agent selection component 620 may unassign the record identified at the step 636 from that monitoring agent 716 (e.g., by sending agent assignment instructions 186A to the event/video datastore(s) 124 that cause the agent ID 230 for the monitoring agent 716 to be removed from the record identified at the step 636 and that cause the the event status 224 for the record identified at the step 636 to be changed from "assigned" to "new").

At a step 643, the agent selection component 620 may assign the queued record under consideration (per the step 635) to the monitoring agent 716 to whom the record identified at the step 636 had previously been assigned. For example, the agent selection component 620 may send agent assignment instructions 186A to the event/video datastore(s)

124 that cause the agent ID 230 for that monitoring agent to be added to the queued record and that cause the event status 224 for the queued record to be changed from "new" to "assigned").

FIG. 6C is a flow chart showing an example process 650 that may be employed by the agent selection component 620 to determine a monitoring agent 716 to whom a queued record is to be assigned in accordance with some implementations of the present disclosure. As noted above, in some implementations, the process 650 may be employed when the agent selection component 620 determines, per the decision 633 of the process 630 (shown in FIG. 6B), that the number of queued records determined at the step 631 does not exceed the number of available monitoring agent review slots determined at the step 632.

As shown in FIG. 6C, the process 650 may begin at a step 651, at which the agent selection component 620 may receive queued record content 182A and monitoring agent availability data 184A corresponding to an oldest queued record. As discussed above, the agent selection component 620 may identify the oldest queued record, for example, based on the timestamps 206 for the queued records in the table 202. As noted above, the queued record content 182A may include one or more items of information from the queued record, such as a priority 228 of the queued record, feature indicators 216 within the queued record, a geographic location/coordinates of the monitored location 104, a description of the queued record, a filtering control 222 for the queued record, etc., and the monitoring agent availability data 184A may include one or more items of information relating to one or more monitoring agent(s) 716, such as data identifying the one or more monitoring agents 716 (e.g., agent IDs 230), data indicating the availability of the monitoring agents 716, data indicating one or more types of events that individual monitoring agents 716 are qualified to review, data indicating one or more geographic locations/coordinates for which individual monitoring agents 716 are qualified to review records, data indicating agent scores of the monitoring agents 716, data indicating the current or recent workload of the individual monitoring agents 716 (e.g., information concerning the quantity and/or relative complexity of events that the individual monitoring agents 716 are currently handling or have recently handed), etc.

At a decision 652 of the process 650, the agent selection component 620 may determine whether a given monitoring agent 716 of the one or more monitoring agents 716 indicated by the monitoring agent availability data 184A received at the step 651 is currently active (e.g., whether the monitoring agent availability data 184A indicates that the monitoring agent 716 is logged in to a monitoring application 718). In some implementations, a monitoring agent 716 may additionally or alternatively be determined to be inactive for purposes of assigning new records if the monitoring agent availability data indicates that the agent recently finished handling an escalated event (e.g., within the previous 10 minutes), thus given the agent adequate time to dispatch emergency services and/or calm down after dealing with an escalated event.

When, at the decision 652, the agent selection component 620 determines that the monitoring agent under consideration is not currently active, the process 650 may proceed to a step 653, at which the agent selection component 620 may identify another monitoring agent 716 of the one or more monitoring agents 716 indicated by the monitoring agent availability data 184A received at the step 651, and the process 650 may return to the decision 652 at which the agent selection component 620 may determine whether that monitoring agent is currently active (e.g., whether the monitoring agent availability data 184A indicates that the monitoring agent 716 is logged in to a monitoring application 718). This process may continue until a monitoring agent 716 who is currently active is identified at the decision 652. In some implementations, agent selection component 620 may track the monitoring agents 716 it has selected at the step 653 and evaluated pursuant to the process 650, so that when the step 653 is repeated during the process 650, the agent selection component 620 will not identify that same monitoring agent a second time and will instead identify a monitoring agent 716 that has not yet been considered during the process 650.

When, at the decision 652, the agent selection component 620 determines that the monitoring agent 716 under consideration is currently active, the process 650 may proceed to a decision 654, at which the agent selection component 620 may determine whether the monitoring agent 716 is qualified to review the type of event that is represented by the queued record. The type of event that is represented by the queued record may be determined, for example, based one or more of the event type 218 for the record, the feature indicator(s) 216 for the record, the priority 228 for the record, etc. Data that indicates the qualifications of the monitoring agent 716 under consideration may be determined, for example, based on the monitoring agent availability data 184A received at the step 651. In some implementations, the agent selection component 620 may determine whether that monitoring agent 716 under consideration is qualified to review the type of event represented by the queued record under consideration by determining whether the qualifications of the monitoring agent 716 indicated in the monitoring agent availability data 184A are adequate to review the type of event represented by the queued record under consideration.

When, at the decision 654, the agent selection component 620 determines that the monitoring agent 716 under consideration is qualified to handle the event type in question, the process 650 may proceed to a decision 655, at which the agent selection component 620 may determine whether that monitoring agent 716 is qualified to review events that occurred within the geographic location/coordinates identified in the queued record under consideration. Such geographic location/coordinates may be determined, for example, based on the location ID 210 for the queued record. In some implementations, the agent selection component 620 may use the location ID 210 of the queued record under consideration to query the monitoring agent datastore(s) 142C or another repository to obtain data representing the geographic location/coordinates of the monitored location 104. Data that indicates the qualifications of the monitoring agent 716 under consideration, and which may be used to determine whether that monitoring agent 716 is qualified to review events that occurred within the geographic location/coordinates of the monitored location 104 (as described above), may be determined, for example, based on the monitoring agent availability data 184A received at the step 651. In some implementations, the agent selection component 620 may determine whether the monitoring agent 716 under consideration is qualified to review events that occurred within the geographic location/coordinates identified in the queued record under consideration by determining whether the qualifications of the monitoring agent 716 indicated in the monitoring agent availability data 184A are adequate to review events that occurred within the geographic location/coordinates identified in the queued record under consideration.

When, at the decision 654, the agent selection component 620 determines that the monitoring agent 716 under consideration is not qualified to review the type of event that is represented by the queued record, the process 650 may instead proceed to the step 653 (described above).

When, at the decision 655, the agent selection component 620 determines that the monitoring agent 716 under consideration is qualified to review events that occurred within the geographic location/coordinates identified in the queued record, the process 650 may proceed to a decision 656, at which the agent selection component 620 may determine whether the monitoring agent 716 has an empty/available monitoring agent review slot. The agent selection component 620 may make such a determination, for example, by evaluating the information in the monitoring agent availability data 184A received at the step 651 to determine whether that information indicates the monitoring agent 716 has one or more empty/available monitoring agent review slots.

When, at the decision 655, the agent selection component 620 determines that the monitoring agent 716 under consideration is not qualified to review events that occurred within the geographic location/coordinates identified in the queued record, the process 650 may instead proceed to the step 653 (described above).

When, at the decision 656, the agent selection component 620 determines that the monitoring agent 716 under consideration has at least one empty/available monitoring agent review slot, the process 650 may proceed to a step 657, at which the agent selection component 620 may assign the queued record to the monitoring agent 716. For example, the agent selection component 620 may send agent assignment instructions 186A to the event/video datastore(s) 124 that causes the agent ID 230 for that monitoring agent 716 to be added to the queued record and causes the event status 224 for the queued record to change from "new" to "assigned."

When, at the decision 656, the agent selection component 620 determines that the monitoring agent 716 agent under consideration does not have at least one empty/available monitoring agent review slot, the process 650 may instead proceed to the step 653, at which the agent selection component 620 may identify another monitoring agent 716 to be considered by the process 650, as described above.

FIG. 6C is a flow chart showing another example process 660 that may be employed by the agent selection component 620 to determine a monitoring agent 716 to whom a queued record is to be assigned in accordance with some implementations of the present disclosure. As noted above, in some implementations, the process 660 may be employed when the agent selection component 620 determines, per the decision 633 of the process 630 (shown in FIG. 6B), that the number of queued records determined at the step 631 does not exceed the number of available monitoring agent review slots determined at the step 632.

As shown in FIG. 6D, the process 660 may begin at a step 661, at which the agent selection component 620 may receive queued record content 182A and monitoring agent availability data 184A corresponding to an oldest queued record. As discussed above, the agent selection component 620 may identify the oldest queued record, for example, based on the timestamps 206 for the queued records in the table 202. As noted above, the queued record content 182A may include one or more items of information from the queued record, such as a priority 228 of the queued record, feature indicators 216 within the queued record, a geographic location/coordinates of the monitored location 104, a description of the queued record, a filtering control 222 for the queued record, etc., and the monitoring agent availability data 184A may include one or more items of information relating to one or more monitoring agent(s) 716, such as data identifying the one or more monitoring agents 716 (e.g., agent IDs 230), data indicating the availability of the monitoring agents 716, data indicating one or more types of events that individual monitoring agents 716 are qualified to review, data indicating one or more geographic locations/coordinates for which individual monitoring agents 716 are qualified to review records, data indicating agent scores of the monitoring agents 716, data indicating the current or recent workload of the individual monitoring agents 716 (e.g., information concerning the quantity and/or relative complexity of events that the individual monitoring agents 716 are currently handling or have recently handed), etc.

At a decision 662 of the process 660, the agent selection component 620 may determine whether the monitoring agent availability data 184A indicates that multiple (e.g., more than one) monitoring agents 716 (A) have at least one empty/available monitoring agent review slot, (B) are qualified to review the type of event that is represented by the queued record, and (C) are qualified to review events that occurred within the geographic location/coordinates identified in the queued record. Example techniques that the agent selection component 620 may employ to make to determine whether such criteria are met for individual monitoring agents 716 are described above in connection with decisions 652, 654, 655, and 656 of the process 650 shown in FIG. 6C.

When, at the decision 662, the agent selection component 620 determines that the monitoring agent availability data 184A indicates that multiple (e.g., more than one) monitoring agents 716 (A) have at least one empty/available monitoring agent review slot, (B) are qualified to review the type of event that is represented by the queued record, and (C) are qualified to review events that occurred within the geographic location/coordinates identified in the queued record, the process 660 may proceed to a step 663, at which the agent selection component 620 may use scores (e.g., agent scores as described above) and possibly other qualifications/limitations of the monitoring agents reflected in the monitoring agent availability data 184A, together with the location ID 210, the event type 218 and/or the priority 228 of the queued record to identify the monitoring agent 716 who is the most qualified or preferred to review the queued record. Several example techniques that may be used to perform the step 663 are described above in connection with FIG. 6A. In some implementations, the agent selection component 620 may additionally or alternatively take into account information in the monitoring agent availability data 184A that indicates the current or recent workload of the individual monitoring agents 716 (e.g., information concerning the quantity and/or relative complexity of events that the individual monitoring agents 716 are currently handling or have recently handed) when determining the monitoring agent 716 who is the most qualified or preferred to review a queued record, thus helping to ensure an even distribution of work to respective monitoring agents 716.

At the step 664 of the process 660, the agent selection component 620 may assign the queued record to the monitoring agent 716 identified at the step 663. For example, the agent selection component 620 may send agent assignment instructions 186A to the event/video datastore(s) 124 that cause the agent ID 230 of the identified monitoring agent 716 to be added to the queued record and cause the event status 224 for the queued record to change from "new" to "assigned."

When, at the decision 662, the agent selection component 620 determines that the monitoring agent availability data 184A indicates that only one monitoring agent 716 has at least one empty/available monitoring agent review slot, (B) is qualified to review the type of event that is represented by the queued record, and (C) is qualified to review events that occurred within the geographic location/coordinates identified in the queued record, the process 660 may instead proceed directly to the step 664 of the process 660, at which the agent selection component 620 may send agent assignment instructions 186A to the event/video datastore(s) 124 to cause the queued record to be assigned to that monitoring agent 716, as described above.

Figure 6E:
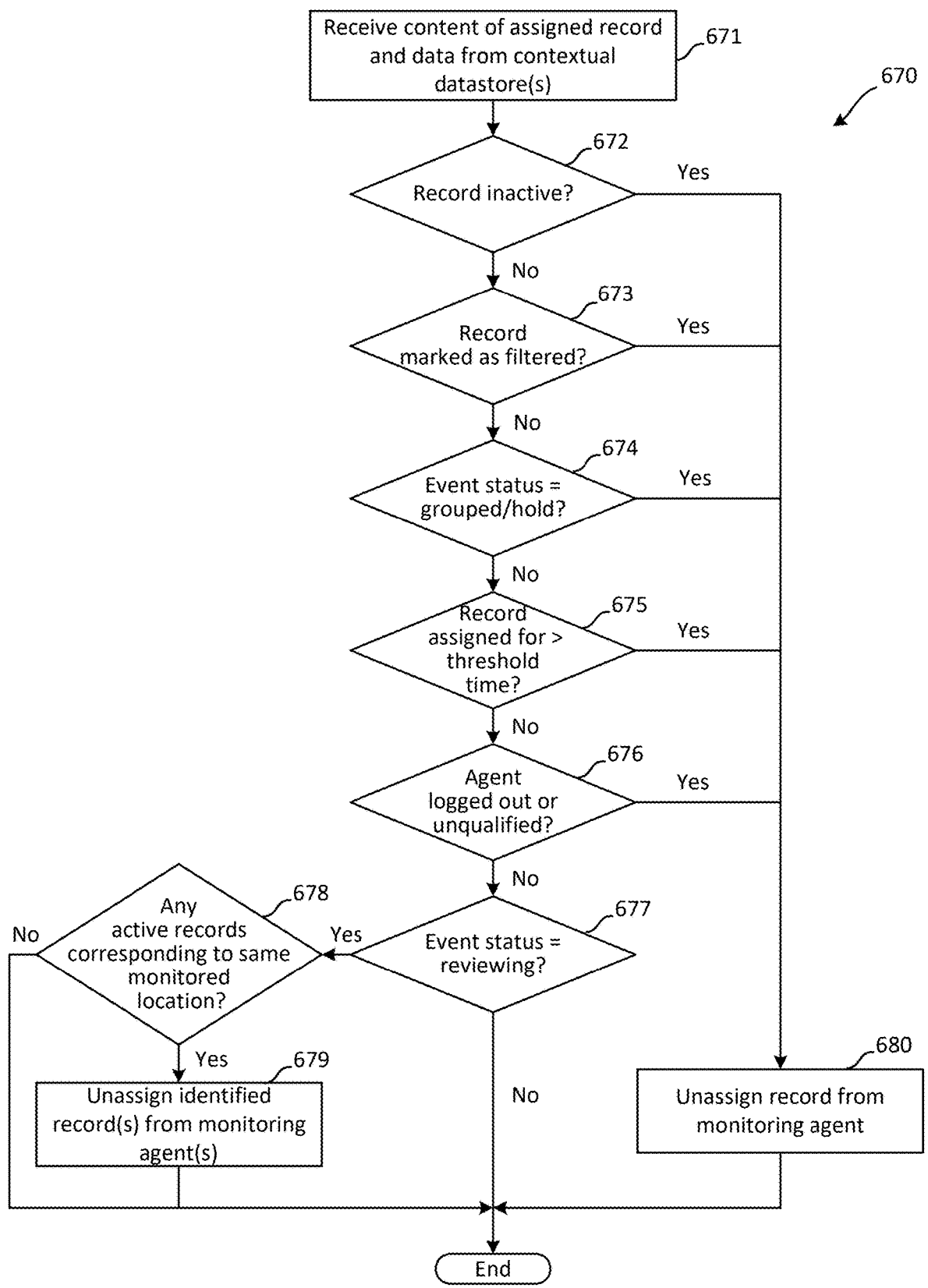
FIG. 6E is a flow chart showing a fourth example process that may be employed by the agent removal component shown in FIG. 6A to determine whether one or more records are to be unassigned from monitoring agents, according to some implementations of the present disclosure.

FIG. 6E is a flow chart showing an example process 670 that may be employed by the agent removal component 625 (shown in FIG. 6A) to determine whether a currently assigned record is to be unassigned from a monitoring agent 716 in accordance with some implementations of the present disclosure. As shown in FIG. 6E, the process 670 may begin at a step 671, at which the agent removal component 625 may receive assigned record content 182B and/or monitoring agent status data 184B corresponding to an assigned record. As discussed above in connection with FIG. 6A, the assigned record content 182B may include one or more items of information from a record stored in the event/video datastore(s) 124, such as an event status 224 for the record, an agent ID 230 for the monitoring agent 716 to whom the record has been assigned, a timestamp representing when the record was assigned to the monitoring agent 716, a description of the record, a filtering control 222 for the record, etc. The agent removal component 625 may, for example, periodically, occasionally, or continuously evaluate records in the event/video datastore(s) 124 (e.g., by using an API of the event video datastore(s) 124 to execute an appropriate query) that have event statuses 224 of "assigned" to determine whether those records should be unassigned from monitoring agents 716 for any of a number of reasons (examples of which are described below). Receipt of the assigned record content 182B and monitoring agent status data 184B per the step 671 may, for example, represent an instance of the agent removal component 625 beginning such an evaluation process for one such assigned record.

At a decision 672 of the process 670, the agent removal component 625 may determine whether the record is inactive. For example, in some implementations, the agent removal component 625 may evaluate the event status 224 indicated in the assigned record content 182B and, if the event status 224 is "canceled," "handled," "expired," or "dispatch," then the agent removal component 625 may determine that the record is inactive.

When, at the decision 672, the agent removal component 625 determines that the assigned record is inactive, the process 670 may proceed to a step 680, at which the agent removal component 625 may unassign the record from the monitoring agent 716 to whom it was assigned. For example, the agent removal component 625 may send agent assignment instructions 186B to the event/video datastore(s) 124 that cause the agent ID 230 of the monitoring agent 716 to whom the record was assigned to be removed from the record in the table 202.

When, at the decision 672, the agent removal component 625 determines that the record is not inactive, the process 670 may proceed to a decision 673, at which the agent removal component 625 may determine whether the record has been marked as filtered. For example, as discussed above, the agent removal component 625 may determine whether a filtering control 222 for the record (included in the assigned record content 182B) indicates that the record is currently marked as filtered.

When, at the decision 673, the agent removal component 625 determines that the record has been marked as filtered, the process 670 may proceed to the step 680, at which the agent removal component 625 may unassign the record from the monitoring agent 716 to whom it was assigned (as described above).

When, at the decision 673, the agent removal component 625 determines that the record is not marked as filtered, the process 670 may proceed to a decision 674, at which the agent removal component 625 may determine whether the event status 224 for the record indicates that the record has been grouped with one or more other records. For example, as discussed above, the agent removal component 625 may determine whether the event status 224 for the record (included in the assigned record content 182B) has a value of "hold."

When, at the decision 674, the agent removal component 625 determines that the event status 224 for the record indicates that the record has been grouped with one or more other records, the process 670 may proceed to the step 680, at which the agent removal component 625 may unassign the record from the monitoring agent 716 to whom it was assigned (as described above).

When, at the decision 674, the agent removal component 625 determines that the event status 224 for the record does not indicate that the record has been grouped with one or more other records, the process 670 may proceed to a decision 675, at which the agent removal component 625 may determine whether the record has been assigned to a monitoring agent 716 for more than a period of time (e.g., a threshold amount of time). For example, as discussed above, the agent removal component 625 may determine whether a difference between a timestamp corresponding to the time at which the record was assigned to the monitoring agent 716 and a current time exceeds a threshold amount of time (e.g., 5 minutes).

When, at the decision 675, the agent removal component 625 determines that the record has been assigned to the monitoring agent 716 for more than the period of time, the process 670 may proceed to the step 680, at which the agent removal component 625 may unassign the record from the monitoring agent 716 to whom it was assigned (as described above).

When, at the decision 675, the event distribution component determines that the record has not been assigned to the monitoring agent 716 for more than the period of time, the process 670 may proceed to a decision 676, at which the agent removal component 625 may determine whether the monitoring agent 716 to which the record is assigned is logged out, inactive or otherwise is not qualified to review the record. The agent removal component 625 may determine whether the monitoring agent 716 is logged out, for example, based on the monitoring agent status data 184B received from the monitoring agent datastore(s) 142C per the step 671. The agent removal component 625 may determine that the monitoring agent 716 is unqualified to review the record, for example, based on an updated threat score generated by the event prioritization component 134 or some other pertinent change in the assigned record content 182B and/or the monitoring agent status data 184B received per the step 671. Examples of various techniques the agent removal component 625 may use to determine the on-line status of monitoring agents 716 and/or the suitability of monitoring agents 716 to review particular assigned records are described above in connection with the decisions 652, 654, and 655 of the process 650 shown in FIG. 6C.

When, at the decision 676, the agent removal component 625 determines that the monitoring agent 716 is logged out or is not qualified to review the record in question, the process 670 may proceed to the step 680, at which the agent removal component 625 may unassign the record from the monitoring agent 716 to whom it was assigned (as described above).

When, at the decision 676, the event distribution component determines that the monitoring agent 716 is not logged out/remains active and is qualified to review the record in question, the process 670 may proceed to a decision 677, at which the agent removal component 625 may determine whether the event status 224 for the record indicates that a monitoring agent 716 has entered into a further review of the record. For example, as discussed above, the agent removal component 625 may make such a determination by evaluating whether the event status 224 for the record (indicated in the assigned record content 182B) has a value of "reviewing."

When, at the decision 677, the agent removal component 625 determines that the event status 224 for the record indicates that a monitoring agent 716 has entered into a further review of the record, the process 670 may proceed to a decision 678, at which the agent removal component 625 may determine whether any of the active records included in the table 202 correspond to the same monitored location 104 as the record under consideration. For example, as discussed above, the agent removal component 625 may make such a determination by evaluating whether any active records in the table 202 have a same location ID 210 as the location ID 210 for the record under consideration.

When, at the decision 677, the agent removal component 625 determines that the event status 224 for the record under consideration does not indicate that the monitoring agent 716 has entered into a further review of the record, the process 670 may terminate.

When at the decision 678, the agent removal component 625 determines that one or more active records included in the table 202 correspond to the same monitored location 104 as the record under consideration, the process 670 may proceed to a step 679, at which the agent removal component 625 may unassign such record(s) from the monitoring agent(s) 716 to whom they were assigned. For example, the agent removal component 625 may send agent assignment instructions 186B to the event/video datastore(s) 124 that cause the agent ID(s) 230 of the monitoring agent(s) 716 to be removed from the identified record(s) in the table 202 and cause the event status(es) 224 for those record(s) to be changed from "assigned" to "hold."

When, at the decision 678, the agent removal component 625 determines that none of the records included in the table 202 correspond to the same monitored location 104 as the current record, the process 670 may terminate.

F. THE MONITORING APPLICATION

As shown in FIGS. 7A and 8A, in some implementations, the security system 100 may include monitoring devices 714 operated by respective monitoring agents 716. The monitoring application 718 shown in FIGS. 7A and 8A may, for example, be a software application that is executed under control of an individual monitoring device 714. For instance, the monitoring device 714 shown in FIGS. 7A and 8A may include one or more computer-readable mediums encoded with instructions which, when executed by one or more processors of the monitoring device 714, cause the monitoring device 714 to implement the functionality of the monitoring application 718 described herein. In some implementations, the monitoring application 718 may be a web application that is delivered to the monitoring device 714 by a component of the monitoring service 106 (e.g., by a web server within the monitoring center environment 922 shown in FIG. 9) and executed by a browser of the monitoring device 714. In such implementations, the combination of a first browser of a first monitoring device 714 and a server-based application that is accessed using the first browser may be considered a "first monitoring application" and the combination of a second browser of a second monitoring device 714 and a server-based application that is accessed using the second browser may be considered a second monitoring application, different from the first monitoring application, regardless of whether the respective browsers are accessing the same server-based application or different server-based applications.

With reference to FIG. 7A, after a queued record in the table 202 of the event/video datastore(s) 124 has been assigned to a monitoring agent 716 (e.g., as described above in Section E), a monitoring application 718 operated by that monitoring agent 716 may receive review slot data 734 relating to the record from the event/video datastore(s) 124 to enable the monitoring agent 716 to review video and possibly other information relating to the event, e.g., within an event window 706 (shown in FIG. 7B). The review slot data 734 may represent video and possibly other information corresponding a record stored in the table 202, and may be provided to a monitoring application 718 of a monitoring agent 716 to whom the record has been assigned (e.g., in response to the agent selection component 620 adding an agent ID 230 for the monitoring agent 716 to the record in the table 202).

The monitoring application 718 operated by a given monitoring agent 716 may present information corresponding to the review slot data 734 using a monitoring agent review slot of the monitoring application 718. A monitoring agent review slot may correspond, for example, to a particular event window 706 (see FIG. 7B) on a screen of the monitoring device 714 in which the review slot data 734 is to be reviewed. In some embodiments, an event window 706 may include one or more graphical user interface (GUI) elements configured to display a representation of the review slot data 734. In some implementations, a monitoring agent 716 may have a limited number of review slots (e.g., 3, 6, etc.) to which review slot data 734 may be added.

FIG. 7B shows an example screen 702 that a monitoring application 718 may present on a monitoring device 714 using the review slot data 734 received from the event/video datastore(s) 124. As shown, the monitoring device 714 may be operated by a monitoring agent 716, and the screen 702 may include a set of event windows 706 corresponding to respective records that are currently assigned to the monitoring agent 716. In some implementations, for example, the individual event windows 706 may be configured to play back recorded video and/or a real-time or near real-time video stream (e.g., based on the received review slot data 734) corresponding to respective events that were detected at various monitored locations 104. A given monitored location 104 may, for example, correspond to a particular customer (e.g., via a user ID 208). In some implementations, recorded video may, at least initially, be configured and/or played back at an increased rate (e.g., two times standard speed) to increase the rate at which monitoring agents 716 can review the video for potential threats or objects of interest. In other implementations, one or more of the event windows 706 may instead be configured to present live video feeds from the respective monitored locations 104 at which events were detected, e.g., by establishing peer-to-peer connections between the monitoring application 718 and respective cameras, such as described below in Section H (in connection with FIG. 10).

As shown in FIG. 7B, in some configurations, the screen 702 may include a controls interface 708 that includes one or more user interface (UI) elements to allow the monitoring agent 716 to control various aspects of that agent's screen 702, such as a maximum number of event windows 706 that can be presented within the agent's screen 702.

As also shown in FIG. 7B, in some implementations, the individual event windows 706 may include timelapse bars 710 that include various features and controls to facilitate review of the video being presented in the event windows 706. A detailed view of an example timelapse bar 710 is shown in FIG. 7C. As shown in FIG. 7C, the timelapse bar 710 may include a playback progress indicator 726 and an associated time indicator 728 showing the temporal location of the currently displayed image within the recorded video clip. In the illustrated example, the playback progress indicator 726 and the time indicator 728 indicate that the current image is from the seventh second of a video clip that is twenty-two seconds long. The timelapse bar 710 may further include play/pause button 730 that may be selected to toggle between a "play" mode in which the video clip is played back and a "pause" mode in which playback of the video clip is paused at a particular frame. The monitoring agent 716 may additionally navigate to a particular temporal location within the recorded video clip by selecting (e.g., clicking on) a particular location on the playback progress indicator 726.

Advantageously, the timelapse bar 710 may additionally include feature indicators 732*a*, 732*b*, 732*c* corresponding to features of the images that were identified by one or more image processors of the edge image processing component 120 and/or the remote image processing component 122. In some implementations, the colors and/or vertical positions of the respective feature indicators 732 may signify the type of feature prediction that was made. For instance, in the illustrated example, the feature indicator 732*a* may correspond to the detection of a person by the edge image processing component 120 and/or remote image processing component 122, the feature indicator 732*b* may correspond to the detection of motion by the edge image processing component 120 and/or remote image processing component 122, and the feature indicator 732*c* may correspond to the detection of a face by the edge image processing component 120 and/or remote image processing component 122. The inclusion of such feature indicators 732 allow the monitoring agent 716 to quickly navigate to and review the portions of the video clip that the edge image processing component 120 and/or the remote image processing component 122 identified as including particular features of potential interest.

In some implementations, the review slot data 734 received from the table 202 for respective records may include the feature indicator(s) 216 written to the table 202 by the remote image processing component 122, and the monitoring application 718 may use that data to generate the feature indicators 732 for the timelapse bar 710. In some implementations, when the edge image processing component 120 and/or the remote image processing component 122 identify a feature in a frame of the images acquired by the image sensor 118, metadata identifying the relative position of the frame within the sequence of frames acquired for the event (e.g., a frame identifier or a timestamp) may be stored as a component of the feature indicators 216, thus enabling the placement of the corresponding feature indicator 732 at the correct relative location on the timelapse bar 710. The monitoring application 718 may thus be configured such that selection of one of the displayed feature indicators 732 causes playback of the recorded video to begin at or shortly before a time at which the corresponding feature was identified. Although not illustrated in FIG. 7B, in some implementations, the screen 702 may additionally or alternatively present one or more other UI elements corresponding to identified features (e.g., thumbnail images, feature descriptors, etc.) that may similarly be selected to cause playback of recorded video to begin at or shortly before a time at which the corresponding feature was identified. UI elements of this type may be provided, for example, in implementations in which live video from respective monitored locations 104 is presented within the event windows 706, such as by presenting such selectable UI elements adjacent, or perhaps as overlays or within sub-windows of, the event windows to which they relate.

Upon reviewing one of the event windows 706, e.g., by viewing video corresponding to detected motion, the monitoring agent 716 may determine that no potential security threat exists and provide an input instructing monitoring application 718 to cause information for the corresponding record to be removed from the agent's screen 702, thus freeing up the corresponding event window 706 (and monitoring agent review slot) to receive and display information for another record. Such an input may, for example, involve selecting (e.g., clicking on) a close element 712 of an event window 706. As shown in FIG. 7A, in response the monitoring agent 716 providing such an input, the monitoring application 718 may send an event status update 736 to the event/video datastore(s) 124 that causes the value of the event status 224 for the event in question to be changed to "canceled." As noted above in connection with FIG. 6E, when the event distribution component 136 detects such a change in the event status 224 for a record, the event distribution component 136 may unassign the record from the monitoring agent 716, such as by removing the agent ID 230 for the monitoring agent 716 from the record. In response to the monitoring application 718 determining that the record has been unassigned from the monitoring agent 716, the monitoring application 718 may remove the review slot data 734 from the event window 706 in which it was displayed.

In some implementations, the monitoring agent 716 may additionally identify reasons why individual notifications are to be removed from the agent's screen 702, e.g., by selecting an option from a dropdown menu presented upon selecting the close element 712. FIG. 7D shows an example dropdown menu 704 that may be presented on the screen 702 in response to selecting a close element 712. As indicated, examples of reasons that may be provided for canceling an event notification include "duplicate event," "delivery," "no person," "passerby," "outdoor service," "household activity," "technical issue," "weather event," "pet or other animal," "adjacent activity," and "other." In response to the selection of such a reason by the monitoring agent 716, in addition to causing the value of the event status 224 for the record to be changed to "canceled," as noted above, the monitoring application 718 may also send an additional event status update 736 to the event/video datastore(s) 124 to cause an indication of the reason to be added to the record, e.g., as an event disposition 226.

Further, as also shown in FIG. 7A, in some implementations, in response to the monitoring agent 716 causing a record to be marked as "canceled," e.g., by clicking a close element 712, the monitoring application 718 may send review slot status update data 738 to the monitoring agent datastore(s) 142C, which may include the agent ID 230 for the monitoring agent 716, to indicate that the monitoring agent review slot (e.g., event window 706) in which the review slot data 734 for the canceled event had been presented has become available. As discussed above in Section F (connection with FIGS. 6A-D), in some implementations, the agent selection component 620 may use the monitoring agent availability data 184A maintained by the monitoring agent datastore(s) 142C to determine whether and how to assign records to monitoring agent 716 for review.

In some implementations, one or more components of the security system 100 may modify data of a record after review slot data 734 for the record has been dispatched to a monitoring application 718 and displayed within or adjacent an event window 706. For example, as discussed above in connection with FIG. 4C, in some implementations, the event filtering and grouping component 132 may mark a record as "filtered," on "hold," or "handled" after it has been assigned to a monitoring agent 716. As described above in Section F (in connection with FIG. 6E), such a change in the record may cause the event distribution component 136 to unassign the record from the monitoring agent 716, such as by removing the agent ID 230 for the monitoring agent 716 from the record. In response to the monitoring application 718 determining that the record has been unassigned from the monitoring agent 716 (e.g., by receiving modified review slot data 734 indicating the agent ID 230 has been removed from the record), the monitoring application 718 may remove the review slot data 734 from the event window 706 in which it was displayed.

As described above in connection with FIGS. 5A-B, in some implementations, the event prioritization component 134 may be configured to determine priorities 228 for respective records. In some implementations, in addition to or in lieu of using such priorities 228 by the agent selection component 620 to facilitate the distribution of queued records to monitoring agents 716 (as described above in connection with FIG. 6A-D), the priorities 228 may be included in the review slot data 734 that the monitoring application 718 receives from the event/video datastore(s) 124. The monitoring application 718 may use such priorities 228, for example, to annotate and/or organize (e.g., adjust the relative placement on the screen 702) the event windows 706 presented on the screen 702 to apprise the monitoring agent 716 of the relative priorities 228 that have been assigned to the records corresponding to the respective event windows 706. As one example, for records with priorities 228 that meet one or more criteria, e.g., with value exceeding a threshold, the monitoring application 718 may alter the borders of the event windows 706, such as by making them red or some other prominent color.

In implementations in which threat scores are determined for respective records, such threat scores may additionally or alternatively be included in the review slot data 734 and used by the monitoring application 718 to annotate and/or organize the event windows 706 based on the corresponding threat scores, e.g., by making the borders of event windows 706 for records with threat scores that exceed a threshold red or some other prominent color.

Further, in some implementations, the relative age of the records (e.g., determined based on the timestamps 206) may additionally or alternatively be included in the review slot data 734 and used by the monitoring application 718 to annotate and/or organize the event windows 706 to apprise the monitoring agent 716 of records that meet one or more criteria, e.g., records that are older than a threshold age.

In some implementations, still other data in the records may additionally or alternatively be included in the review slot data 734 and used by the monitoring application 718 to annotate and/or organize the event windows 706 to apprise the monitoring agent 716 of records meeting one or more criteria. For example, in some implementations, the feature indicators 216 determined by the edge image processing component 120 and/or the remote image processing component 122 may be included in the review slot data 734 to enable the monitoring application 718 to annotate and/or organize the event windows 706 to apprise the monitoring agent 716 of event windows 706 of records for which certain features (e.g., weapons) were detected, such as by adjusting the border color and/or adding text (e.g., "weapon detected") to such event widows 706.

Moreover, it should be appreciated, that in some implementations, multiple annotations types or levels may be used to signify different characteristics of the review slot data 734 underlying the respective event windows 706, such as by using different colors to represent different characteristics (e.g., priorities 228, threat scores, event ages, etc.) and/or different ranges of values for a given characteristic, and/or by using different annotations types, e.g., border colors, text annotations, relative placement on the screen 702, etc., to represent different characteristics.

Further, it should be appreciated that, in some implementations, the remote image processing component 122 and/or the event prioritization component 134 may continue to process content from the records and/or newly-received or changed data from the contextual datastore(s) 142 after records have been assigned to monitoring agents, and may thus make further changes to the records based on that processing, e.g., by adding or changing one or more feature indicators 216, adjusting the values of priorities 228, adjusting threat scores, etc. In such implementations, the monitoring application 718 may learn about such changes through receipt of new or modified review slot data 734 and may adjust the annotations and/or organization of the event windows 706 corresponding to the modified records accordingly. The monitoring application 718 may thus keep the monitoring agent 716 apprised of the most recent results of the automated processing that is being performed by the remote image processing component 122 and/or the event prioritization component 134.

Finally, it should be appreciated that, in some implementations, the event distribution component 136 may be configured to modify the assignment of records to monitoring agents 716 and/or unassign records from monitoring agents 716, as discussed above in connection with FIGS. 6A-E, after monitoring applications 126 have received review slot data 734 for such records. In response to a monitoring application 718 identifying such changes (e.g., based on changes to or removal of agents IDs 230 in the review slot data 734), the monitoring application 718 add or remove information to or from its event windows 706 accordingly.

In some circumstances, upon reviewing one of the event windows 706 shown in FIG. 7B, e.g., by viewing video or other information, the monitoring agent 716 may determine that a potential security concern or other activity of interest (referred to herein as an "incident") exists at the monitored location 104 and determine that further review of the incident is warranted. In such a circumstance, the monitoring agent 716 may click on or otherwise select the event window 706 in which the video in question is being displayed. In response to such a selection, the monitoring device 714 may begin (or continue) to receive live video and/or audio streamed from one or more cameras 102 at the monitored location 104. As described in more detail below in connection with FIGS. 8A and 8B, the monitoring application 718 may cause the live video that is received by the monitoring application 718 to be displayed within a main video window 804 and/or one or more secondary video windows 806 on a screen 802 of the monitoring device 714. In some implementations, for example, one or more peer-to-peer connections may be established between the camera(s) 102 at the monitored location 104 and the monitoring device 714, e.g., using web real-time communication (WebRTC) functionality of a browser on the monitoring device 714, to enable the streaming of video data and/or audio data between such camera(s) 102 and the monitoring device 714. An example process for securely establishing a peer-to-peer connection between the monitoring device 714 and a camera 102 to enable such live-streaming is described below in Section H (in connection with FIG. 10).

The left-hand side of FIG. 8A illustrates conceptually how the monitoring application 718 may receive live video feeds from one or more cameras 102 at a monitored location 104, as well as engage in two-way audio communication with such camera(s) 102, after such peer-to-peer connections have been established. FIG. 8A also illustrates how the monitoring application 718 may additionally interact with one or more datastores, including the event/video datastore(s) 124, the profiles datastore(s) 142A, one or more notifications datastores 146, and/or one or more agents notes datastores 148, to determine further information to present on the screen 802 (shown in FIG. 8B) to facilitate review of the incident in question. The datastore(s) 124, 402, 146, and 148 may take on any numerous forms and may overlap, in whole or in part, with one or more of the other datastores described herein. For example, in some implementations, the notifications datastore(s) 836 shown in FIG. 8A may simply represent an additional column in the table 202 maintained by the event/video datastore(s) 124. As indicated in FIG. 8A, in some implementations, the datastore(s) 124, 402, 146, and 148 may be located within the monitoring service 106. To enable the exchange of data between the monitoring application 718 and the datastore(s) 124, 402, 146, and 148, in some implementations, the monitoring service 106 or another component within the surveillance center environment 926 (see FIGS. 9 and 12) may provide one or more APIs that can be used by the monitoring application 718 to write data to the datastore(s) 124, 402, 146, and 148 and/or fetch data from datastore(s) 124, 402, 146, and 148, as needed.

When a monitoring agent 716 begins reviewing an event (e.g., by selecting an event window 706 on the screen 702), the monitoring application 718 may cause an indication that the event is being actively reviewed by the monitoring agent 716 to be added to the table 202, e.g., by changing the event status 224 for the record to "reviewing." As noted above in connection with FIGS. 4A and 4B, in some implementations, making such a change to an event status 224 for a record may trigger the event filtering and grouping component 132 to identify other records for the same monitored location 104 (and possibly that occurred within a threshold time period of the record in question) and change the values of the event statuses 224 for those records to "hold," thus causing the event distribution component 136 to refrain from assigning those records to monitoring agents 716 or, for records that have already been assigned to monitoring agents 716, causing the event distribution component 136 to unassign them from such monitoring agents 716.

In some implementations, in the event that the monitoring agent 716 ceases reviewing the record in question, e.g., by returning to the screen 702, closing the monitoring application 718, logging out, etc., the monitoring application 718 may change the value of the event status 224 of the record in question from "reviewing" to "new," and may also change the value(s) of the event status indicator(s) 224 of any records that have been linked to the record in question (e.g., pursuant to the step 454 performed by the event filtering and grouping component 132) from "hold" to "new," thus allowing all such records to be assigned to other monitoring agents 716. Further, it should be appreciated that one or more other components of the security system 100 (e.g., the event filtering and grouping component 132 or another component) may additionally or alternatively monitor the activity and/or on line status of individual monitoring agents 716 and, when necessary, take the above actions with respect to records having event status indicator(s) 224 with values of "reviewing" or "hold" to ensure that any records for which a given monitoring agent 716 is responsible get reassigned to new monitoring agents 716, e.g., by changing the values of their event status indicator(s) 224 to "new," in the event that the monitoring agent 716 becomes inactive, the monitoring application 718 of the monitoring agent 716 loses a network connection, a record being in a "reviewing" or "hold" state for more than a threshold period of time, etc.

As noted above, FIG. 8B shows an example screen 802 that the monitoring application 718 may cause the monitoring device 714 to present in response to selection of one of the event windows 706 shown in FIG. 7B. As illustrated in FIG. 8B, in some implementations, the screen 802 may include a main video window 804, four secondary video windows 806a, 806b, 806c, 806d, a detected feature presentation window 808, an event history window 810, an allowed faces window 812, an agent action window 814, an agent notes window 816, a system status indicator 826, and a threat score indicator 828. As explained in more detail below, the monitoring application 718 may use the information in the datastore(s) 124, 402, 146, and 148 shown in FIG. 8A to populate the various windows on the screen 802 with context-rich information concerning the monitored location 104 and the incident in question that enables the monitoring agent 716 to quickly determine whether the incident likely represents an actual security concern or other activity of interest, and, if so, to immediately engage in two-way communication with one or more individuals in the vicinity of the camera(s) 102 to attempt to thwart further activity by such individual(s) or to determine that such individual(s) are authorized to be present at the monitored location 104.

In some implementations, when the monitoring application 718 first presents the screen 802 in response to selection of an event window 706, the monitoring application 718 may cause a live video feed from the camera 102 that detected the event represented in that event window 706 to be presented in the main video window 804, and may cause live video feeds from other cameras 102, if any, at the monitored location 104 to be presented in respective ones of the secondary video windows 806. In response to the monitoring application 718 determining that the monitoring agent 716 has selected one of the secondary video windows 806, the monitoring application 718 may cause the live video feed being presented in the selected secondary video window 806 to instead be presented in the main video window 804, and may also cause the live video being presented in the main video window 804 to instead be presented in the selected secondary video window 806, thus enabling the monitoring agent 716 to efficiently move the video feed from any camera 102 to the main video window 804 for review while continuing to present video feeds from all of the pertinent cameras 102 on the screen 802.

In some implementations, the main video window 804 may also be used to present other information to the monitoring agent 716 in response to the monitoring agent 716 selecting one or more other UI elements on the screen 802. For example, as described in more detail below, in response to detecting the selection of a feature UI element 818 (e.g., an annotated thumbnail image or other feature indicator) corresponding to a detected feature within the detected feature presentation window 808, the monitoring application 718 may cause recorded video and/or other information corresponding to the detected feature to be presented in the main video window 804. Similarly, in response to the monitoring application 718 detecting the selection of an event UI element 820 representing an event within the event history window 810, the monitoring application 718 may cause recorded video and/or other information for a corresponding event to be presented within the main video window 804. When the main video window 804 is presenting live video from a camera 102 when such a selection is made, the monitoring application 718 may cause that live video to instead be presented in a secondary video window 806.

The detected feature presentation window 808 on the screen 802 may display information concerning one or more features that were detected by the edge image processing component 120 and/or the remote image processing component 122. In some implementations, the monitoring application 718 may identify and present one or more feature UI elements 818 within the detected feature presentation window 808 based on the feature indicators 216 that are included in content 840 of one or more records that is received from the event/video datastore(s) 124, e.g., as illustrated in FIG. 8A. In some implementations, the monitoring application 718 may receive such content 840 not only for the record that corresponds to the event window 706 that was selected to initiate the detailed review of the incident, but also for other records that have been determined to relate to the same incident as that record (e.g., records that the event filtering and grouping component 132 identified as being linked to the record in question when the grouping component 132 changed the value of their event statuses 224 to "hold" per the step 454 of the process 435 shown in FIG. 4C), and may present feature UI elements 818 within the detected feature presentation window 808 based on the feature indicators 216 that are included in that content 840. In some implementations, the monitoring application 718 may additionally or alternatively receive such content 840 for all events that were detected at the monitored location within a particular window of time in the past, e.g., within the previous sixty minutes, and may present feature UI elements 818 within the detected feature presentation window 808 based on the feature indicators 216 that are included in that content 840. Although not shown in FIG. 8B, in some implementations, the monitoring application 718 may cause the screen 802 to present a scroll bar adjacent to or within the detected feature presentation window 808 that the monitoring agent 716 can manipulate, e.g., to access and review additional feature UI elements 818 than cannot fit within the detected feature presentation window 808.

In some implementations, the feature UI elements 818 the monitoring application 718 presents in the detected feature presentation window 808 may include, for example, image frames that were identified by the edge image processing component 120 and/or the remote image processing component 122 as including features of interest (e.g., motion, people, faces, etc.), as well as indications of the features that were so identified (e.g., textual descriptions of the features, such as "person identified," "face identified," "weapon identified," etc.). In some implementations, the image frames may additionally or alternatively be annotated, e.g., using red boxes, blue boxes, etc., to identify regions of the image frames in which the pertinent features were detected. Such details of the features UI element 818 may be determined, for example, based on the feature indicators 216 that are included in the content 840 the monitoring application 718 receives from the event/video datastore(s) 124.

In some implementations, the monitoring application 718 may select the feature UI elements 818 that are to be presented within the detected feature presentation window 808 and/or determine the order and/or manner in which such feature UI elements 818 are presented within the detected feature presentation window 808 based on metadata of the feature indicators 216 included in the content 840 that is received from the event/video datastore(s) 124. For example, the feature indicators 216 may include metadata representing timestamps indicating times at which image frames including features were acquired by cameras 102, and the monitoring application 718 may present feature UI elements 818 for more recent image frames closer to the top of the detected feature presentation window 808. Further, the feature indicators 216 may additionally or alternatively include metadata reflecting confidence scores determined by the edge image processing component 120 and/or the remote image processing component 122 (e.g., indicating a level of confidence with respect to the accuracy of an AI prediction), and the monitoring application 718 may present feature UI elements 818 for features with higher confidence scores closer to the top of the detected feature presentation window 808. Still further, the feature indicators 216 may include metadata identifying the types of features that were identified by the edge image processing component 120 and/or the remote image processing component 122, and the monitoring application 718 may present feature UI elements 818 for certain types of features (e.g., "faces" or "weapons") closer to the top of the detected feature presentation window 808. Further, in some implementations, the monitoring application 718 may use a combination of one or more the foregoing types of metadata to determine an optimal order in which the feature UI element 818 are to be presented on the detected feature presentation window 808, such as by using one or more rules to evaluate/process the various items of metadata to calculate a priority score that can be used to determine the presentation order.

In some implementations, the monitoring application 718 may additionally or alternatively use one or more of the foregoing types of metadata to determine the manner in which individual feature UI elements 818 are presented within the detected feature presentation window 808, such as by annotating feature UI elements 818 corresponding to certain types of features in particular ways, e.g., by causing the border of the feature UI element 818 for a detected weapon represented by the metadata to be red or another prominent color.

Advantageously, the feature UI elements 818 presented in the detected feature presentation window 808 may be updated and/or reorganized as additional content 840, including new or modified feature indicators 216, is received from the event/video datastore(s) 124, thus providing the monitoring agent 716 with the most recent results of the automated image processing being performed by the security system 100 and also enabling the monitoring agent 716 to quickly recognize and review the most relevant data concerning detected features for the purpose of determining whether the incident relates to an actual security concern or other activity of interest.

In some implementations, the monitoring application 718 may also present user interface elements (e.g., toggle switches—not shown in FIG. 8B) allowing the monitoring agent 716 to flag or otherwise identify feature UI elements 818 as having included incorrect or inaccurate feature identifications, and the data that is so collected may subsequently be used, e.g., as ground truth data, to retrain one or more ML models of the edge image processing component 120 and/or the remote image processing component 122.

As noted above, in response to the monitoring application 718 determining that the monitoring agent 716 has selected one of the feature UI elements 818, the monitoring application 718 may cause recorded video corresponding to the detected feature to be played within the main video window 804, and the monitoring application 718 may begin playback of the recorded video shortly before the time at which the feature was detected. In some implementations, metadata of the feature indicator 216 for the detected feature may indicate a relative time within the recorded video at which the image frame including the feature was acquired by a camera 102, and the monitoring application 718 may use that metadata to determine where to being playback of the recorded video. Further, in some implementations, the monitoring application 718 may additionally or alternatively use metadata of feature indicators 216 for the recorded video in question to generate a timelapse bar 710 (shown in FIG. 7C) for the record video that may include respective feature indicators 732 for various types of features, and may present that timelapse bar 710 in the main video window 804 together with the recorded video, thus enabling the monitoring agent 716 to quickly navigate to pertinent sections of the recorded video.

The event history window 810 of the screen 802 may present one or more event UI elements 820 corresponding to previous events detected by the security system 100 for the monitored location 104. In some implementations, the monitoring application 718 may identify and present one or more event UI elements 820 within the event history window 810 based on content 840 that is received from the event/video datastore(s) 124, e.g., as illustrated in FIG. 8A. In some implementations, such content 840 may represent not only events detected by one or more cameras 102 at the monitored location 104, but also other types of events detected by other types of sensors, such as door sensors, glass break sensors, motion sensors, smoke detectors, etc.). Examples of various types of sensors for which such content 840 may be provided and presented within the event history window 810 are described below in Section G (in connection with FIG. 9). In some implementations, the monitoring application 718 may present event UI elements 820 for all events that occurred with a particular window of time in the past, e.g., within the last two hours. Although not shown in FIG. 8B, in some implementations, the monitoring application 718 may cause the screen 802 to present a scroll bar adjacent to or within the event history window 810 that the monitoring agent 716 can manipulate, e.g., to access and review additional event UI elements 820 than cannot fit within the event history window 810.

Similar to the feature UI elements 818 within the detected feature presentation window 808, in response to the monitoring application 718 determining that the monitoring agent 716 has selected one of the one or more event UI elements 820, the monitoring application 718 may cause information concerning that event to be presented within the main video window 804. For example, if the event was detected by a camera, selection of the event UI element 820 for the event may cause recorded video of the event to be played back in the main video window 804, possibly together with a timelapse bar 710, as described above. As another example, if the event was detected by a door sensor, selection of the event UI element 820 for the event may cause details concerning the event, such as the identity of the door that was opened, a time at which the door was opened, a time at which the door was subsequently closed, etc., to be presented within the main video window 804. Additionally or alternatively, in some implementations, in response to the monitoring application 718 determining that the monitoring agent 716 has hovered a cursor over one of the one or more event UI elements 820, the monitoring application 718 may cause additional information concerning the event to be presented within a pop up window.

As shown in FIG. 8B, in some implementations, the individual event UI elements 820 may include or otherwise be associated with one or more additional UI elements 822 representing respective characteristics of the corresponding events. For example, the UI element 822a may represent the current status of the event, e.g., based on the current value of the event status 224 in the record for the event, the UI element 822b may represent the current disposition of the event, e.g., based on the current value of the event disposition 226 in the record for the event, and the UI element 822c may represent one or more notifications (e.g., emails, SMS messages, etc.), if any, that were sent to a customer (e.g., an owner of the monitored location 104) relating to the event, e.g., based on data 848 retrieved from the notifications datastore(s) 836 shown in FIG. 8A, and the UI element 822d may represent notes, if any, that were made by an agent relating to the event, e.g., based data retrieved from the agent notes datastore(s) 838 shown in FIG. 8A.

The event UI elements 820 presented in the event history window 810 can be updated/refreshed as additional content 840 is received from the event/video datastore(s) 124, thus apprising the monitoring agent 716 about new events and developments relating to the monitored location 104 as soon they occur, thus enabling the monitoring agent 716 to quickly take such information into account when assessing whether an incident represents an actual security concern or other activity of interest.

In some implementations, in response to the monitoring application 718 determining that the monitoring agent 716 has selected the additional UI element 822a, the monitoring application 718 may cause additional information concerning the status of the event (e.g., the dates/times on which the event status changed, the identity of the monitoring agent 716 or automated process that caused the event status to change, etc.) to be presented within the main video window 804. Additionally or alternatively, in some implementations, in response to the monitoring application 718 determining that the monitoring agent 716 has hovered a cursor over the additional UI element 822a, the monitoring application 718 may cause additional information concerning the status of the event (e.g., the dates/times on which the event status changed, the identity of the monitoring agent 716 or automated process that caused the event status to change, etc.) to be presented within a pop up menu.

In some implementations, in response to the monitoring application 718 determining that the monitoring agent 716 has selected the additional UI element 822b, the monitoring application 718 may cause additional information concerning the disposition of the event (e.g., the dates/times on which the event disposition changed, the identity of the monitoring agent 716 or automated process that caused the event disposition to change, etc.) to be presented within the main video window 804. Additionally or alternatively, in some implementations, in response to the monitoring application 718 determining that the monitoring agent 716 has hovered a cursor over the additional UI element 822b, the monitoring application 718 may cause additional information concerning the disposition of the event (e.g., the dates/times on which the event disposition changed, the identity of the monitoring agent 716 or automated process that caused the event disposition to change, etc.) to be presented within a pop up menu.

In some implementations, in response to the monitoring application 718 determining that the monitoring agent 716 has selected the additional UI element 822c, the monitoring application 718 may cause additional information concerning the notification(s), if any, that were sent to a customer (e.g., the owner of the monitored location 104) to be presented within the main video window 804. Additionally or alternatively, in some implementations, in response to the monitoring application 718 determining that the monitoring agent 716 has hovered a cursor over the additional UI element 822c, the monitoring application 718 may cause additional information concerning the notification(s), if any, that were sent to a customer (e.g., the owner of the monitored location 104) to be presented within a pop up menu. In some implementations, the additional information that is presented may include one or more annotated thumbnail images (e.g., corresponding to one or more feature UI elements 818) that a monitoring agent chose to include in the notification(s). Data 848 representing such additional information may be retrieved, for example, from the notifications datastore(s) 836, as shown in FIG. 8A.

In some implementations, in response to the monitoring application 718 determining that the monitoring agent 716 has selected the additional UI element 822d, the monitoring application 718 may cause additional information concerning the notes, if any, that were made by a monitoring agent 716 who reviewed the event to be presented within the main video window 804. Additionally or alternatively, in some implementations, in response to the monitoring application 718 determining that the monitoring agent 716 has hovered a cursor over the additional UI element 822d, the monitoring application 718 may cause additional information concerning the notes, if any, that were made by a monitoring agent who reviewed the event be presented within a pop up menu. Data 850 representing such additional information may be retrieved, for example, from the agent notes datastore(s) 838, as shown in FIG. 8A.

The allowed faces window 812 may present face images 824 and possibly other information (e.g., names, relationships, etc.) of one or more individuals who are allowed to be at the monitored location 104. In some implementations, the monitoring application 718 may retrieve data 844 representing the face images 824 corresponding to the monitored location 104 from the profiles datastore(s) 142A, e.g., as illustrated in FIG. 8A. Presenting the face images 824 in this fashion may enable the monitoring agent 716 to visually compare any faces that appear in the video or other images presented in the main video window 804, the secondary video windows 806, and/or the detected feature presentation window 808 with the faces of individuals authorized to be at the monitored location 104 without needing to switch context to a different screen.

In some implementations, in response to the monitoring application 718 determining that the monitoring agent 716 has selected (or hovered over) one of the face images 824 (or a UI element corresponding to one of the face images 824), the monitoring application 718 may present additional information concerning the individual (e.g., a name, age, relationship, etc.) from the profiles datastore(s) 142A, e.g., within the main video window 804 (or a pop up window). Such additional information may be obtained, for example, from the profiles datastore(s) 142A.

The agent notes window 816 may present historical notes that have been made by one or more monitoring agent 716 concerning events at the monitored location 104. In some implementations, the monitoring application 718 may retrieve data 850 representing such historical notes corresponding to the monitored location 104 from the agent notes datastore(s) 838, e.g., as illustrated in FIG. 8A. Although not shown in FIG. 8B, in some implementations, the monitoring application 718 may cause the screen 802 to present a scroll bar adjacent to or within the agent notes window 816 that the monitoring agent 716 can manipulate, e.g., to access and review additional historical notes than cannot fit within the agent notes window 816.

Although not shown in FIG. 8B, it should be appreciated that, in some implementations, the screen 802 may also present a UI element (within the agent notes window or elsewhere) that enables the monitoring agent 716 to enter notes concerning the incident being review, such as notes indicating observations made by the monitoring agent 716, actions taken by the monitoring agent 716, follow up communications sent to the customer, etc. In response to the monitoring agent 716 entering such notes, the monitoring application 718 may send data 852 representing such notes to the agent notes datastore(s) 838 for storage, thus enabling another monitoring application 718 to retrieve those notes, e.g., for presentation within an agent notes window 816, the next time a monitoring agent 716 reviews an incident corresponding to the same monitored location 104.

The system status indicator 826 may reflect the current status (e.g., "off," "home" "away," "snoozed") of the security system 100 for the monitored location 104. In some implementations, the monitoring application 718 may retrieve data 846 representing the status of the security system 100 for the monitored location 104 from the profiles datastore(s) 142A, e.g., as illustrated in FIG. 8A. In some implementations, one or more aspects of the system status indicator 826 may be changed (e.g., its border may change colors) in accordance with changing system states to help apprise the monitoring agent 716 of system state changes. Although not illustrated in FIG. 8B, in some implementations, one or more UI elements could be presented (e.g., adjacent the system status indicator 826 and/or in response to selecting the system status indicator 826) that allow the monitoring agent 716 to alter the status of the security system 100 (e.g., by causing the monitoring application 718 to use an API of the event video datastore(s) 124 to change a value of the system state 220). For example, in such an implementation, the monitoring agent 716 could select such a UI element to disarm the security system 100 (e.g., by putting the security system 100 in an "off" or "snoozed" status) after a person at the monitored location 104 with whom the monitoring agent 716 is interacting, e.g., via an audio channel, utters a "safe word" that was set by the customer.

The threat score indicator 828 may reflect the most recently determined threat score for the event currently being reviewed by the monitoring agent 716. In some implementations, the monitoring application 718 may determine the value of the threat score indicator 828 based on the value of a threat score or similar metric that is included in the most recent content 840 received from the event/video datastore(s) 124 for the record being reviewed (e.g., the record corresponding to the event window 706 that was selected to yield the screen 802), e.g., as illustrated in FIG. 8B. Advantageously, the threat score indicator 828 can be updated any time the event prioritization component 134 or other component updates the threat score, thus providing the monitoring agent 716 with the most recent calculation made by the event prioritization component 134 (or another component of security system 100) with respect to the likelihood that the event in question presents an actual security concern or other activity of interest. In some implementations, one or more aspects of the threat score indicator 828 may be changed (e.g., its border may be made red or another prominent color) when the threat score exceeds a threshold.

The monitoring agent 716 may review the information presented on the screen 802 and/or interact with one or more of the UI elements on the screen 802 to obtain additional information, as described above, and then take one or more appropriate actions based on such review. The agent action window 814 may present various UI elements to enable the monitoring agent 716 to take such action(s). In the illustrated example, the agent action window 814 includes a handle UI element 830 and a dispatch UI element 832.

If, upon reviewing the information presented on the screen 802, the monitoring agent 716 determines that no security issue exists, the monitoring agent 716 may cancel the event (e.g., by clicking on or otherwise selecting a "cancel" button—not illustrated, e.g., within the agent action window 814), thus causing the monitoring application 718 to send a record update instruction 842 to the event/video datastore(s) 124 that causes the event status 224 of the record in question to be changed from "reviewing" to "canceled." In some implementations, the monitoring application 718 may likewise send a record update instruction 842 to the event/video datastore(s) 124 that causes the event status(es) 224 of any records that have been linked to the record in question (e.g., pursuant to the step 454 performed by the event filtering and grouping component 132—see FIG. 4C) to be changed from "hold" to "canceled," thus allowing a single monitoring agent 716 to dispose of all of the records relating to the same incident as a group.

As discussed above in connection with FIG. 6E, in some implementations, taking such actions may cause the record in question (as well as any records that were linked to that record) to be unassigned from the monitoring agent(s) 716 to whom they were assigned, thus freeing up the corresponding number of review slot(s) of such monitoring agent(s) 716. In some implementations, in response to selection of such a cancel button, the monitoring application 718 may cause the screen 802 to present a dropdown menu that is the same as or similar to the dropdown menu 704 described above, thus allowing the monitoring agent 716 to select a reason for canceling the event. In response to the selection of such a reason by the monitoring agent 716, the monitoring application 718 may send a record update instruction 842 that causes an indication of the selected reason to be added to the record, e.g., as an event disposition 226. In some implementations, the monitoring application 718 may likewise set the event dispositions 226 of any records that have been linked to the record in question (e.g., pursuant to the step 454 performed by the event filtering and grouping component 132—see FIG. 4C) to match the value set for the record in question, thus allowing a single monitoring agent 716 to set the final disposition for all of the records relating to the same incident as a group.

If, on the other hand, the monitoring agent 716 continues to believe, based on a review of the information on the screen 802, that a threat or other security issue may exist, the monitoring agent 716 may instead determine to continue evaluating the event, such as by verbally communicating with one or more individuals at the monitored location 104, e.g., via a speaker on a camera 102. In some implementations, the monitoring application 718 may present a UI element (e.g., a "continue" button—not illustrated, e.g., within the agent action window 814) that the monitoring agent 716 can click or otherwise select to indicate that the monitoring agent 716 is continuing to review the incident. In some implementations, upon selecting the "continue" user interface element, the monitoring application 718 may present the monitoring agent 716 with authentication information 834 that can be used to help determine whether an individual at the monitored location 104 is authorized to be there. Such authentication information 834 may include, for example, contact information for the customer, a safe word set by the customer, etc.

Upon further review by the monitoring agent 716, and possibly interaction with one or more individuals at the monitored location 104, etc., the monitoring agent 716 may determine a disposition of the event and possibly take one or more remedial measures, such as dispatching the police or fire department to the monitored location 104. If the monitoring agent 716 determines a disposition of the event that does not involve dispatching emergency services, the monitoring agent 716 may select the handle UI element 830. In response to selecting the handle UI element 830, the monitoring application 718 may send a record update instruction 842 to the event/video datastore(s) 124 that causes the event status 224 of the record in question to be changed from "reviewing" to "handled." In some implementations, the monitoring application 718 may likewise send a record update instruction 842 to the event/video datastore(s) 124 that causes the event status indicator(s) 224 of any records that have been linked to the record in question (e.g., pursuant to the step 454 performed by the event filtering and grouping component 132—see FIG. 4C) to be changed from "hold" to "handled," thus allowing a single monitoring agent 716 to dispose of all of the records relating to the same incident as a group.

If, on the other hand, the monitoring agent 716 determines a disposition of the event that does involve dispatching emergency services, the monitoring agent 716 may select the dispatch UI element 832. In response to selecting the dispatch UI element 832, the monitoring application 718 may prompt the monitoring agent 716 to take one or more steps to dispatch appropriate emergency services and may also send a record update instruction 842 to the event/video datastore(s) 124 that causes the event status 224 of the record in question to be changed from "reviewing" to "dispatch." In some implementations, the monitoring application 718 may likewise send a record update instruction 842 to the event/video datastore(s) 124 that causes the event status indicator(s) 224 of any records that have been linked to the record in question (e.g., pursuant to the step 454 performed by the event filtering and grouping component 132—see FIG. 4C) to be changed from "hold" to "dispatch," thus allowing a single monitoring agent 716 to dispose of all of the records relating to the same incident as a group.

Further, in some implementations, the monitoring application 718 may prompt the monitoring agent 716 to identify a final disposition for the record in question, and possibly also send one or more follow-up communications (e.g., an email, a push notification, a text message, etc.) to the customer describing the event and its disposition. In response to the identification of a final disposition by the monitoring agent 716, the monitoring application 718 may send a record update instruction 842 to the event/video datastore(s) 124 that causes an indication of the identified disposition to be entered in the record, e.g., as an event disposition 226. In some implementations, the monitoring application 718 may likewise send a record update instruction 842 to the event/video datastore(s) 124 that causes the event dispositions 226 of any records that have been linked to the record in question (e.g., pursuant to the step 454 performed by the event filtering and grouping component 132—see FIG. 4C) to be changed to match the value set for the record in question, thus allowing a single monitoring agent 716 to set the final disposition for all of the records relating to the same incident as a group.

With respect to the follow up communication if any, in some implementations, the monitoring application 718 may additionally prompt the monitoring agent 716 to select one or more key frames including features identified by the edge image processing component 120 and/or the remote image processing component 122 (e.g., by using toggle switches—not illustrated—to select such items amongst the feature UI elements 818), and may append the selected frame(s) and indications of the feature(s) to the notification that is sent to the customer. Such a follow up communication may be sent, for example, to a customer application 904 of a device 902 (shown in FIG. 9).

Although not depicted in FIGS. 8A and 8B, it should be appreciated that, in some implementations, a customer application 904 of a customer device 902 (see FIG. 9) may also access content of the event/video datastore(s) 124, either as the monitoring agent 716 is reviewing an event or subsequently, to track or review (1) the status of the event, (2) the identity of the monitoring agent who is reviewing or has reviewed the event, and/or (3) the actions the monitoring agent 716 is taking or has taken with respect to the event, etc., to give the customer visibility into the actions that are being taken or have been taken with respect to individual events.

G. EXAMPLE SECURITY SYSTEM

Figure 9:
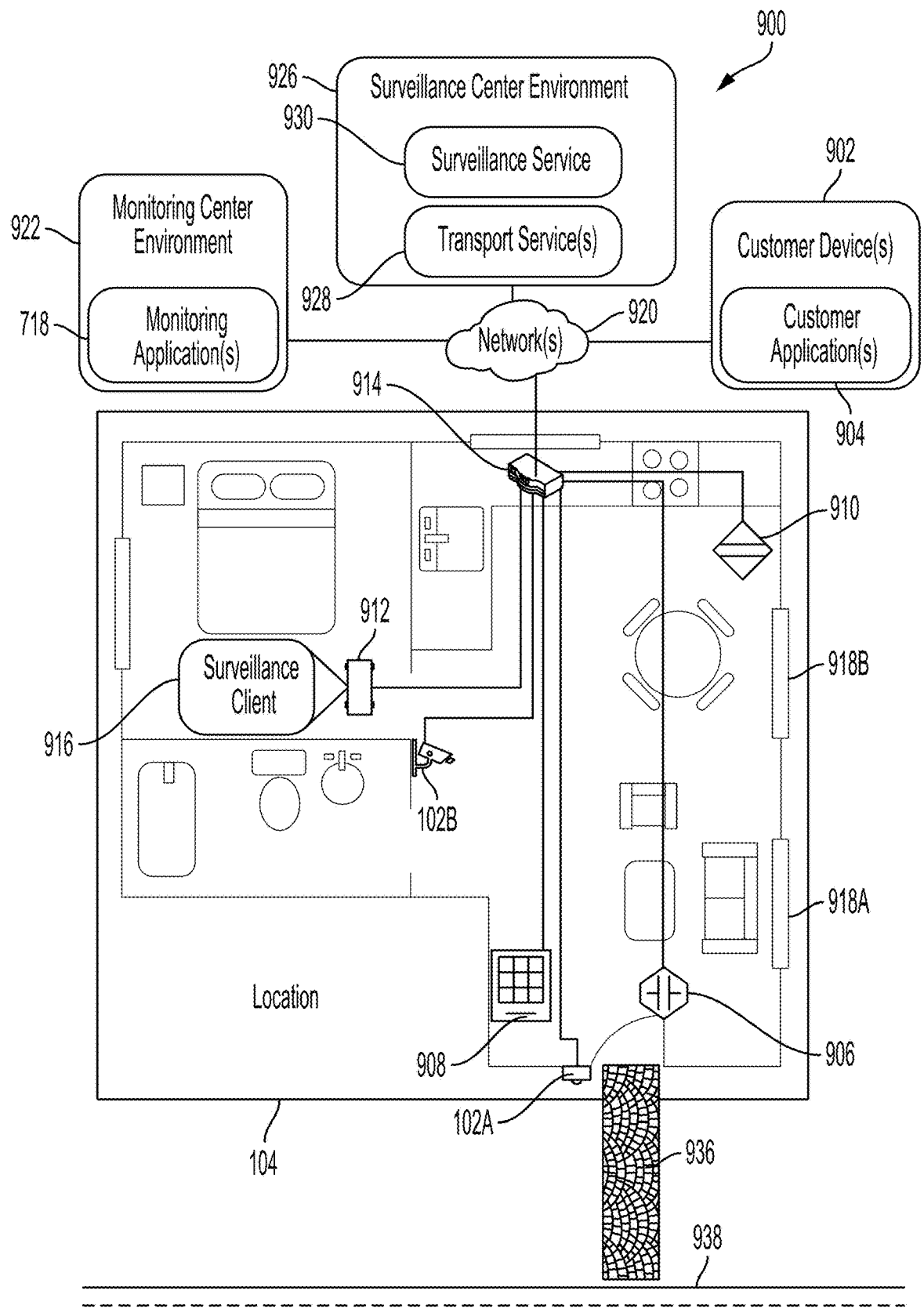
FIG. 9 shows an example implementation of a security system in which the components and processing shown FIGS. 1-8 may be employed, according to some implementations of the present disclosure.

FIG. 9 is a schematic diagram of an example security system 900 with which various aspects of the present disclosure may be employed. As shown, in some implementations, the security system 900 may include a plurality of monitored locations 104 (only one of which is illustrated in FIG. 9), a monitoring center environment 922, a surveillance center environment 926, one or more customer devices 902, and one or more communication networks 920. The monitored location 104, the monitoring center environment 922, the surveillance center environment 926, the one or more customer devices 902, and the communication network(s) 920 may each include one or more computing devices (e.g., as described below with reference to FIG. 11). The customer device(s) 902 may include one or more customer applications 904, e.g., as applications hosted on or otherwise accessible by the customer device(s) 902. In some implementations, the customer applications 904 may be embodied as web applications that can be accessed via browsers of the customer device(s) 902. The monitoring center environment 922 may include one or more monitoring applications 126, e.g., as applications hosted on or otherwise accessible to computing devices within the monitoring center environment 922. In some implementations, the monitoring applications 126 may be embodied as web applications that can be accessed via browsers of computing devices operated by monitoring agents 716 within the monitoring center environment 922. The surveillance center environment 926 may include a surveillance service 930 and one or more transport services 928.

As shown in FIG. 9, the monitored location 104 may include one or more image capture devices (e.g., cameras 102A and 102B), one or more contact sensor assemblies (e.g., contact sensor assembly 906), one or more keypads (e.g., keypad 908), one or more motion sensor assemblies (e.g., motion sensor assembly 910), a base station 912, and a router 914. As illustrated, the base station 912 may host a surveillance client 916.

In some implementations, the router 914 may be a wireless router that is configured to communicate with the devices disposed at the monitored location 104 (e.g., devices 102A, 102B, 906, 908, 910, and 912) via communications that comport with a communications standard such as any of the various Institute of Electrical and Electronics Engineers (IEEE) 108.11 standards. As illustrated in FIG. 9, the router 914 may also be configured to communicate with the network(s) 920. In some implementations, the router 914 may implement a local area network (LAN) within and proximate to the monitored location 104. In other implementations, other types of networking technologies may additionally or alternatively be used within the monitored location 104. For instance, in some implementations, the base station 912 may receive and forward communication packets transmitted by one or both of the cameras 102A, 102B via a point-to-point personal area network (PAN) protocol, such as BLUETOOTH. Other suitable wired, wireless, and mesh network technologies and topologies will be apparent with the benefit of this disclosure and are intended to fall within the scope of the examples disclosed herein.

The network(s) 920 may include one or more public and/or private networks that support, for example, internet protocol (IP) communications. The network(s) 920 may include, for example, one or more LANs, one or more PANs, and/or one or more wide area networks (WANs). LANs that may be employed include wired or wireless networks that support various LAN standards, such as a version of IEEE 108.11 or the like. PANs that may be employed include wired or wireless networks that support various PAN standards, such as BLUETOOTH, ZIGBEE, or the like. WANs that may be employed include wired or wireless networks that support various WAN standards, such as Code Division Multiple Access (CMDA), Global System for Mobiles (GSM), or the like. Regardless of the particular networking technology that is employed, the network(s) 920 may connect and enable data communication among the components within the monitored location 104, the monitoring center environment 922, the surveillance center environment 926, and the customer device(s) 902. In at least some implementations, both the monitoring center environment 922 and the surveillance center environment 926 may include networking components (e.g., similar to the router 914) that are configured to communicate with the network(s) 920 and various computing devices within those environments.

The surveillance center environment 926 may include physical space, communications, cooling, and power infrastructure to support networked operation of a large number of computing devices. For instance, the infrastructure of the surveillance center environment 926 may include rack space into which the computing devices may be installed, uninterruptible power supplies, cooling plenum and equipment, and networking devices. The surveillance center environment 926 may be dedicated to the security system 900, may be a non-dedicated, commercially available cloud computing service (e.g., MICROSOFT AZURE, AMAZON WEB SERVICES, GOOGLE CLOUD, or the like), or may include a hybrid configuration made up of both dedicated and non-dedicated resources. Regardless of its physical or logical configuration, as shown in FIG. 9, the surveillance center environment 926 may be configured to host the surveillance service 930 and the transport service(s) 928.

The monitoring center environment 922 may include a plurality of computing devices (e.g., desktop computers) and network equipment (e.g., one or more routers) that enable communication between the computing devices and the network(s) 920. The customer device(s) 902 may each include a personal computing device (e.g., a desktop computer, laptop, tablet, smartphone, or the like) and network equipment (e.g., a router, cellular modem, cellular radio, or the like). As illustrated in FIG. 9, the monitoring center environment 922 may be configured to host the monitoring application(s) 718 and the customer device(s) 902 may be configured to host the customer application(s) 904.

The devices 102A, 102B, 906, and 910 may be configured to acquire analog signals via sensors incorporated into the devices, generate digital sensor data based on the acquired signals, and communicate (e.g., via a wireless link with the router 914) the sensor data to the base station 912 and/or one or more components within the surveillance center environment 926 (e.g., the remote image processing component 122 described above). The types of sensor data generated and communicated by these devices may vary depending on the characteristics of the sensors they include. For instance, the image capture devices or cameras 102A and 102B may acquire ambient light, generate one or more frames of image data based on the acquired light, and communicate the frame(s) to the base station 912 and/or one or more components within the surveillance center environment 926, although the pixel resolution and frame rate may vary depending on the capabilities of the devices. In some implementations, the cameras 102A and 102B may also receive and store filter zone configuration data and filter the frame(s) using one or more filter zones (e.g., areas within the FOV of a camera from which image data is to be redacted for various reasons, such as to exclude a tree that is likely to generate a false positive motion detection result on a windy day) prior to communicating the frame(s) to the base station 912 and/or one or more components within the surveillance center environment 926. In the example shown in FIG. 9, the camera 102A has a field of view (FOV) that originates proximal to a front door of the monitored location 104 and can acquire images of a walkway 936, a road 938, and a space between the monitored location 104 and the road 938. The camera 102B, on the other hand, has an FOV that originates proximal to a bathroom of the monitored location 104 and can acquire images of a living room and dining area of the monitored location 104. The camera 102B may further acquire images of outdoor areas beyond the monitored location 104, e.g., through windows 918A and 918B on the right-hand side of the monitored location 104.

Individual sensor assemblies deployed at the monitored location 104, e.g., the contact sensor assembly 906 shown in FIG. 9, may include, for example, a sensor that can detect the presence of a magnetic field generated by a magnet when the magnet is proximal to the sensor. When the magnetic field is present, the contact sensor assembly 906 may generate Boolean sensor data specifying a closed state of a window, door, etc. When the magnetic field is absent, the contact sensor assembly 906 may instead generate Boolean sensor data specifying an open state of the window, door, etc. In either case, the contact sensor assembly 906 shown in FIG. 9 may communicate sensor data indicating whether the front door of the monitored location 104 is open or closed to the base station 912.

Individual motion sensor assemblies that are deployed at the monitored location 104, e.g., the motion sensor assembly 910 shown in FIG. 9, may include, for example, a component that can emit high-frequency pressure waves (e.g., ultrasonic waves) and a sensor that can acquire reflections of the emitted waves. When the sensor detects a change in the reflected pressure waves, e.g., because one or more objects are moving within the space monitored by the sensor, the motion sensor assembly 910 may generate Boolean sensor data specifying an alert state. When the sensor does not detect a change in the reflected pressure waves, e.g., because no objects are moving within the monitored space, the motion sensor assembly 910 may instead generate Boolean sensor data specifying a still state. In either case, the motion sensor assembly 910 may communicate the sensor data to the base station 912. It should be noted that the specific sensing modalities described above are not limiting to the present disclosure. For instance, as but one example of an alternative implementation, the motion sensor assembly 910 may instead (or additionally) base its operation on the detection of changes in reflected electromagnetic waves.

While particular types of sensors are described above, it should be appreciated that other types of sensors may additionally or alternatively be employed within the monitored location 104 to detect the presence and/or movement of humans, or other conditions of interest, such as smoke, elevated carbon dioxide levels, water accumulation, etc., and to communicate data indicative of such conditions to the base station 912. For instance, although not illustrated in FIG. 9, in some implementations, one or more sensors may be employed to detect sudden changes in a measured temperature, sudden changes in incident infrared radiation, sudden changes in incident pressure waves (e.g., sound waves), etc. Still further, in some implementations, some such sensors and/or the base station 912 may additionally or alternatively be configured to identify particular signal profiles indicative of particular conditions, such as sound profiles indicative of breaking glass, footsteps, coughing, etc.

The keypad 908 shown in FIG. 9 may be configured to interact with a user and interoperate with the other devices disposed in the monitored location 104 in response to such interactions. For instance, in some examples, the keypad 908 may be configured to receive input from a user that specifies one or more commands and to communicate the specified commands to one or more addressed devices and/or processes, e.g., one or more of the devices disposed in the monitored location 104, the monitoring application(s) 718, and/or the surveillance service 930. The communicated commands may include, for example, codes that authenticate the user as a resident of the monitored location 104 and/or codes that request activation or deactivation of one or more of the devices disposed in the monitored location 104. In some implementations, the keypad 908 may include a user interface (e.g., a tactile interface, such as a set of physical buttons or a set of "soft" buttons on a touchscreen) configured to interact with a user (e.g., receive input from and/or render output to the user). Further, in some implementations, the keypad 908 may receive responses to the communicated commands and render such responses via the user interface as visual or audio output.

The base station 912 shown in FIG. 9 may be configured to interoperate with other security system devices disposed at the monitored location 104 to provide local command and control and/or store-and-forward functionality via execution of the surveillance client 916. To implement local command and control functionality, the base station 912 may execute a variety of programmatic operations through execution of the surveillance client 916 in response to various events. Examples of such events include reception of commands from the keypad 908, reception of commands from one of the monitoring application(s) 718 or the customer application 904 via the network(s) 920, and detection of the occurrence of a scheduled event. The programmatic operations executed by the base station 912 via execution of the surveillance client 916 in response to events may include, for example, activation or deactivation of one or more of the devices 102A, 102B, 906, 908, and 910; sounding of an alarm; reporting an event to the surveillance service 930; and/or communicating "location data" to one or more of the transport service(s) 928. Such location data may include, for example, data specifying sensor readings (sensor data), image data acquired by one or more cameras 102, configuration data of one or more of the devices disposed at the monitored location 104, commands input and received from a user (e.g., via the keypad 908 or a customer application 904), or data derived from one or more of the foregoing data types (e.g., filtered sensor data, filtered image data, summarizations of sensor data, data specifying an event detected at the monitored location 104 via the sensor data, etc.).

In some implementations, to implement store-and-forward functionality, the base station 912, through execution of the surveillance client 916, may receive sensor data, package the data for transport, and store the packaged sensor data in local memory for subsequent communication. Such communication of the packaged sensor data may include, for example, transmission of the packaged sensor data as a payload of a message to one or more of the transport service(s) 928 when a communication link to the transport service(s) 928 via the network(s) 920 is operational. In some implementations, such packaging of the sensor data may include filtering the sensor data using one or more filter zones and/or generating one or more summaries (maximum values, average values, changes in values since the previous communication of the same, etc.) of multiple sensor readings.

The transport service(s) 928 of the surveillance center environment 926 may be configured to receive messages from monitored locations (e.g., the monitored location 104), parse the messages to extract payloads included therein, and store the payloads and/or data derived from the payloads within one or more data stores hosted in the surveillance center environment 926. Examples of such data stores are described below in connection with FIG. 11. In some implementations, the transport service(s) 928 may expose and implement one or more application programming interfaces (APIs) that are configured to receive, process, and respond to calls from base stations (e.g., the base station 912) via the network(s) 920. Individual instances of transport service(s) 928 may be associated with and specific to certain manufactures and/or models of location-based monitoring equipment (e.g., SIMPLISAFE equipment, RING equipment, etc.).

The API(s) of the transport service(s) 928 may be implemented using a variety of architectural styles and interoperability standards. For instance, in some implementations, one or more such APIs may include a web services interface implemented using a representational state transfer (REST) architectural style. In such implementations, API calls may be encoded using the Hypertext Transfer Protocol (HTTP) along with JavaScript Object Notation (JSON) and/or an extensible markup language. Such API calls may be addressed to one or more uniform resource locators (URLs) corresponding to API endpoints monitored by the transport service(s) 928. In some implementations, portions of the HTTP communications may be encrypted to increase security. Alternatively (or additionally), in some implementations, one or more APIs of the transport service(s) 928 may be implemented as a .NET web API that responds to HTTP posts to particular URLs. Alternatively (or additionally), in some implementations, one or more APIs of the transport service(s) 928 may be implemented using simple file transfer protocol commands. Thus, the API(s) of the transport service(s) 928 are not limited to any particular implementation.

The surveillance service 930 within the surveillance center environment 926 may be configured to control the overall logical setup and operation of the security system 900. As such, the surveillance service 930 may communicate and interoperate with the transport service(s) 928, the monitoring application(s) 718, the customer application(s) 904, and the various devices disposed at the monitored location 104 via the network(s) 920. In some implementations, the surveillance service 930 may be configured to monitor data from a variety of sources for events (e.g., a break-in event) and, when an event is detected, notify one or more of the monitoring applications 126 and/or the customer application(s) 904 of the event.

In some implementations, the surveillance service 930 may additionally be configured to maintain state information regarding the monitored location 104. Such state information may indicate, for example, whether the monitored location 104 is safe or under threat. In some implementations, the surveillance service 930 may be configured to change the state information to indicate that the monitored location 104 is safe only upon receipt of a communication indicating a clear event (e.g., rather than making such a change solely due to the lack of additional events being detected). This feature can prevent a "crash and smash" robbery (e.g., where an intruder promptly destroys or disables monitoring equipment) from being successfully executed. In addition, in some implementations, the surveillance service 930 may be configured to monitor one or more particular zones within the monitored location 104, such as one or more particular rooms or other distinct regions within and/or around the monitored location 104 and/or one or more defined regions within the FOVs of the respective image capture devices deployed in the monitored location (e.g., the cameras 102A and 102B shown in FIG. 9).

The individual monitoring application(s) 718 of the monitoring center environment 922 may be configured to enable monitoring personnel to interact with respective computing devices to provide monitoring services for respective locations (e.g., the monitored location 104), and to execute a variety of programmatic operations in response to such interactions. For example, in some implementations, a monitoring application 718 may control its host computing device to provide information regarding events detected at monitored locations, such as the monitored location 104, to a person operating that computing device. Such events may include, for example, detected movement within a particular zone of the monitored location 104. As described above in connection with FIGS. 7A-8B, in some implementations, the monitoring application 718 may cause a monitoring device 714 to present video of events within individual event windows 706 of a screen 702, and may further establish a streaming connection with one or more cameras 102 at the monitored location and cause the monitoring device 714 to provide streamed video from such camera(s) 102 within the main video window 804 and/or the secondary video windows 806 of a screen 802, as well as to allow audio communication between the monitoring device 714 and the camera(s) 102. As described below in connection with FIG. 10, such a streaming connection may be established, for example, using web real-time communication (WebRTC) functionality of a browser on the monitoring device 714

The customer application(s) 904 of the customer device(s) 902 may be configured to enable customers to interact with their computing devices (e.g., their smartphones or personal computers) to access various services provided by the security system 900 for their individual homes or other locations (e.g., the monitored location 104), and to execute a variety of programmatic operations in response to such interactions. For example, in some implementations, a customer application 904 may control a customer device 902 (e.g., a smartphone or personal computer) to provide information regarding events detected at monitored locations, such as the monitored location 104, to the customer operating that customer device 902. Such events may include, for example, detected movement within a particular zone of the monitored location 104. In some implementations, the customer application 904 may additionally or alternatively be configured to process input received from the customer to activate or deactivate one or more of the devices disposed within the monitored location 104. Further, the customer application 904 may additionally or alternatively be configured to establish a streaming connection with one or more cameras 102 at the monitored location and cause the customer device 902 to display streamed video from such camera(s) 102, as well as to allow audio communication between the customer device 902 and the camera(s) 102. Such a streaming connection may be established, for example, using web real-time communication (WebRTC) functionality of a browser on the customer device 902.

H. EXAMPLE PEER-TO-PEER CONNECTION TECHNIQUE

Figure 10:
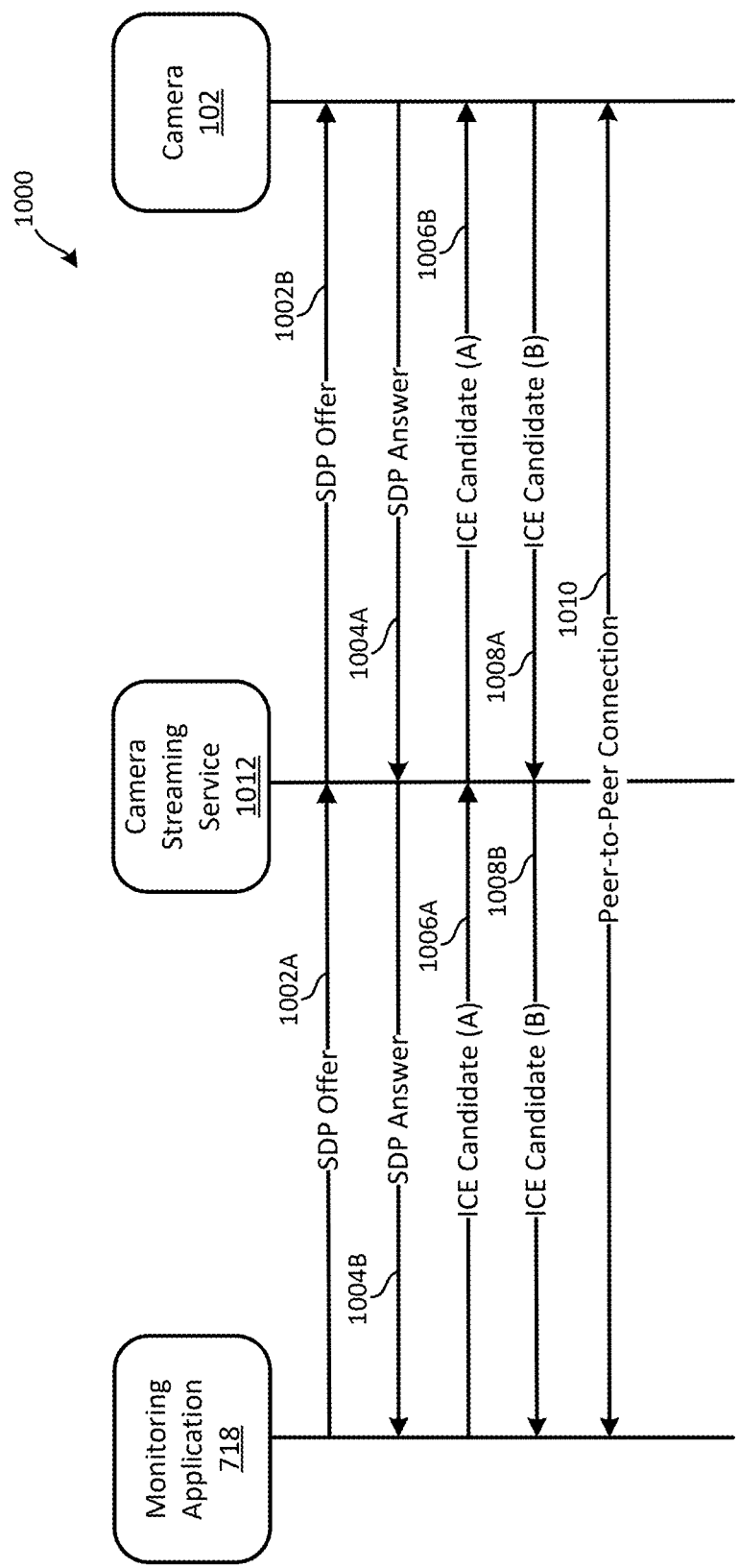
FIG. 10 is a sequence diagram showing an example signaling process that can be employed to establish one or more peer-to-peer connections between a camera and a monitoring application to enable the streaming of video and/or audio data between those components, according to some implementations of the present disclosure.

FIG. 10 is a sequence diagram 1000 illustrating how signaling information (e.g., WebRTC signaling information) can be exchanged between the monitoring application 718 (or alternatively the customer application 904) and a camera 102, via a camera streaming service 1012, to establish a peer-to-peer connection between the monitoring application 718 (or alternatively the customer application 904) and the camera 102. Although FIG. 10 depicts the exchange of signaling information between the monitoring application 718 and the camera 102, and the following section describes the exchange of signaling information between those two components, it should be appreciated that the same process may likewise be used to exchange signaling information between the customer application 904 and the camera 102.

In some implementations, the monitoring application 718 may receive an access token for the camera streaming service 1012 from the monitoring service 106, and such access token may enable the monitoring application 718 to access a signaling channel established by the camera streaming service 1012, thus allowing the monitoring application 718 to make Web API calls to the camera streaming service 1012 for signaling purposes.

As shown in FIG. 10, the signaling process may begin with the monitoring application 718 using the received access token to send (1402A, 1402B) an SDP offer to the camera 102 (via the camera streaming service 1012). The monitoring application 718 may create the SDP offer, for example, by calling the CreateOffer( ) function of the WebRTC application programing interface (API) of a browser or other WebRTC-enabled component of the monitoring device 714. The SDP offer may include information about the kind of media that is to be sent by the monitoring device 714, its format, the transfer protocol being used, the internet protocol (IP) address and port of the monitoring device 714, and/or other information needed to describe the to-be-transferred media and/or the monitoring device 714.

Upon receiving the SDP offer from the monitoring application 718, the camera 102 may send (1404A, 1404B) an SDP answer to the monitoring application 718 via the camera streaming service 1012. The camera 102 may create the SDP answer, for example, by calling the CreateAnswer( ) function of the WebRTC API of a browser or other WebRTC-enabled component of the camera 102. The SDP answer may include information about the kind of media that is to be sent by the camera 102, its format, the transfer protocol being used, the internet protocol (IP) address and port of the camera 102, and/or other information needed to describe the to-be-transferred media and/or the camera 102.

In addition to sharing information about the media that is to be exchanged and the respective devices that will be exchanging it, the monitoring application 718 and the camera 102 may share information about the network connections they are able to use to exchange that media. In particular, the monitoring application 718 may share one or more ICE candidates with the camera 102, and vice versa, with the individual ICE candidates sent by a device describing the available methods that device is able to use to communicate (either directly or through a traversal using relays around NAT (TURN) server). The monitoring application 718 and the camera 102 may gather ICE candidates, for example, by creating an ICE candidate event listener using the WebRTC API (e.g., by calling the function peerConnection.addEventListener('icecandidate', event=>{ ... }).

In some implementations, the respective devices may propose their best ICE candidates first, making their way down the line toward their worse candidates. Ideally, ICE candidates employ the user data protocol (UDP) (since it's faster, and media streams are able to recover from interruptions relatively easily), but the ICE standard does allow transmission control protocol (TCP) candidates as well.

Possible UDP candidate types include host, peer reflexive (prflx), server reflexive (srflx), and relay. A "host" candidate is one for which its IP address is the actual, direct IP address of the remote peer. A "peer reflexive" candidate is one whose IP address comes from a symmetric network address translation (NAT) between the two peers. A "server reflexive" candidate is generated by a session traversal of UDP through NAT (STUN) server. A relay candidate is generated by a TURN server. Possible TCP candidate types include active, passive, and so. An "active" transport will try to open an outbound connection but won't receive incoming connection requests. A "passive" transport will receive incoming connection attempts but won't attempt a connection itself. A "so" transport will try to simultaneously open a connection with its peer.

As an example, FIG. 10 illustrates how the monitoring application 718 may send (1406A, 1406B) ICE candidate "A" to the camera 102, and the camera 102 may send (1408A, 1408B) ICE candidate "B" to the monitoring application 718. Different pairs of the identified ICE candidates may be tested and one of the endpoints which has been designated as the "controlling agent" may select one of the identified ICE candidate pairs to use to establish (1010) a peer-to-peer connection between the monitoring application 718 and the camera 102.

Additional information concerning the use of WebRTC to establish peer-to-peer connections can be found on the web pages accessible via the uniform resource locator (URL) "webrtc.org," the entire contents of which are hereby incorporated herein by reference.

I. EXAMPLE COMPUTING SYSTEM

Figure 11:
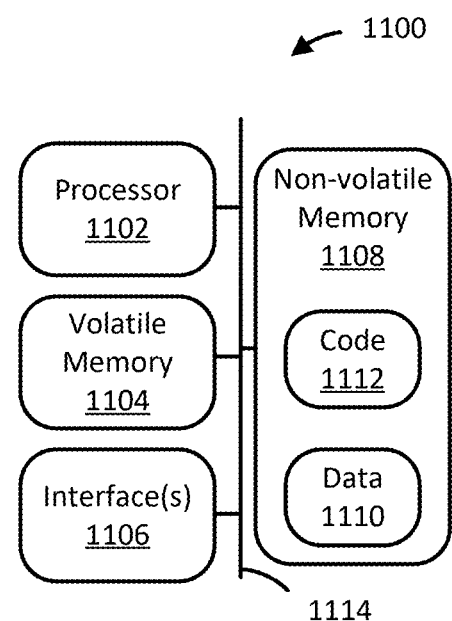
FIG. 11 is a schematic diagram of a computing device that may be used to implement a customer device, a monitoring device, and/or one or more of the services of the of the security system described herein, according to some implementations of the present disclosure.

Turning now to FIG. 11, a computing system 1100 is illustrated schematically. As shown in FIG. 11, the computing system 1100 may include at least one processor 1102, volatile memory 1104, one or more interfaces 1106, non-volatile memory 1108, and an interconnection mechanism 1114. The non-volatile memory 1108 may include executable code 1110 and, as illustrated, may additionally include at least one data store 1112.

In some implementations, the non-volatile (non-transitory) memory 1108 may include one or more read-only memory (ROM) chips; one or more hard disk drives or other magnetic or optical storage media; one or more solid state drives (SSDs), such as a flash drive or other solid-state storage media; and/or one or more hybrid magnetic and SSDs. Further in some implementations, the code 1110 stored in the non-volatile memory may include an operating system and one or more applications or programs that are configured to execute under control of the operating system. In some implementations, the code 1110 may additionally or alternatively include specialized firmware and embedded software that is executable without dependence upon a commercially available operating system. Regardless of its configuration, execution of the code 1110 may result in manipulated data that may be stored in the data store 1112 as one or more data structures. The data structures may have fields that are associated through location in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

The processor 1102 of the computing system 1100 may be embodied by one or more processors that are configured to execute one or more executable instructions, such as a computer program specified by the code 1110, to control the operations of the computing system 1100. The function, operation, or sequence of operations can be hard coded into the circuitry or soft coded by way of instructions held in a memory device (e.g., the volatile memory 1104) and executed by the circuitry. In some implementations, the processor 1102 may be embodied by one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors.

Prior to execution of the code 1110, the processor 1102 may copy the code 1110 from the non-volatile memory 1108 to the volatile memory 1104. In some implementations, the volatile memory 1104 may include one or more static or dynamic random access memory (RAM) chips and/or cache memory (e.g. memory disposed on a silicon die of the processor 1102). Volatile memory 1104 may offer a faster response time than a main memory, such as the non-volatile memory 1108.

Through execution of the code 1110, the processor 1102 may control operation of the interfaces 1106. The interfaces 1106 may include network interfaces. Such network interfaces may include one or more physical interfaces (e.g., a radio, an ethernet port, a USB port, etc.) and a software stack including drivers and/or other code 1110 that is configured to communicate with the one or more physical interfaces to support one or more LAN, PAN, and/or WAN standard communication protocols. Such communication protocols may include, for example, TCP and UDP among others. As such, the network interfaces may enable the computing system 1100 to access and communicate with other computing devices via a computer network.

The interface(s) 1106 may include one or more user interfaces. For instance, in some implementations, the user interface(s) 1106 may include user input and/or output devices (e.g., a keyboard, a mouse, a touchscreen, a display, a speaker, a camera, an accelerometer, a biometric scanner, an environmental sensor, etc.) and a software stack including drivers and/or other code 1110 that is configured to communicate with the user input and/or output devices. As such, the user interface(s) 1106 may enable the computing system 1100 to interact with users to receive input and/or render output. The rendered output may include, for example, one or more GUIs including one or more controls configured to display outputs and/or receive inputs. The received inputs may specify values to be stored in the data store 1112. The displayed outputs may indicate values stored in the data store 1112.

The various features of the computing system 1100 described above may communicate with one another via the interconnection mechanism 1114. In some implementations, the interconnection mechanism 1114 may include a communications bus.

J. CLAUSES DESCRIBING EXAMPLES OF INNOVATIVE FEATURES AND TECHNIQUES

The following clauses describe examples of the innovative features and techniques disclosed herein.

Clause 1. A method, comprising: storing, by a computing system, at least a first record for a first event detected at a first monitored location and a second record for a second event detected at a second monitored location; causing, by the computing system, a first monitoring application to display first content of the first record; and before second content of the second record is displayed for review: receiving, by the computing system, first data associated with the second monitored location; determining, by the computing system, that the first data meets at least a first criterion; and based at least in part on the first data meeting the first criterion, refraining, by the computing system, from causing a second monitoring application to display the second content.

Clause 2. The method of clause 1, further comprising: based at least in part on the first data meeting the first criterion, storing second data in association with the second record; wherein refraining from causing the second monitoring application to display the second content is further based at least in part on the second data being stored in association with the second record.

Clause 3. The method of clause 1 or 2, wherein the first data is included in the second record.

Clause 4. The method of any of clauses 1-3, wherein the first data identifies one or more features detected in image data associated with the second event.

Clause 5. The method of clause 4, wherein determining that the first data meets the first criterion comprises determining that none of the one or more features indicates that a person was detected in the image data.

Clause 6. The method of clause 4, wherein determining that the first data meets the first criterion comprises determining that at least one of the one or more features indicates that a face of a person allowed to be at the second monitored location was detected in the image data.

Clause 7. The method of any of clauses 1-6, further comprising: receiving contextual data associated with the second monitored location; and determining the first criterion based at least in part on the contextual data.

Clause 8. The method of clause 1 or 2, wherein the first data comprise contextual data associated with the second monitored location.

Clause 9. The method of clause 8, further comprising: determining the first criterion based at least in part on the contextual data.

Clause 10. The method of clause 9, wherein: determining the first criterion comprises determining that the contextual data identifies one or more cameras; and determining that the first data meets the first criterion comprises determining that the second event was detected by a camera other than the one or more cameras identified by the contextual data.

Clause 11. The method of clause 9, wherein: determining the first criterion comprises determining that the contextual data identifies one or more time periods; and determining that the first data meets the first criterion comprises determining that the second event was detected during a time period other than the one or more time periods identified by the contextual data.

Clause 12. The method of any of clauses 1-3 and 8, wherein: determining that the first data meets the first criterion comprises determining that the first data indicates that a security system for the second monitored location is not in an armed state.

Clause 13. The method of any of clauses 1-3 and 8, wherein: determining that the first data meets the first criterion comprises determining that the first data indicates that a security system for the second monitored location is in a snoozed state.

Clause 14. The method of any of clauses 1-3, wherein: the first data is associated with a third event detected at the second monitored location; and determining that the first data meets the first criterion comprises determining that a third monitoring application has initiated review of third information relating to the third event.

Clause 15. The method of clause 1 or 2, further comprising: receiving, by the computing system, second data associated with the first monitored location; determining, by the computing system, that the second data meets at least a second criterion; and based at least in part on the second data meeting the second criterion, causing, by the computing system, the first monitoring application to cease displaying the first content.

Clause 16. The method of clause 15, further comprising: based at least in part on the second data meeting the second criterion, storing fourth data in association with the first record; wherein causing the first monitoring application to cease displaying the first content is further based at least in part on the fourth data being stored in association with the first record.

Clause 17. The method of clause 15 or 16, wherein the second data is included in the first record.

Clause 18. The method of any of clauses 15-17, wherein the second data identifies one or more features detected in image data associated with the first event.

Clause 19. The method of clause 18, wherein determining that the second data meets the second criterion comprises determining that none of the one or more features indicates that a person was detected in the image data.

Clause 20. The method of clause 18, wherein determining that the second data meets the second criterion comprises determining that at least one of the one or more features indicates that a face of a person allowed to be at the first monitored location was detected in the image data.

Clause 21. The method of any of clauses 15 or 16, further comprising: receiving contextual data associated with the first monitored location; and determining the second criterion based at least in part on the contextual data.

Clause 22. The method of clause 15 or 16, wherein the second data comprise contextual data associated with the first monitored location.

Clause 23. The method of clause 22, further comprising: determining the second criterion based at least in part on the contextual data.

Clause 24. The method of clause 23, wherein: determining the second criterion comprises determining that the contextual data identifies one or more cameras; and determining that the second data meets the second criterion comprises determining that the first event was detected by a camera other than the one or more cameras identified by the contextual data.

Clause 25. The method of clause 23, wherein: determining the second criterion comprises determining that the contextual data identifies one or more time periods; and determining that the second data meets the second criterion comprises determining that the first event was detected during a time period other than the one or more time periods identified by the contextual data.

Clause 26. The method of any of clauses 15-17 and 22, wherein: determining that the second data meets the second criterion comprises determining that the second data indicates that a security system for the first monitored location is not in an armed state.

Clause 27. The method of any of clauses 15-17 and 22, wherein: determining that the second data meets the second criterion comprises determining that the second data indicates that a security system for the first monitored location is in a snoozed state.

Clause 28. The method of clause 15 or 16, wherein: the second data is associated with a third event detected at the first monitored location; and determining that the second data meets the second criterion comprises determining that a third monitoring application has initiated review of third information relating to the third event.

Clause 29. A system, comprising: one or more processors; and one or more computer-readable mediums encoded with instructions which, when executed by the one or more processors, cause the system to perform the method of any of clauses 1-28.

Clause 30. One or more non-transitory computer-readable mediums encoded with instructions which, when executed by one or more processors of a system, cause the system to perform the method of any of clauses 1-28.

Clause 31. A method, comprising: storing, by a computing system, records for a plurality of events detected by cameras at monitored properties, the records including image data corresponding to detected events; determining, by the computing system, that a first subset of the records meet at least a first filtering criterion; determining, by the computing system, a second subset of the records that excludes the first subset of the records; causing, by the computing system, one or more monitoring applications to display content of the second subset of the records; and refraining, by the computing system, from causing the one or more monitoring applications to display content of the first subset of the records.

Clause 32. A system, comprising: one or more processors; and one or more computer-readable mediums encoded with instructions which, when executed by the one or more processors, cause the system to perform the method of clause 31.

Clause 33. One or more non-transitory computer-readable mediums encoded with instructions which, when executed by one or more processors of a system, cause the system to perform the method of clause 31.

Clause 34. A method, comprising: storing, by a computing system, at least a first record for a first event detected at a first monitored location and a second record for a second event detected at a second monitored location; receiving, by the computing system, first data associated with the first monitored location and second data associated with the second monitored location; determining, by the computing system and based at least in part on the first data, a first priority for the first record; determining, by the computing system and based at least in part on the second data, a second priority for the second record; determining, by the computing system and based at least in part on the first priority and the second priority, that the first record has a higher priority than the second record; and based at least in part on the first record having a higher priority than the second record, causing, by the computing system, a first monitoring application to display first content of the first record prior to causing a second monitoring application to display second content of the second record.

Clause 35. The method of clause 34, wherein: the first data comprises a first indication that a first feature was detected in first image data associated with the first event; and the second data comprises a second indication that a second feature, different than the first feature, was detected in second image data associated with the second event.

Clause 36. The method of clause 35, wherein: the first data further comprises a third indication of a first time at which the first event occurred; and the second data further comprises a fourth indication of a second time, different than the first time, at which the second event occurred.

Clause 37. The method of clause 35 or 36, wherein: the first feature comprises a person; and the second feature comprises motion.

Clause 38. The method of any of clauses 34-37, wherein: the first data represents one or more characteristics of at least a first geographic region of the first monitored location; and the second data represents one or more characteristics of at least a second geographic region of the second monitored location.

Clause 39. The method of any of clauses 34-38, wherein: the first data represents one or more characteristics of at least a first historical event that occurred at the first monitored location; and the second data represents one or more characteristics of at least a second historical event that occurred at the second monitored location.

Clause 40. The method of any of clauses 34-39, wherein: the first data represents one or more characteristics of at a first camera at the first monitored location; and the second data represents one or more characteristics of a second camera at the second monitored location.

Clause 41. The method of any of clauses 34-40, further comprising: determining, by the computing system, a first number of event records in need of review by monitoring agents; determining, by the computing system, a second number of unfilled review slots that are associated with on line monitoring agents; and determining, by the computing system, that the first number of event records is greater than the second number of unfilled review slots; wherein causing the first monitoring application to display the first content prior to causing the second monitoring application to display the second content is further based at least in part on the first number of event records being greater than the second number of unfilled review slots.

Clause 42. The method of clause 41, further comprising: causing a third monitoring application to display third content of a third record; and prior to causing the first monitoring application to display the first content and based at least in part on the first record having a higher priority than the second record and the first number of event records being greater than the second number of unfilled review slots, causing, by the computing system, the third monitoring application to cease displaying the third content.

Clause 43. A system, comprising: one or more processors; and one or more computer-readable mediums encoded with instructions which, when executed by the one or more processors, cause the system to perform the method of any of clauses 34-42.

Clause 44. One or more non-transitory computer-readable mediums encoded with instructions which, when executed by one or more processors of a system, cause the system to perform the method of any of clauses 34-42.

Clause 45. A method, comprising: storing, by a computing system, at least a first record for a first event detected at a first monitored location and a second record for a second event detected at a second monitored location; determining, by the computing system, that a monitoring application is available to review event data; receiving, by the computing system, first data associated with the monitoring application; determining, by the computing system, that the first data meets a first criterion associated with the first record; causing, by the computing system and based at least in part on the first data meeting the first criterion, first content of the first record to be displayed by the monitoring application; determining, by the computing system, that the first data does not meet a second criterion associated with the second record; and refraining, by the computing system and based at least in part on the first data not meeting the second criterion, from causing second content of the second record to be displayed by the monitoring application.

Clause 46. The method of clause 45, wherein: the first data represents at least one qualification of a monitoring agent operating the monitoring application; the first criterion is that the monitoring agent be qualified to review the first content; the second criterion is that the monitoring agent be qualified to review the second content; determining that the first data meets the first criterion comprises determining that the first data indicates the monitoring agent is qualified to review the first content; and determining that the first data does not meet the second criterion comprises determining that the first data indicates the monitoring agent is not qualified to review the second content.

Clause 47. The method of clause 46, further comprising: determining that the first record is of a first type; determining that the second record is of a second type; the first data represents one or more types of records the monitoring agent is qualified to review; the first criterion is that the monitoring agent be qualified to review records of the first type; the second criterion is that the monitoring agent be qualified to review records of the second type; determining that the first data meets the first criterion comprises determining that the monitoring agent is qualified to review records of the first type; and determining that the first data does not meet the second criterion comprises determining that the monitoring agent is not qualified to review records of the second type.

Clause 48. The method of clause 47, wherein: determining that the first record is of the first type comprises determining that image data associated with the first record includes a first type of feature; and determining that the second record is of the second type comprises determining that image data associated with the first record includes a second type of feature.

Clause 49. The method of clause 47, wherein: determining that the first record is of the first type comprises determining that the first record corresponds an event detected in a first geographic region; and determining that the second record is of the second type comprises determining that the second record corresponds an event detected in a second geographic region.

Clause 50. The method of clause 47, wherein: determining that the first record is of the first type comprises determining that a score assigned to the first record meets a third criterion; and determining that the second record is of the second type comprises determining that a score assigned to the second record meets a fourth criterion.

Clause 51. The method of any of clauses 47-50, further comprising: after causing the first content to be displayed by the monitoring application, determining, by the computing system that the first data no longer meets the first criterion; causing, by the computing system and based at least in part on the first data no longer meeting the first criterion, the first content to cease to be displayed by the monitoring application.

Clause 52. The method of any of clauses 45-51, wherein the monitoring application is configured to cause a computing device to display content of multiple different event records simultaneously in different event windows, and wherein determining that the monitoring application is available to review the event data comprises: determining that at least one of the different event windows is currently available to present information for an event record.

Clause 53. A system, comprising: one or more processors; and one or more computer-readable mediums encoded with instructions which, when executed by the one or more processors, cause the system to perform the method of any of clauses 45-52.

Clause 54. One or more non-transitory computer-readable mediums encoded with instructions which, when executed by one or more processors of a system, cause the system to perform the method of any of clauses 45-52.

Clause 55. A method, comprising: causing a computing device to display first video received from a camera at a monitored location on a screen; causing the computing device to display at least a first user interface element on the screen, together with the first video from the camera; and in response to detecting selection of the first user interface element, causing the computing device to display at least first additional information corresponding to the monitored location on the screen, together with the first video from the camera.

Clause 56. The method of clause 55, wherein: the first user interface element corresponds to a feature detected in second video received from the camera; and the first additional information comprises a portion of the second video in which the feature was detected.

Clause 57. The method of clause 56, wherein the first user interface element comprises a thumbnail image in which the feature was detected.

Clause 58. The method of clause 56 or 57, further comprising: receiving metadata corresponding to the feature detected in the second video; and determining, based at least in part on the metadata, a position of the first user interface element on the screen relative to at least a second user interface element corresponding to a second feature detected in the second video.

Clause 59. The method of any of clauses 58, further comprising: causing an annotation to be added to the first user interface element based at least in part on the metadata.

Clause 60. The method of clause 56 or 57, further comprising: receiving metadata corresponding to the feature detected in the second video; and causing an annotation to be added to the first user interface element based at least in part on the metadata.

Clause 61. The method of clause 55, wherein: the first user interface element corresponds to an event detected by a sensor at the monitored location; and the first additional information comprises further information about the event.

Clause 62. The method of clause 61, wherein: the first user interface element corresponds to a characteristic of the event; and the further information comprises detail relating to the characteristic.

Clause 63. The method of clause 62, wherein: the characteristic comprises a status of the event; and the detail comprises an indication of the status.

Clause 64. The method of clause 62, wherein: the characteristic comprises a disposition of the event; and the detail comprises an indication of the disposition.

Clause 65. The method of clause 62, wherein: the characteristic comprises one or more notifications sent to a user concerning the event; and the detail comprises an indication of the one or more notifications.

Clause 66. The method of clause 62, wherein: the characteristic comprises one or more notes made by a monitoring agent concerning the event; and the detail comprises an indication of the one or more notes.

Clause 67. The method of clause 55, wherein: the first user interface element corresponds to an image of a face of a person authorized to be at the monitored location; and the first additional information comprises further information about the person.

Clause 68. A system, comprising: one or more processors; and one or more computer-readable mediums encoded with instructions which, when executed by the one or more processors, cause the system to perform the method of any of clauses 55-67.

Clause 69. One or more non-transitory computer-readable mediums encoded with instructions which, when executed by one or more processors of a system, cause the system to perform the method of any of clauses 55-67.

Clause 70. A method, comprising: receiving, by an application and from a remote computing system, at least a first image associated with a first event record for a first event detected at a first monitored location and at least a second image associated with a second event record for a second event detected at a second monitored location; causing, by the application, a computing device to display the first image and the second image simultaneously on a screen; receiving, by the application and from the remote computing system, a priority associated with the first event record; and causing, by the application and based at least in part on the priority, the computing device to (A) display additional information together with the first image, and/or (B) determine a relative position of the first image and the second image on the screen.

Clause 71. The method of clause 70, wherein causing the computing device to display the first image and the second image simultaneously on the screen further comprises: causing the computing device to display first video including the first image and second video including the second image to be displayed simultaneously on the screen.

Clause 72. The method of clause 70 or 71, further comprising: detecting, by the application, selection of a user interface element corresponding to the first image; and causing, by the application and based at least in part on the selection of the user interface element, the screen to present video streamed from a camera at the first monitored location.

Clause 73. The method of clause 72, wherein causing the screen to present the video streamed from the camera comprises: establishing a peer-to-peer connection between the application and the camera to enable the video to be streamed from the camera to the application.

Clause 74. A system, comprising: one or more processors; and one or more computer-readable mediums encoded with instructions which, when executed by the one or more processors, cause the system to perform the method of any of clauses 70-73.

Clause 75. One or more non-transitory computer-readable mediums encoded with instructions which, when executed by one or more processors of a system, cause the system to perform the method of any of clauses 70-73.

Clause 76. A method, comprising receiving, by computing system remote from a camera, an image captured by the camera; receiving, by the computing system, an indication of a feature detected in the image by an image processing component of the camera; using the indication to perform, by the computing system, at least one operation relating to the image.

Clause 77. A system, comprising: one or more processors; and one or more computer-readable mediums encoded with instructions which, when executed by the one or more processors, cause the system to perform the method of clause 76.

Clause 78. One or more non-transitory computer-readable mediums encoded with instructions which, when executed by one or more processors of a system, cause the system to perform the method of clause 76.

Clause 79. A method, comprising: causing a computing device to display on a screen first video received from a camera at a monitored location; causing the computing device to display at least a first user interface element on the screen, together with the first video, the first user interface element indicative of a feature detected in second video received from the camera; and in response to detecting selection of the first user interface element, causing the computing device to display a portion of the second video in which the feature was detected, together with the first video and the first user interface element.

Clause 80. The method of clause 79, wherein the first user interface element comprises a thumbnail image in which the feature was detected.

Clause 81. The method of clause 79 or clause 80, further comprising: receiving metadata about the feature detected in the second video; and determining, based at least in part on the metadata, a position of the first user interface element on the screen relative to at least a second user interface element, the second user interface element interoperates with a second feature detected in the second video.

Clause 82. The method of clause 81, further comprising: causing an annotation to be added to the first user interface element based at least in part on the metadata.

Clause 83. The method of any of clauses 79-82, further comprising: receiving metadata indicative of the feature detected in the second video; and causing an annotation to be added to the first user interface element based at least in part on the metadata.

Clause 84. The method of any of clauses 79-83, further comprising: causing the computing device to display a second user interface element on the screen, together with the first video, the second user interface element indicative of an event detected by a sensor at the monitored location; and in response to detecting selection of the second user interface element, causing the computing device to display further information about the event, together with the first video and the second user interface element.

Clause 85. The method of clause 84, wherein: the second user interface element is indicative of a characteristic of the event; and the further information includes detail relating to the characteristic.

Clause 86. The method of clause 85, wherein: the characteristic includes a status of the event; and the detail includes an indication of the status.

Clause 87. The method of clause 85, wherein: the characteristic includes a disposition of the event; and the detail includes an indication of the disposition.

Clause 88. The method of clause 85, wherein: the characteristic includes one or more notifications sent to a user concerning the event; and the detail includes an indication of the one or more notifications.

Clause 89. The method of clause 85, wherein: the characteristic includes one or more notes made by a monitoring agent concerning the event; and the detail includes an indication of the one or more notes.

Clause 90. The method of any of clauses 79-89, further comprising: causing the computing device to display a third user interface element on the screen, together with the first video, the third user interface element including an image of a face of a person authorized to be at the monitored location; and in response to detecting selection of the third user interface element, causing the computing device to display further information about the person, together with the first video and the third user interface element.

Clause 91. A system, comprising: one or more processors; and one or more computer-readable mediums encoded with instructions which, when executed by the one or more processors, cause the system to perform the method of any of clauses 79-90.

Clause 92. One or more non-transitory computer-readable mediums encoded with instructions which, when executed by one or more processors of a system, cause the system to perform the method of any of clauses 79-90.

Clause 93. A method, comprising: receiving, by an application and from a remote computing system, at least a first image associated with a first event record for a first event detected at a first monitored location and at least a second image associated with a second event record for a second event detected at a second monitored location; causing, by the application, a computing device to display the first image and the second image simultaneously on a screen; receiving, by the application and from the remote computing system, a priority associated with the first event record; and causing, by the application and based at least in part on the priority, the computing device to (A) display additional information together with the first image, or (B) determine a relative position of the first image and the second image on the screen.

Clause 94. The method of clause 93, wherein causing the computing device to display the first image and the second image simultaneously on the screen further comprises: causing the computing device to display first video including the first image and second video including the second image to be displayed simultaneously on the screen.

Clause 95. The method of clause 93 or clause 94, further comprising: detecting, by the application, selection of a user interface element that includes the first image; and causing, by the application and based at least in part on the selection of the user interface element, the screen to present video streamed from a camera at the first monitored location.

Clause 96. The method of clause 95, wherein causing the screen to present the video streamed from the camera comprises: establishing a peer-to-peer connection between the application and the camera to enable the video to be streamed from the camera to the application.

Clause 97. A system, comprising: one or more processors; and one or more computer-readable mediums encoded with instructions which, when executed by the one or more processors, cause the system to perform the method of any of clauses 93-96.

Clause 98. One or more non-transitory computer-readable mediums encoded with instructions which, when executed by one or more processors of a system, cause the system to perform the method of any of clauses 93-96.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements.

The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

What is claimed is:

1. A method, comprising:
   causing a computing device to present, within a first window on a screen, a stream of video including live content and acquired from a monitored location;
   causing the computing device to display at least a first user interface element within a first region of the screen, together with the stream of video presented in the first window, the first user interface element indicative of a feature detected in recorded video acquired from the monitored location; and
   in response to detecting selection of the first user interface element, causing the computing device to: (i) cease presenting the stream of video within the first window, (ii) play back, within the first window, a portion of the recorded video in which the feature was detected, and (iii) present the stream of video within a second window on the screen displayed in a non-overlapping fashion with the first window.

2. The method of claim 1, wherein the first user interface element comprises a thumbnail image in which the feature was detected.

3. The method of claim 1, further comprising:
receiving metadata about the feature detected in the recorded video; and
determining, based at least in part on the metadata, a position of the first user interface element on the screen relative to at least a second user interface element within the first region, the second user interface element being indicative of an additional feature detected in the recorded video.

4. The method of claim 3, further comprising:
causing an annotation to be added to the first user interface element based at least in part on the metadata.

5. The method of claim 1, further comprising:
causing the computing device to display a second user interface element within the first region, together with the first user interface element, the second user interface element being indicative of an additional feature detected in the recorded video;
receiving metadata indicative of the additional feature; and
based at least in part on the metadata, causing an annotation to be added to the first user interface element so as to cause the first user interface element to be distinguishable from the second user interface element.

6. The method of claim 1, wherein causing the computing device to display at least the first user interface element on the screen includes causing the computing device to display the first user interface element within the first region of the screen that is non-overlapping with the first window and the second window.

7. The method of claim 6, further comprising:
causing the computing device to display, together with the stream of video and the first user interface element, a second user interface element within a second region of the screen that is non-overlapping with the first window and the first region, the second user interface element indicative of an event detected by a sensor at the monitored location; and
in response to detecting selection of the second user interface element, causing the computing device to display further information about the event, together with the stream of video and the first user interface element.

8. The method of claim 7, wherein:
the second user interface element is indicative of a characteristic of the event; and
the further information includes detail relating to the characteristic.

9. The method of claim 8, wherein:
the characteristic includes a status of the event; and
the detail includes an indication of the status.

10. The method of claim 8, wherein:
the characteristic includes a disposition of the event; and
the detail includes an indication of the disposition.

11. The method of claim 8, wherein:
the characteristic includes one or more notifications sent to a user concerning the event; and
the detail includes an indication of the one or more notifications.

12. The method of claim 8, wherein:
the characteristic includes one or more notes made by a monitoring agent concerning the event; and
the detail includes an indication of the one or more notes.

13. The method of claim 6, further comprising:
causing the computing device to display, together with the stream of video and the first user interface element, a second user interface element within a second region of the screen that is non-overlapping with the first window and the first region, the second user interface element including an image of a face of a person authorized to be at the monitored location; and
in response to detecting selection of the second user interface element, causing the computing device to display further information about the person, together with the stream of video and the first user interface element.

14. The method of claim 1, wherein the stream of video and the recorded video are acquired by a same camera at the monitored location.

15. A system, comprising:
one or more processors; and
one or more computer-readable mediums encoded with instructions which, when executed by the one or more processors, cause the system to:
cause a computing device to present, within a first window on a screen, a stream of video including live content and acquired from a camera at a monitored location;
cause the computing device to display at least a first user interface element within a first region of the screen, together with the stream of video presented in the first window, the first user interface element indicative of a feature detected in recorded video acquired from the camera; and
in response to detecting selection of the first user interface element, cause the computing device to: (i) cease presenting the stream of video within the first window, (ii) play back, within the first window, a portion of the recorded video in which the feature was detected, and (iii) present the stream of video within a second window on the screen displayed in a non-overlapping fashion with the first window.

16. The system of claim 15, wherein the first user interface element comprises a thumbnail image in which the feature was detected.

17. The system of claim 15, wherein the one or more computer-readable mediums are encoded with additional instructions which, when executed by the one or more processors, further cause the system to:
cause the computing device to display, together with the stream of video and the first user interface element, a second user interface element within a second region of the screen that is non-overlapping with the first window and the first region, the second user interface element indicative of an event detected by a sensor at the monitored location; and
in response to detecting selection of the second user interface element, causing the computing device to display further information about the event, together with the stream of video and the first user interface element.

18. The system of claim 15, wherein the one or more computer-readable mediums are encoded with additional instructions which, when executed by the one or more processors, further cause the system to:
cause the computing device to display, together with the stream of video and the first user interface element, a second user interface element within a second region of the screen that is non-overlapping with the first window and the first region, the second user interface element including an image of a face of a person authorized to be at the monitored location; and
in response to detecting selection of the second user interface element, cause the computing device to display further information about the person, together with the stream of video and the first user interface element.

19. One or more non-transitory computer-readable mediums encoded with instructions which, when executed by one or more processors of a system, cause the system to:
- cause a computing device to present, within a first window on a screen, a stream of video including live content and acquired from a camera at a monitored location;
- cause the computing device to display at least a first user interface element within a first region of the screen, together with the stream of video presented in the first window, the first user interface element indicative of a feature detected in recorded video acquired from the camera; and
- in response to detecting selection of the first user interface element, cause the computing device to: (i) cease presenting the stream of video within the first window, (ii) play back, within the first window, a portion of the recorded video in which the feature was detected, and (iii) present the stream of video within a second window on the screen displayed in a non-overlapping fashion with the first window.

20. The one or more non-transitory computer-readable mediums of claim 19, wherein the first user interface element comprises a thumbnail image in which the feature was detected.

21. The one or more non-transitory computer-readable mediums of claim 19, further encoded with additional instructions which, when executed by the one or more processors, further cause the system to:
- cause the computing device to display, together with the stream of video and the first user interface element, a second user interface element within a second region of the screen that is non-overlapping with the first window and the first region, the second user interface element indicative of an event detected by a sensor at the monitored location; and
- in response to detecting selection of the second user interface element, causing the computing device to display further information about the event, together with the stream of video and the first user interface element.

22. The one or more non-transitory computer-readable mediums of claim 19, further encoded with additional instructions which, when executed by the one or more processors, further cause the system to:
- cause the computing device to display, together with the stream of video and the first user interface element, a second user interface element within a second region of the screen that is non-overlapping with the first window and the first region, the second user interface element including an image of a face of a person authorized to be at the monitored location; and
- in response to detecting selection of the second user interface element, cause the computing device to display further information about the person, together with the stream of video and the first user interface element.

* * * * *